United States Patent
Matsumoto et al.

(10) Patent No.: US 6,439,683 B1
(45) Date of Patent: Aug. 27, 2002

(54) IMAGE PROCESSING METHOD AND APPARATUS AND RECORDING APPARATUS

(75) Inventors: Kazumasa Matsumoto, Yokohama; Hidehiko Saito, Utsunomiya; Hidehito Takayama, Chigasaki; Hirokazu Sada, Utsunomiya, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/265,589

(22) Filed: Mar. 10, 1999

(30) Foreign Application Priority Data

| Mar. 11, 1998 | (JP) | 10-059793 |
| Mar. 5, 1999 | (JP) | 11-058876 |

(51) Int. Cl.$^7$ .............................................. B41J 2/205
(52) U.S. Cl. ............................................ 347/15; 347/43
(58) Field of Search ................................. 347/12, 5, 15, 347/40, 41, 43, 14, 10, 188, 190, 131, 237, 240; 358/1.9, 534

(56) References Cited

U.S. PATENT DOCUMENTS

| 4,313,124 A | | 1/1982 | Hara ............................ 347/57 |
| 4,345,262 A | | 8/1982 | Shirato et al. ................. 347/10 |
| 4,459,600 A | | 7/1984 | Sato et al. ..................... 347/47 |
| 4,463,359 A | | 7/1984 | Ayata et al. ................... 347/50 |
| 4,558,333 A | | 12/1985 | Sugitani et al. ............... 347/65 |
| 4,635,078 A | * | 1/1987 | Sakurada et al. ............. 347/43 |
| 4,714,964 A | * | 12/1987 | Sasaki ........................... 347/43 |
| 4,723,129 A | | 2/1988 | Endo et al. ................... 347/56 |
| 4,740,796 A | | 4/1988 | Endo et al. ................... 347/56 |
| 4,855,753 A | * | 8/1989 | Ichikawa et al. .............. 347/43 |
| 5,111,302 A | * | 5/1992 | Chan et al. .................... 347/15 |
| 5,617,123 A | | 4/1997 | Takaoka et al. ............... 347/15 |

FOREIGN PATENT DOCUMENTS

| EP | 0 606 022 | 7/1994 |
| EP | 0 665 677 | 8/1995 |
| EP | 0 707 966 | 4/1996 |
| EP | 0 750 995 | 1/1997 |
| JP | 59-123670 | 7/1984 |
| JP | 59-138461 | 8/1984 |

OTHER PUBLICATIONS

Katoh, "Multilevel Error Diffusion Method", National Conference of Communication, Department in Showa 53 Year, Society of Electronic Communication in Japan, p. 504 (1973).

Floyd et al., "An Adaptive Algorithm for Spatial Greyscale", Proceedings of the Society for Information Display, vol. 17(2), pp. 75–77 (1976).

* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

A plurality of ink-jet head units, each having ink with different density in a color, are prepared. Superimposed print information of a plurality of the types of ink, each having different density, is stored as an ink type distribution table in correspondence with the density of image data. An increase in ink density in each nozzle is predicted on the basis of a continuous ink non-discharging count (non-discharging time) stored in an ink density characteristics change table. Binary data for determining an optimal ink type distribution for recording the image data, i.e., ink-jet head units to be used for printing, are generated by referring to the predicted value and the ink type distribution table. Printing is then performed. In addition, the density value of the target pixel to be printed is predicted. The error between the predicted density value and the density value of the original pixel is distributed to the pixels around the target pixel to convert the image data, thereby printing an image on the basis of the resultant image data.

37 Claims, 39 Drawing Sheets

FIG.3

| DENSITY RATIO | 1 | 2 | 4 | 8 |
|---|---|---|---|---|
| DENSITY DATA | d1 | d2 | d3 | d4 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

THIN ↑↓ THICK

1: DISCHARGING
0: NON-DISCHARGING

FIG.6

| INK DENSITY RATIO | | D1 | D2 | D3 | D4 | SUPERIMPOSE TRANSMISSION DENSITY |
|---|---|---|---|---|---|---|
| TRANSMISSION DENSITY | | 0.16D | 0.32D | 0.64D | 1.28D | |
| 8-BIT DENSITY DATA | | 1 | 2 | 4 | 8 | |
| | | d1 | d2 | d3 | d4 | |
| 0 | | 0 | 0 | 0 | 0 | 0D |
| 17 | | 1 | 0 | 0 | 0 | 0.16D |
| 34 | | 0 | 1 | 0 | 0 | 0.32D |
| 51 | | 1 | 1 | 0 | 0 | 0.48D |
| 68 | | 0 | 0 | 1 | 0 | 0.64D |
| 85 | | 1 | 0 | 1 | 0 | 0.8D |
| 102 | | 0 | 1 | 1 | 0 | 0.96D |
| 119 | | 1 | 1 | 1 | 0 | 1.12D |
| 136 | | 0 | 0 | 0 | 1 | 1.28D |
| 153 | | 1 | 0 | 0 | 1 | 1.44D |
| 170 | | 0 | 1 | 0 | 1 | 1.6D |
| 187 | | 1 | 1 | 0 | 1 | 1.76D |
| 204 | | 0 | 0 | 1 | 1 | 1.92D |
| 221 | | 1 | 0 | 1 | 1 | 2.08D |
| 238 | | 0 | 1 | 1 | 1 | 2.24D |
| 255 | | 1 | 1 | 1 | 1 | 2.4D |

THIN ← → THICK

1: DISCHARGING
0: NON-DISCHARGING

FIG.9

| ADDRESS OFFSET | CONTINUOUS NON-DISCHARGING COUNT (N) | DENSITY INCREASE RATE (dD) |
|---|---|---|
| 0H | 0 | 1+(0.5/5000)×0 |
| 4H | 1 | 1+(0.5/5000)×1 |
| 8H | 2 | 1+(0.5/5000)×2 |
| CH | 3 | 1+(0.5/5000)×3 |
| · | · | · |
| · | · | · |
| · | · | · |
| 190H | 100 | 1+(0.5/5000)×100 |
| 194H | 101 | 1+(0.5/5000)×101 |
| 198H | 102 | 1+(0.5/5000)×102 |
| · | · | · |
| · | · | · |
| · | · | · |
| 4E20H | 5000 | 1+(0.5/5000)×5000 |
| 4E24H | 5001 | 1+(0.5/5000)×5001 |
| 4E28H | 5002 | 1+(0.5/5000)×5002 |
| · | · | · |
| · | · | · |
| · | · | · |
| 7FF4H | 8189 | 1+(0.5/5000)×8189 |
| 7FF8H | 8190 | 1+(0.5/5000)×8190 |
| 7FFCH | 8191 | 1+(0.5/5000)×8191 |

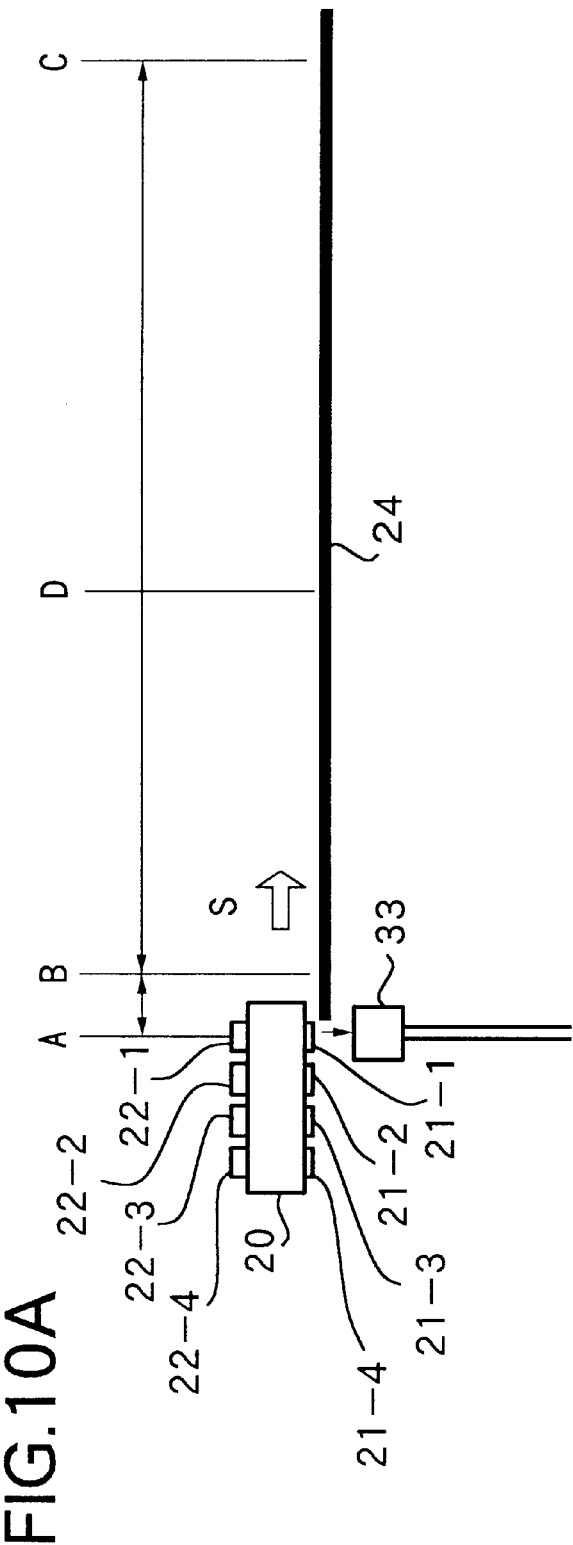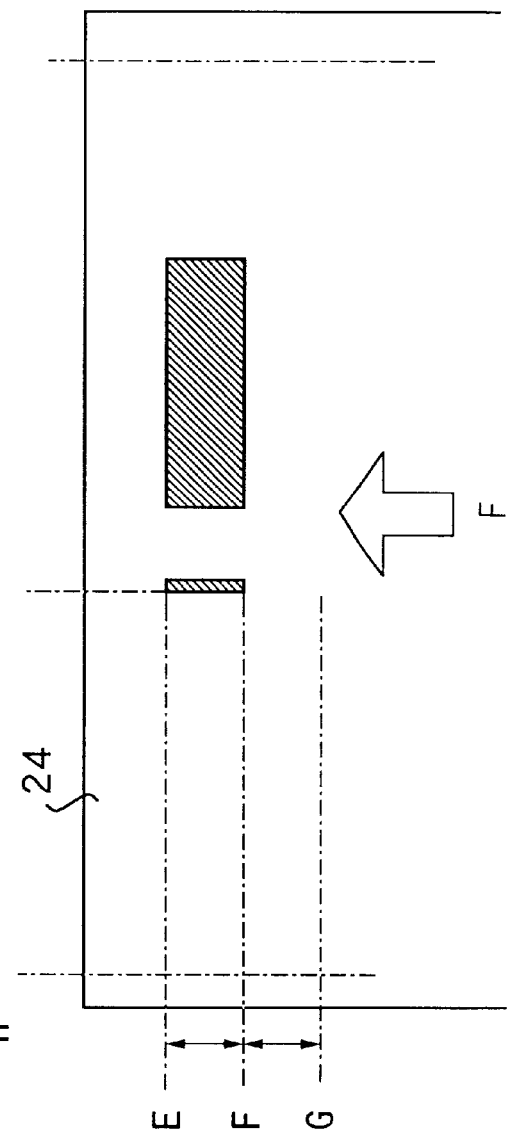
FIG.10A
FIG.10B

FIG.12

| COMBINATION NO. | INK | D1 | D2 | D3 | D4 | SUPERIMPOSE TRANSMISSION DENSITY |
|---|---|---|---|---|---|---|
| | DENSITY RATIO | 1 | 2 | 4 | 8 | |
| | TRANSMISSION DENSITY | 0.16D | 0.32D | 0.64D | 1.28D | |
| | TRANSMISSION DENSITY (DENSITY SIGNAL CONVERSION VALUE) | 17 | 34 | 68 | 136 | |
| | DENSITY DATA / THRESHOLD | d1 | d2 | d3 | d4 | |
| 0 (THIN) | 0 | 0 | 0 | 0 | 0 | 0D |
| | 8.5 | | | | | |
| 1 | 17 | 1 | 0 | 0 | 0 | 0.16D |
| | 25.5 | | | | | |
| 2 | 34 | 0 | 1 | 0 | 0 | 0.32D |
| | 42.5 | | | | | |
| 3 | 51 | 1 | 1 | 0 | 0 | 0.48D |
| | 59.5 | | | | | |
| 4 | 68 | 0 | 0 | 1 | 0 | 0.64D |
| | 76.5 | | | | | |
| 5 | 85 | 1 | 0 | 1 | 0 | 0.8D |
| | 93.5 | | | | | |
| 6 | 102 | 0 | 1 | 1 | 0 | 0.96D |
| | 110.5 | | | | | |
| 7 | 119 | 1 | 1 | 1 | 0 | 1.12D |
| | 127.5 | | | | | |
| 8 | 136 | 0 | 0 | 0 | 1 | 1.28D |
| | 144.5 | | | | | |
| 9 | 153 | 1 | 0 | 0 | 1 | 1.44D |
| | 161.5 | | | | | |
| 10 | 170 | 0 | 1 | 0 | 1 | 1.6D |
| | 178.5 | | | | | |
| 11 | 187 | 1 | 1 | 0 | 1 | 1.76D |
| | 195.5 | | | | | |
| 12 | 204 | 0 | 0 | 1 | 1 | 1.92D |
| | 212.5 | | | | | |
| 13 | 221 | 1 | 0 | 1 | 1 | 2.08D |
| | 229.5 | | | | | |
| 14 | 238 | 0 | 1 | 1 | 1 | 2.24D |
| | 246.5 | | | | | |
| 15 (THICK) | 255 | 1 | 1 | 1 | 1 | 2.4D |

1: DISCHARGING
0: NON-DISCHARGING

0: NON-DISCHARGING
1: DISCHARGING

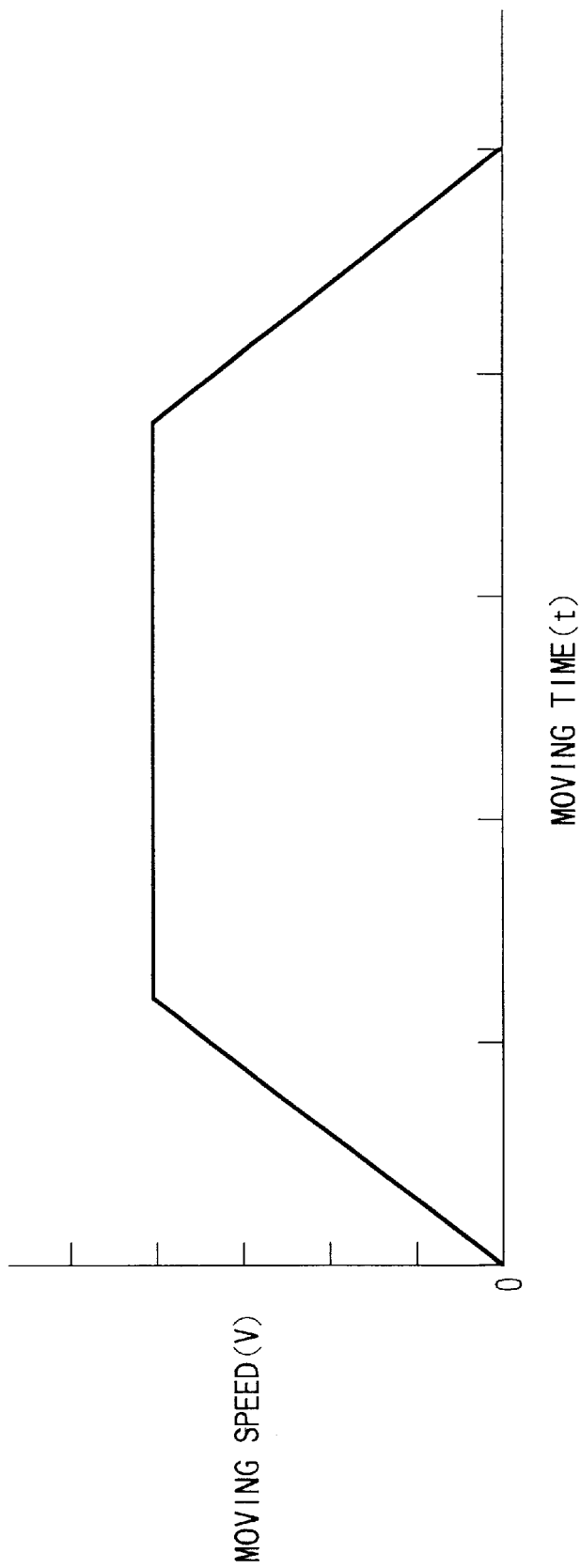

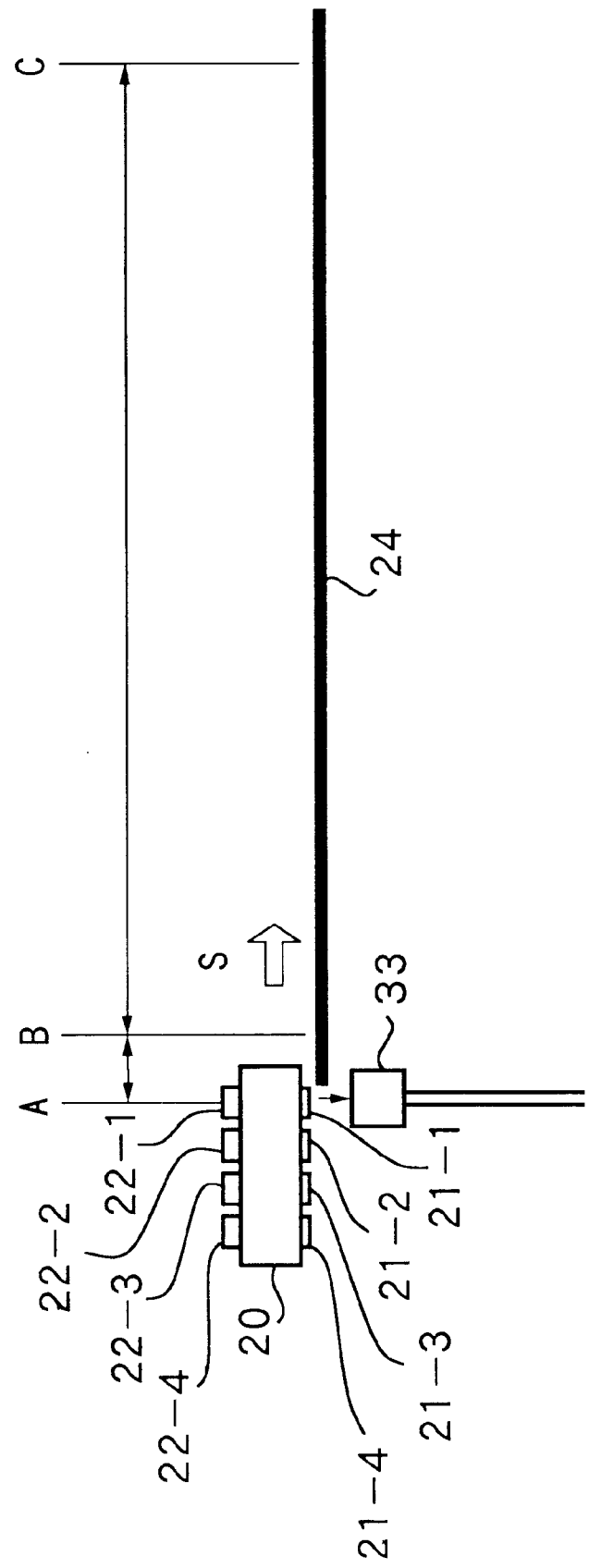

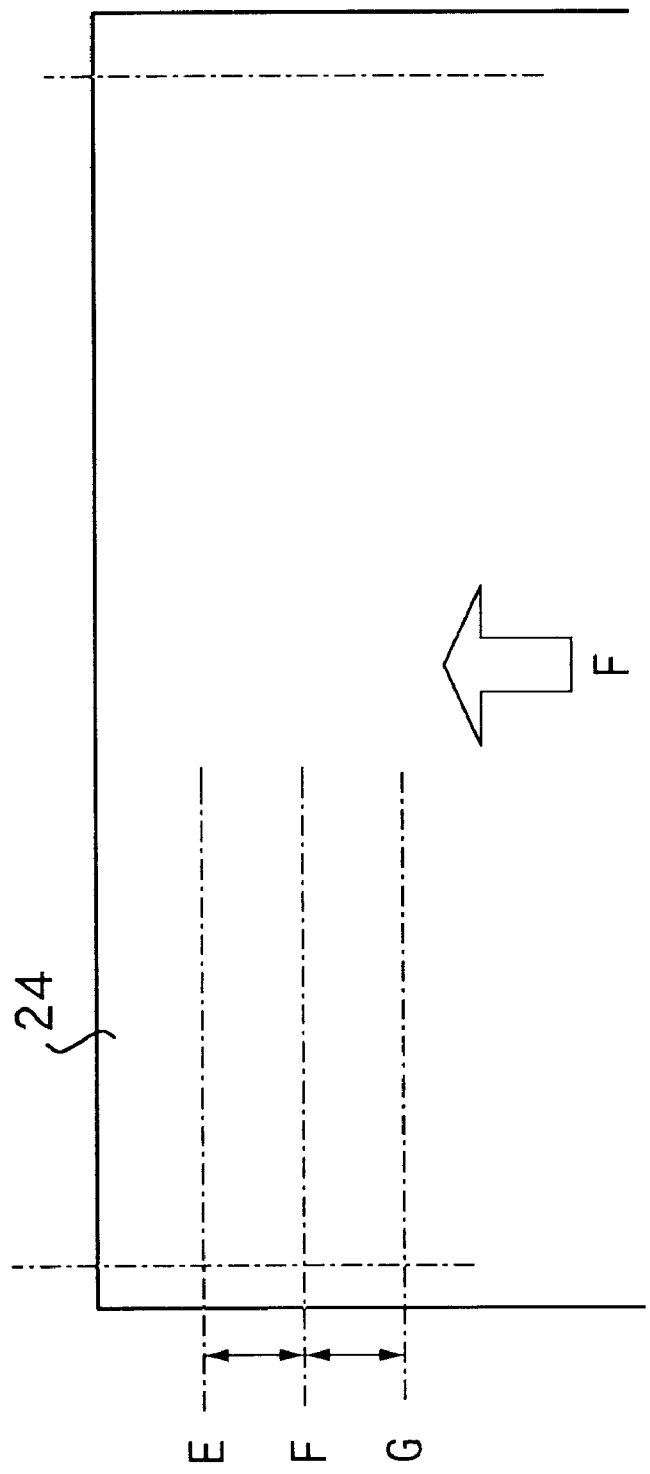

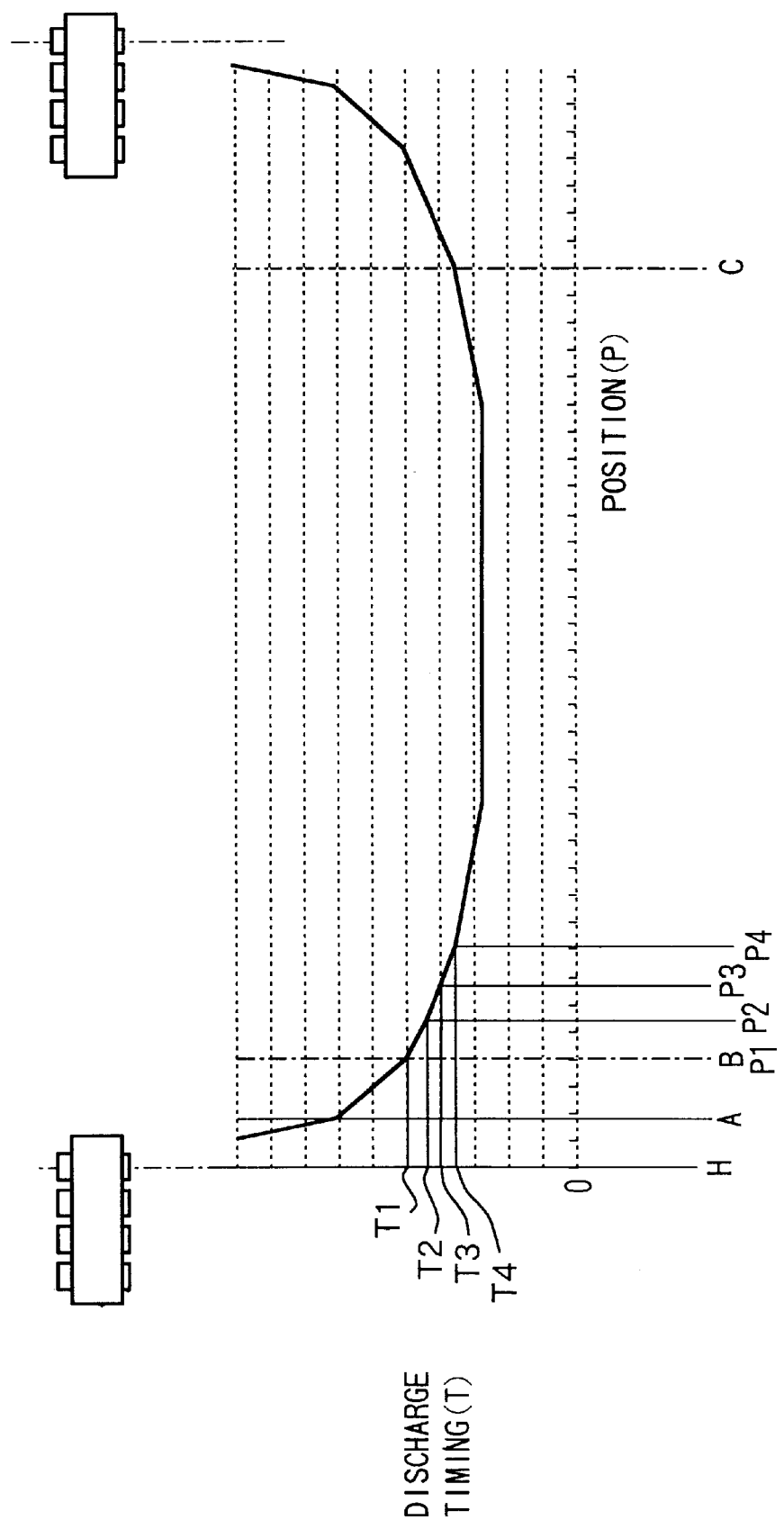

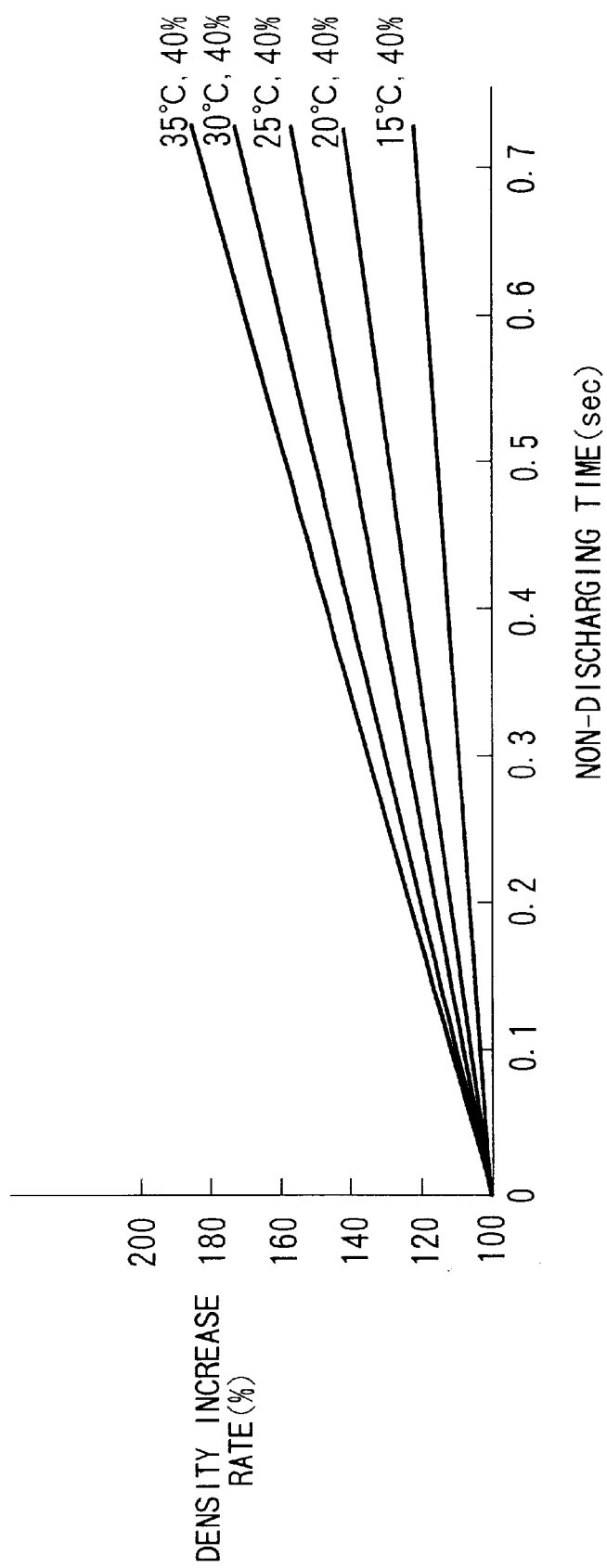

FIG.27A
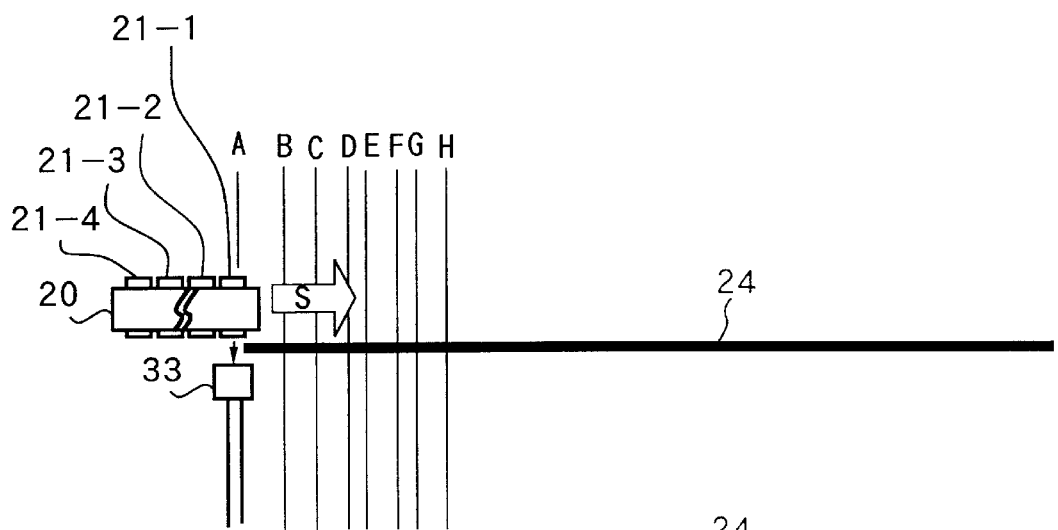
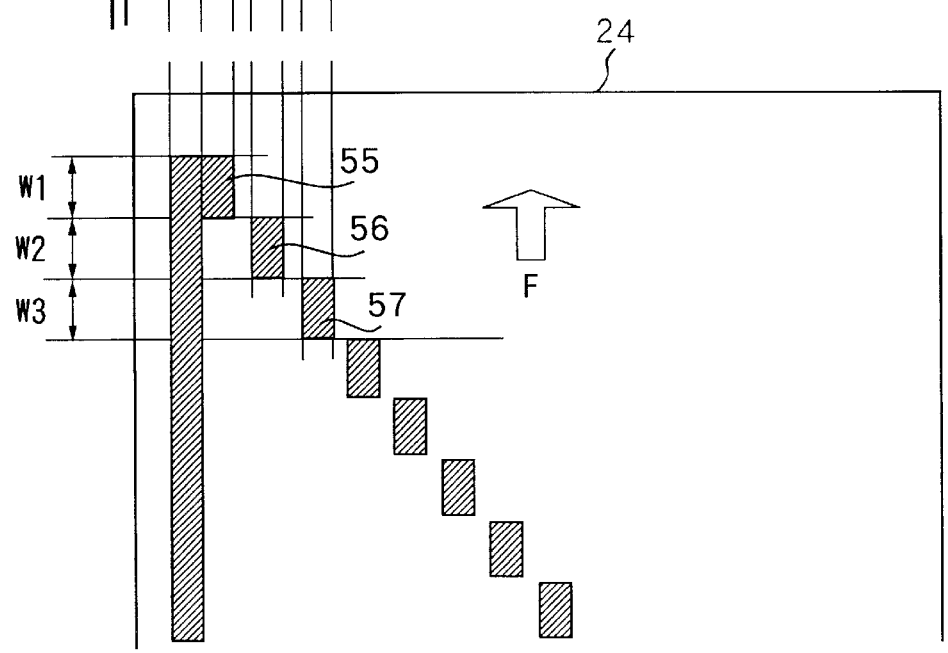
FIG.27B

FIG.29

| (0, 0) | (1, 0) |
|--------|--------|
| (0, 1) | (1, 1) |

FIG.30
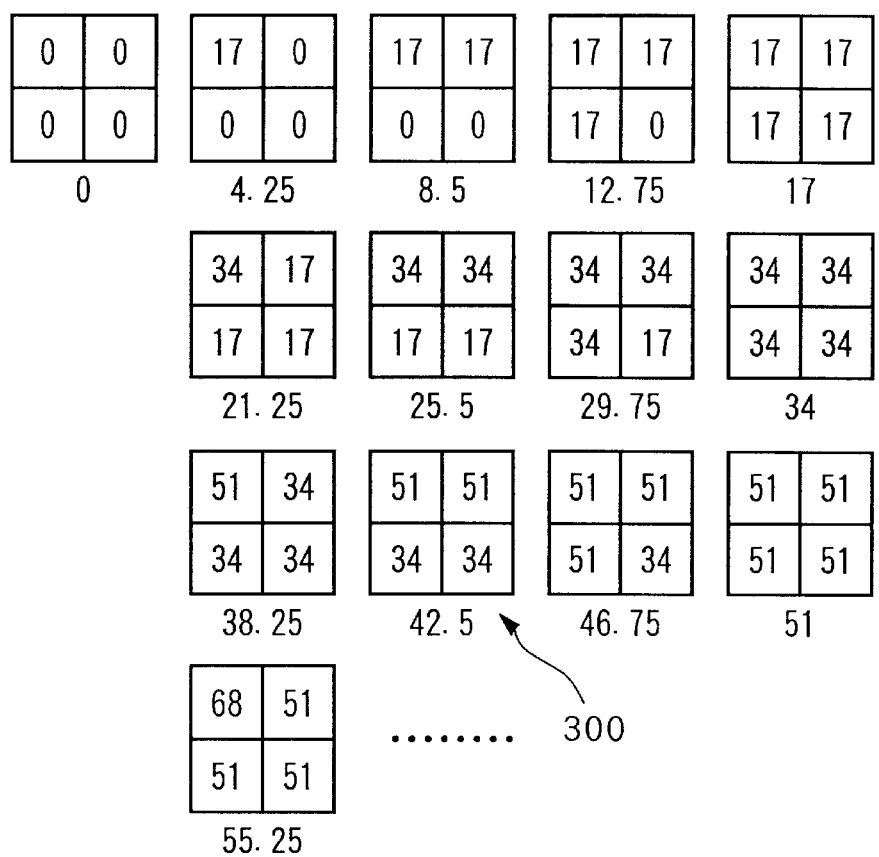
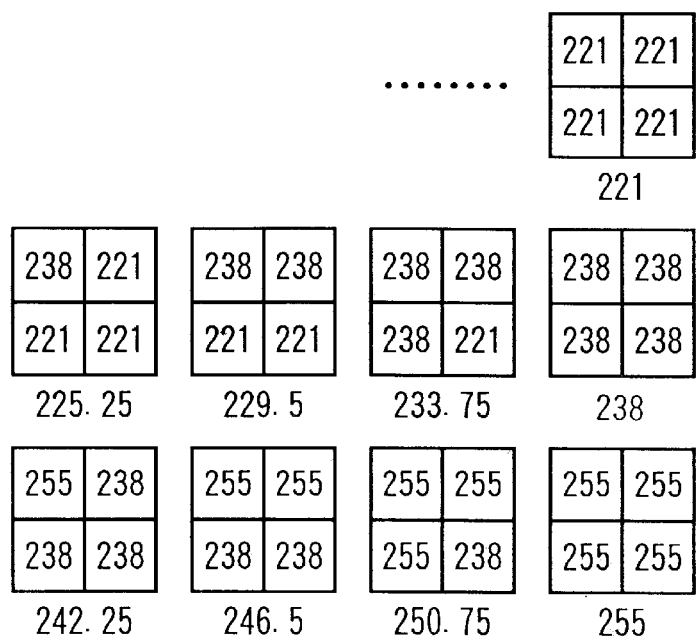

FIG.31

| COMBINATION NO. | MATRIX POSITION INK DENSITY RATIO | | | | (0,0) | | | | (1,0) | | | | (0,1) | | | | (1,1) | | | | MATRIX SUPERIMPOSE TRANSMISSION DENSITY |
|---|---|---|---|---|---|---|---|---|---|---|---|---|---|---|---|---|---|---|---|---|---|
| | | D1 | D2 | D3 | D4 | D1 | D2 | D3 | D4 | D1 | D2 | D3 | D4 | D1 | D2 | D3 | D4 | | | | |
| | TRANSMISSION DENSITY | 1 0.16D | 2 0.32D | 4 0.64D | 8 1.28D | | | | | | | | | | | | | | | | |
| | TRANSMISSION SIGNAL (DENSITY SIGNAL CONVERSION VALUE) | 17 | 34 | 68 | 136 | | | | | | | | | | | | | | | | |
| | DENSITY DATA | d1 | d2 | d3 | d4 | d1 | d2 | d3 | d4 | d1 | d2 | d3 | d4 | d1 | d2 | d3 | d4 | | | | |
| 0 | 0 | 0 | 0 | 0 | 0 | 0 | 0 | 0 | 0 | 0 | 0 | 0 | 0 | 0 | 0 | 0 | 0 | 0.00D |
| 1 | 4.25 | 1 | 0 | 0 | 0 | 1 | 0 | 0 | 0 | 0 | 0 | 0 | 0 | 0 | 0 | 0 | 0 | 0.04D |
| 2 | 8.5 | 1 | 0 | 0 | 0 | 0 | 1 | 0 | 0 | 0 | 0 | 0 | 0 | 0 | 0 | 0 | 0 | 0.08D |
| 3 | 12.75 | 1 | 0 | 0 | 0 | 1 | 1 | 0 | 0 | 0 | 0 | 0 | 0 | 0 | 0 | 0 | 0 | 0.12D |
| 4 | 17 | 0 | 1 | 0 | 0 | 1 | 0 | 0 | 0 | 1 | 0 | 0 | 0 | 0 | 0 | 0 | 0 | 0.16D |
| 5 | 21.25 | 0 | 1 | 0 | 0 | 1 | 1 | 0 | 0 | 1 | 0 | 0 | 0 | 0 | 0 | 0 | 0 | 0.20D |
| 6 | 25.5 | 0 | 1 | 0 | 0 | 0 | 1 | 0 | 0 | 1 | 1 | 0 | 0 | 0 | 0 | 0 | 0 | 0.24D |
| 7 | 29.75 | 0 | 1 | 0 | 0 | 1 | 1 | 0 | 0 | 1 | 1 | 0 | 0 | 0 | 0 | 0 | 0 | 0.28D |
| 8 | 34 | 1 | 1 | 0 | 0 | 1 | 1 | 0 | 0 | 1 | 1 | 0 | 0 | 1 | 0 | 0 | 0 | 0.32D |
| 9 | 38.25 | 1 | 1 | 0 | 0 | 1 | 1 | 0 | 0 | 0 | 0 | 1 | 0 | 1 | 0 | 0 | 0 | 0.36D |
| 10 | 42.5 | 1 | 1 | 0 | 0 | 0 | 0 | 1 | 0 | 1 | 1 | 0 | 0 | 1 | 0 | 0 | 0 | 0.40D |
| 11 | 46.75 | 1 | 1 | 0 | 0 | 0 | 1 | 1 | 0 | 0 | 1 | 1 | 0 | 1 | 0 | 0 | 0 | 0.44D |
| 12 | 51 | 0 | 0 | 1 | 0 | 1 | 0 | 1 | 0 | 1 | 0 | 1 | 0 | 1 | 0 | 0 | 0 | 0.48D |
| 13 | 55.25 | 1 | 0 | 1 | 0 | 1 | 1 | 1 | 0 | 1 | 1 | 1 | 0 | 1 | 0 | 0 | 0 | 0.52D |
| ... | ... | . | . | . | . | . | . | . | . | . | . | . | . | . | . | . | . | . . |
| 52 | 221 | 1 | 0 | 0 | 1 | 1 | 0 | 1 | 1 | 0 | 1 | 1 | 1 | 1 | 1 | 1 | 1 | 2.08D |
| 53 | 225.25 | 0 | 1 | 0 | 1 | 0 | 1 | 1 | 1 | 0 | 1 | 1 | 1 | 1 | 1 | 1 | 1 | 2.12D |
| 54 | 229.5 | 0 | 1 | 0 | 1 | 1 | 1 | 1 | 1 | 0 | 1 | 1 | 1 | 1 | 1 | 1 | 1 | 2.16D |
| 55 | 233.75 | 0 | 1 | 0 | 1 | 1 | 0 | 1 | 1 | 1 | 1 | 1 | 1 | 1 | 1 | 1 | 1 | 2.20D |
| 56 | 238 | 0 | 1 | 1 | 1 | 1 | 1 | 1 | 1 | 1 | 1 | 1 | 1 | 0 | 1 | 1 | 1 | 2.24D |
| 57 | 242.25 | 1 | 1 | 1 | 1 | 0 | 1 | 1 | 1 | 1 | 1 | 1 | 1 | 0 | 1 | 1 | 1 | 2.28D |
| 58 | 246.5 | 1 | 1 | 1 | 1 | 1 | 1 | 1 | 1 | 1 | 1 | 1 | 1 | 0 | 1 | 1 | 1 | 2.32D |
| 59 | 250.75 | 1 | 1 | 1 | 1 | 1 | 1 | 1 | 1 | 1 | 1 | 1 | 1 | 0 | 1 | 1 | 1 | 2.36D |
| 60 | 255 | 1 | 1 | 1 | 1 | 1 | 1 | 1 | 1 | 1 | 1 | 1 | 1 | 1 | 1 | 1 | 1 | 2.40D |

THIN ←————————————————→ THICK

1 : DISCHARGING   0 : NON-DISCHARGING

IMAGE PROCESSING METHOD AND APPARATUS AND RECORDING APPARATUS

BACKGROUND OF THE INVENTION

The present invention relates to an image processing method and apparatus for generating image data for recording an image by using recording materials having different densities, and a recording apparatus for recording an image by using the recording materials, each having different densities.

Printing apparatuses such as printers, copying machines, and facsimile apparatuses are designed to print an image consisting of a dot pattern on a printing medium such as a paper sheet or thin plastic plate on the basis of image information. Such printing apparatuses are classified according to their printing schemes into an ink-jet type, wire dot type, thermal type, laser beam type, and the like.

Of these types, the ink-jet type (ink-jet printing apparatus) is designed to print an image by discharging/spraying ink (printing solution) droplets from the orifices of a print head and making them adhere to a printing medium.

With the recent spread of computers, many printing apparatuses have been used, and there have been increasing demands for these apparatuses to realize high-speed printing, high resolution, high image quality, low noise, and the like. As printing apparatuses that can meet such demands, the above ink-jet printing apparatuses have become rapidly popular because they are relatively compact and capable of facilitating color printing.

As ink-jet printing apparatuses, an apparatus using a print head having an array of orifices to realize high printing speed and an apparatus having a plurality of print heads to be capable of color printing have been widely used. In consideration of the demands for high resolution and high image quality, halftone processing methods such as a dither method and an error diffusion method are used in these ink-jet printing apparatuses as methods of faithfully reproducing the gradation of image information.

According to these gradation reproduction methods, when a printing apparatus has a high resolution (1,000 dots/inch or more), excellent gradation printing can be performed. If, however, a printing apparatus has a low resolution (about 360 to 720 dots/inch), the printed dots of a highlight portion become conspicuous, and the discontinuity of pixels tends to make an image look rough. For this reason, in order to increase the number of gradation levels, a method of converting each print dot itself into a multilevel dot is used. For example, according to a known method, the voltage to be applied to a print head, the pulse width, or the like is controlled to modulate the diameter of each print dot adhering to a printing medium, thereby reproducing gradation. However, such a method is highly environment-dependent, and hence the diameters of print dots remain unstable, and there is a limit to the minimum size of a print dot that can be printed. It is therefore difficult to stably reproduce gradation.

A density modulation method is also available, in which the density of dots in a dot matrix (predetermined area) is changed while the dot size remains the same. However, a very large area is required to increase the number of gradation levels, and hence the resolution decreases.

For improving the gradation characteristics and obtaining high-density, multilevel gradation images by using such an ink-jet-printing apparatus, for example, the following methods have been proposed and put into practice: a so-called multiple droplet method of forming one dot by landing a plurality of droplets onto substantially the same portion on a printing medium, and expressing gradation by changing the number of droplets to be landed on the portion; a printing method of reproducing gradation by forming at least two types of print dots, each having different density, by using a plurality of types of ink, each type of ink has different density from each other; and a combination of these methods.

As one of the pseudo gradation reproduction means, an error diffusion method (R. FLOYD & L. STEINBERG, "An Adaptive Algorithm for Spatial Grey Scale" SIDE75 DIGEST), pp. 33–37) is available.

According to Katoh, Y. Arai, Y. Yasuda, "Multilevel Error Diffusion Method" (National Conference of Communication, Department in Showa 53 Year, Society of Electronic Communication in Japan (1973), pp. 504), an error diffusion method using a plurality of thresholds is realized, unlike the conventional error diffusion method using one fixed threshold. If, for example, image data ranges from 0 to 255, error diffusion is performed using "128" as a threshold to obtain binary data in the prior art. In contrast to this, in the "multilevel error diffusion method" by Katoh et al., when a halftone image is to be printed with two different ink densities, "85" and "175" are set as thresholds to obtain ternary print data with two different density values. Furthermore, efforts have recently been made to realize a method of obtaining multilevel data with three or more different density values and expressing a high-definition image.

As recovery means used for an ink-jet print apparatus when the print quality deteriorates, suction means and pressurizing means are used to remove foreign substances and bubbles from liquid paths by discharging ink from the nozzles of the print head. Alternatively, ink coagulations near orifices are removed by cleaning the ink discharge surfaces with a wiper. In addition, since ink adhering to the orifice surfaces of the print head upon discharging of the ink may cause a discharge failure, the orifice surfaces of the print head are wiped at a predetermined timing.

Furthermore, to discharge ink whose viscosity has increased upon evaporation of the solvent from an unused nozzle during printing operation, preliminary discharging, which differs from discharging for printing, is performed at a predetermined timing. With this operation, fresh ink is always supplied to each nozzle to perform stable printing.

In this method, however, although fresh ink is supplied to a nozzle by the above recovery operation, the solvent in the ink gradually evaporates from the nozzle tip immediately after the recovery operation, resulting in an increase in ink density in the nozzle tip with time. In the multiple droplet method or the method of expressing gradation by using several types of ink, each color of the ink having similar color and different density, in particular, the gradation balance deteriorates with an increase in ink density, and the gradation loses smoothness. As a result, pseudo contours are generated, and the image quality deteriorates in some case.

SUMMARY OF THE INVENTION

The present invention has been made in consideration of the prior art described above, and has as its object to provide an image processing method and apparatus in which, when a plurality of recording materials are to be recorded and overlaid in accordance with the density of image data, density changes of these recording materials are predicted, and data for determining recording materials to be used for recording are generated on the basis of the predicted density values, and a recording apparatus for recording an image by using these recording materials.

It is an object of the present invention to provide an image processing method and apparatus in which when a plurality of recording materials of a color which have different densities are recorded and overlaid on substantially the same portion on a recording medium to form one pixel so as to express gradation. Density changes of the respective recording materials are predicted to change the combination of recording materials to be overlaid, and a recording apparatus for recording an image by using these recording materials.

It is another object of the present invention to provide an image processing method and apparatus for predicting density changes of recording materials in accordance with an environment, and generating data for determining recording materials to be used for recording on the basis of the predicted density values, and providing a recording apparatus for recording an image by using these recording materials.

It is still another object of the present invention provide an image processing method and apparatus for predicting density changes of recording materials in the above manner, performing recording upon determining recording materials to be used for recording on the basis of the predicted density values, and performing density interpolation by distributing, to pixels around a target pixel, the error between the density value of the target pixel to be recorded and the actual density value of the image data, thereby generating image data with improved gradation reproducibility, and providing a recording apparatus for recording an image by using these recording materials.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 3 is a view showing an example of an ink type distribution table in the first embodiment;

FIG. 6 is a view showing an example of entries of an ink type distribution table and an example of a table storing ink densities and superimposed transmission densities in the first embodiment;

FIG. 9 is a view showing an example of an ink density change characteristic table in the first embodiment;

FIGS. 10A and 10B are views for explaining printing processing performed by main scanning operation in the printer unit of the first embodiment;

FIG. 12 is a view showing an example of the table obtained by adding multilevel error diffusion thresholds and values corresponding to the image density signal levels of the transmission densities of types of ink to the ink type distribution table in the first embodiment;

FIG. 21 is a graph showing the movement characteristics of a carriage in the third embodiment;

FIGS. 22A to 22C are views for explaining printing processing performed by main scanning operation in a printer unit an the movement characteristics of the carriage in the third embodiment;

FIGS. 26A and 26B are graphs showing an example of how an ink density increases in the sixth embodiment;

FIGS. 27A and 27B are views for explaining how a test pattern is printed by main scanning operation in a printer unit in the sixth embodiment;

FIG. 29 is for explaining the positions of the dots of a 2×2 dither matrix in the seventh embodiment;

FIG. 30 is a view for explaining superimposed transmission densities that can be expressed in the form of a matrix pattern; and FIG. 31 is a view showing an example of entries of an ink type distribution table that can be expressed in the form of a matrix pattern and an example of a table storing ink densities and superimposed transmission densities.

DETAILED DESCRIPTION OF THE PREFERRED EMBODIMENTS

Figure 1:
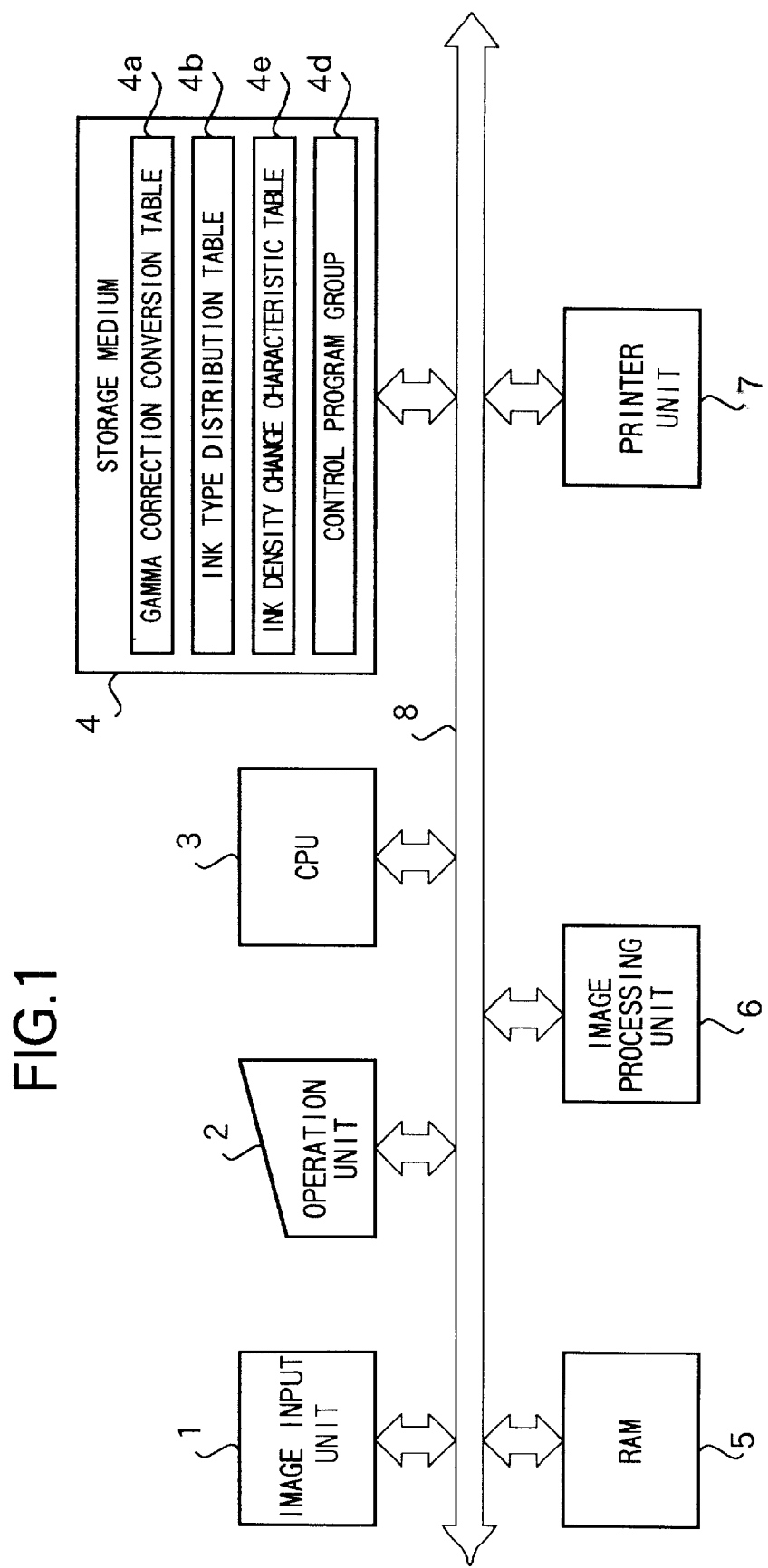
FIG. 1 is a block diagram showing the construction of an in ink-jet printing apparatus according to the first embodiment of the present invention.

The preferred embodiments of the present invention will be described in detail below with reference to the accompanying drawings. For the sake of simplicity, an embodiment will be described by exemplifying the case wherein a transmission image is printed by using an ink/film system having an additive property.

[Additive Property]

An ink/film system having an additive property is a system in which, when an image is to be printed on a transparency film which is used to print a transmission image by using the ink-jet method, the density of a given pixel increases if ink is superimposed a plurality of number of times at the same pixel position.

For example, such an additive property holds for the following case.

When a 2% solution of dye-based C. I. Direct Black 19 is uniformly printed on a transparency film (CF-301) as a print sheet by using an ink-jet printer, an image having a transmission density of 0.8D is formed. Similarly, when a 1% solution of C. I. Direct Black 19 is uniformly printed on this sheet, an image having a transmission density of 0.4D is formed. In addition, an image having a transmission density of 1.2D can be formed by printing and superimposing these two types of ink, each having different density from each other. It has been confirmed by experiment that in this ink/film system, the additive property almost holds in the range of "0" to "2.5D".

In this ink/film system in which the additive property holds, the number of gradation levels can be greatly increased by superimposing a plurality of types of ink, each having different density at the same pixel position.

[Density of Ink]

The densities of types of ink used in an ink-jet head unit will be described next.

Consider first a case wherein an image is formed by using four types of ink. In this case, the four types of ink can be overlaid on one pixel without overflowing a printing medium. In addition, when an additive property holds, the number of gradation levels of an image that can be printed can be maximized by changing the combination of inks D1, D2, D3, and D4 to be discharged with the ratio of the densities of each ink being set to "1:2:4:8".

FIG. 3 shows the contents of an ink type distribution table to explain how plural types of ink are discharged in accordance with image data (density data).

Referring to FIG. 3, reference symbols d1 to d4 denote data indicating the discharging/non-discharging of the inks D1 to D4. Each of these data is binary data indicating the discharging of a corresponding ink with "1", and non-discharging with "0". If, for example, image data (density data) is "10", the inks D2 and D4 are discharged and overlaid at the same pixel position (d2=d4=1). In this case, since the density ratio of the inks D1 to D4 is set to "1:2:4:8" as described above, image data from "0" to "15" can be expressed by continuous densities by combining these types of ink. That is, if there are n different ink densities, and a printing medium can absorb the amount of ink overlaid at the same position n times, the ink density ratio that can express the maximum number of gradation levels of the color is $$D1{:}D2{:}\cdots{:}Di{:}\cdots{:}Dn = 1{:}2{:}\cdots{:}2^{i-1}{:}2^{n-1}$$

In this case, it is apparent that the maximum number Ds of gradation levels can be expressed as $$Ds = 1 + 2 + \cdots + 2^{i-1} + \cdots + 2^{n-1} + 1 = 2^n$$

In other words, with n types of ink, each having different density from each other, the number of gradation levels per pixel having the color can be set to the maximum number, i.e., $2^n$, by combining n types of ink represented by density ratios of $1{:}2{:}\cdots{:}2^{i-1}{:}\cdots{:}2^{n-1}$.

The embodiments will be described below with reference to the accompanying drawings. The arrangement of the ink-jet printing apparatus of each embodiment of the present invention to be described below is not limited to an arrangement to be described below. For example, conversion from image data into print data in the embodiments may be performed by a computer device such as a host computer or a printer driver or the like.

Each embodiment will be described taking an ink-jet printing apparatus as an example. The present invention is not limited to this. For example, the present invention may be applied to a color thermal transfer printing apparatus.

[First Embodiment]

FIG. 1 is a block diagram showing the construction of an ink-jet printing apparatus according to the first embodiment.

Referring to FIG. 1, reference numeral 1 denotes an image input unit such as a scanner; numeral 2 denotes an operation unit having various keys for setting various parameters and designating a print start; and numeral 3 denotes a CPU for controlling the overall printing apparatus according to various programs stored in a storage medium 4. The storage medium 4 stores programs such as control programs and error processing programs for operating this printing apparatus. All the operations of this embodiment are executed on the basis of this program. As the storage medium 4 storing such programs, a ROM, FD, CD-ROM, HD, memory card, magnetooptic disk, or the like can be used.

The storage medium 4 includes a gamma correction conversion table 4a to be referred to in gamma conversion processing, an ink type distribution table 4b to be referred to in ink type distribution processing to be described later, an ink density change characteristic table 4e storing data that indicates the degrees of increases in ink density with respect to non-discharge times and is referred to during multilevel gradation processing and ink type distribution processing, and a control program group 4d storing various programs.

Reference numeral 5 denotes a RAM that is used as a work area for various programs stored in the storage medium 4, a temporary saving area in error processing, and a work area in image processing. The tables 4a, 4b, 4d, and 4e in the storage medium 4 can be copied to the RAM 5. The contents of the tables may be changed, and the apparatus can perform image processing (to be described later) while referring to the changed tables. Reference numeral 6 denotes an image processing unit for generating a discharge pattern for realizing multilevel gradation by the ink-jet method on the basis of input image data; numeral 7 denotes a printer unit (printer engine) for forming a dot image on a printing medium such as print paper on the basis of the print data generated by the image processing unit 6 in image printing operation; and numeral 8 denotes a bus line that is used to connect the components described above and transmit address signals, data, control signals, and the like.

The image processing unit 6 in the first embodiment will be described next with reference to FIGS. 2A and 2B.

Figure 2A:
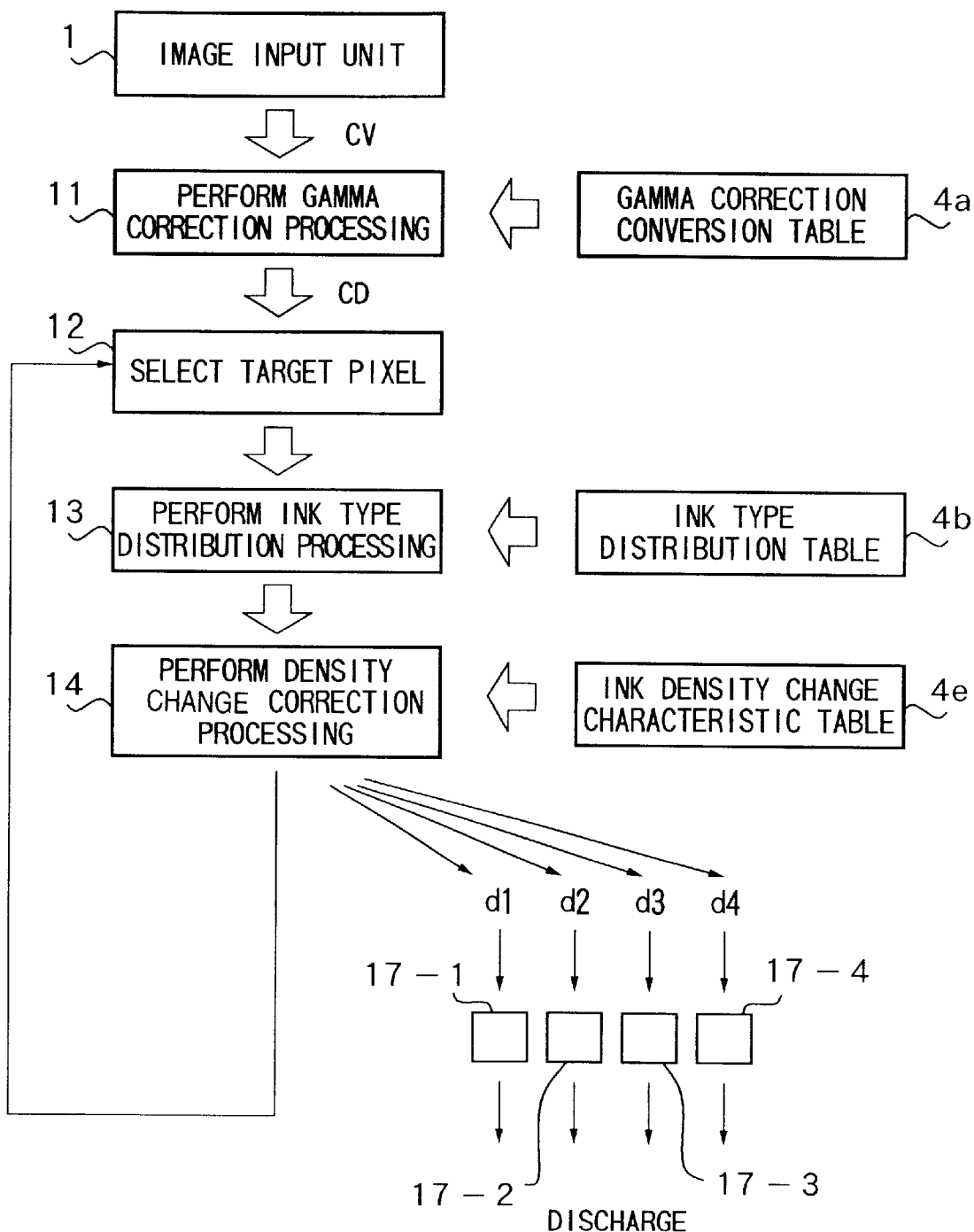
FIG. 2A is a flow chart for explaining the flow of image processing according to the first embodiment.

FIG. 2A shows the flow of processing in the image processing unit 6 in the first embodiment.

An image signal CV input by the image input unit 1 is input to gamma correction processing 11. In the gamma correction processing 11, the signal is converted into a density signal CD indicating a density by referring to the gamma correction conversion table 4a. The image density signal CD having undergone gamma correction in this manner is stored in a page memory area in the image processing work area of the RAM 5.

Target pixel selection processing 12 is performed to select one pixel, in the page memory area in the RAM 5, which is to be processed, and to obtain the density data CD of the selected pixel. Ink type distribution processing 13 is performed to refer to the ink type distribution table 4b on the basis of the density value (CD value) of the target pixel selected by the target pixel selection processing 12, and to select an ink combination candidate for expressing the density CD of the target pixel.

Density change correction processing 14 is performed to calculate the nonuse time of each nozzle and predict a specific variation in the density obtained by the ink combination selected by the ink type distribution processing 13 with respect to the ideal density by referring to the ink density change characteristic table 4e, which is linearly approximated by the least squares method. The ink combination selected by the ink type distribution processing 13 is changed, as needed, to determine the optimal ink density combination, i.e., the binary data d1, d2, d3, . . . that indicates the discharging/non-discharging of ink (heads) corresponding to the respective pixel densities.

In this manner, binary data for the target pixel are determined, and the respective binary data are sent to the corresponding ink-jet head units to execute printing.

Figure 2B:
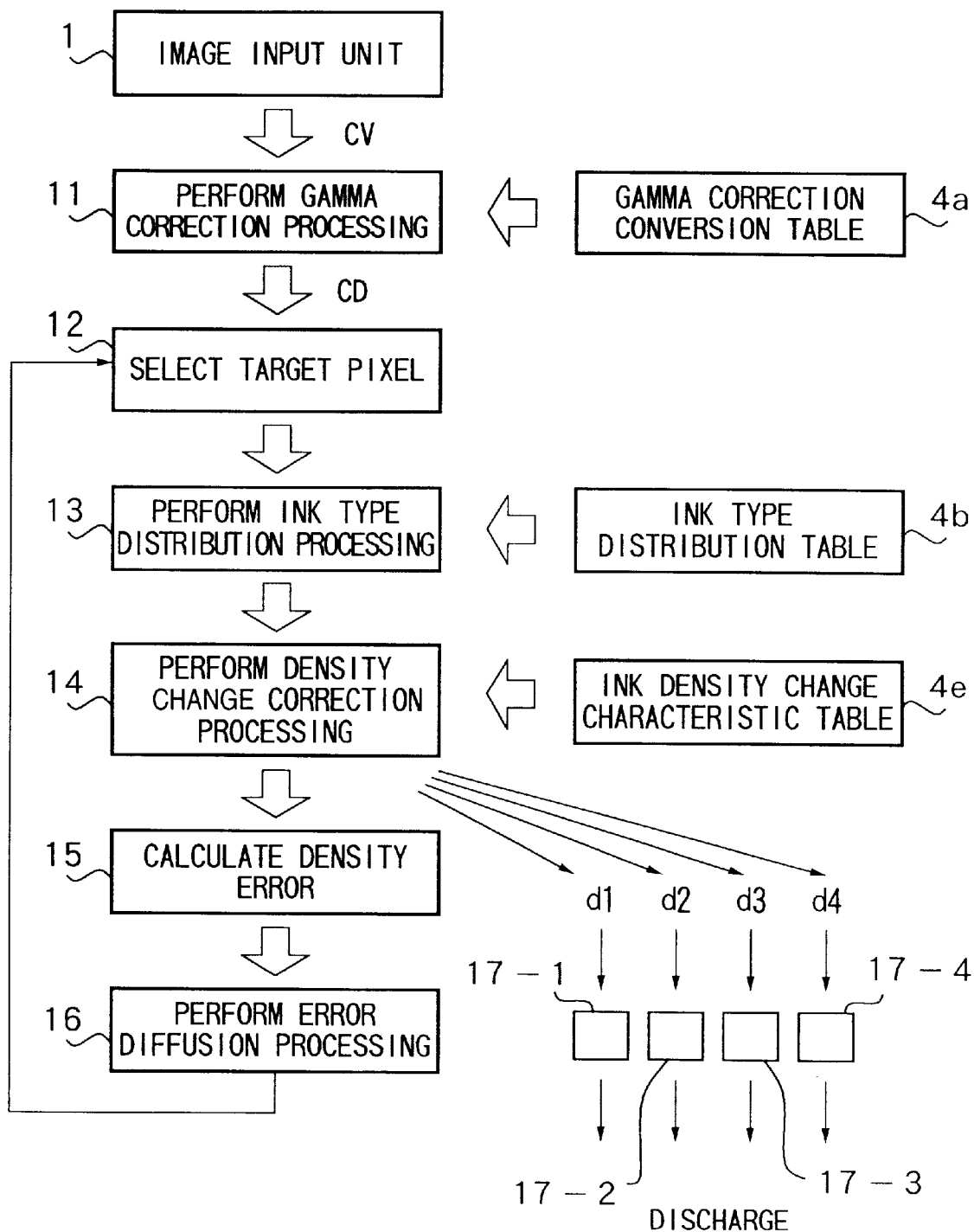
FIG. 2B is a flow chart for explaining a modification of the flow of image processing according to the first embodiment.

FIG. 2B shows a modification of the first embodiment. The same reference numerals in FIG. 2B denote the same parts as in FIG. 2A, and a description thereof will be omitted.

In this modification of the first embodiment, the error between the print density of the target pixel, which is printed after the above determination processing, and the density value of the target pixel is calculated, and error diffusion processing 16 is performed to distribute the error to pixels around the target pixel.

Density error calculation processing 15 is performed to calculate the difference between the CD value of the target pixel and the density that can be expressed by the ink combination determined by the density change correction processing 14. In the error diffusion processing 16, the error calculated by the density error calculation processing 15 is diffused to the pixels around the target pixel on the page memory of the RAM 5 in accordance with distribution coefficients.

The binary data d1, d2, d3, . . . indicating the discharging/non-discharging of ink per pixel are generated for the respective heads, each of which has ink having different density from each other, by repeating the above processing from the target pixel selection processing 12 to the error diffusion processing 16 with respect to all pixels of the image data input from the image input unit 1.

The printer unit 7 forms a multilevel gradation image by discharging ink from an orifice array corresponding to the ink-jet head,units for discharging ink, each having different density, in accordance with the binary data d1, d2, d3, . . . . . determined in this manner. Referring to FIGS. 2A and 2B, reference numerals 17-1, 17-2, . . . denote delay circuits for adjusting the timings of spraying and superimposing ink at the same pixel position from each orifice array.

The printer unit 7 in this embodiment will be described next with reference to FIG. 4.

Figure 4:
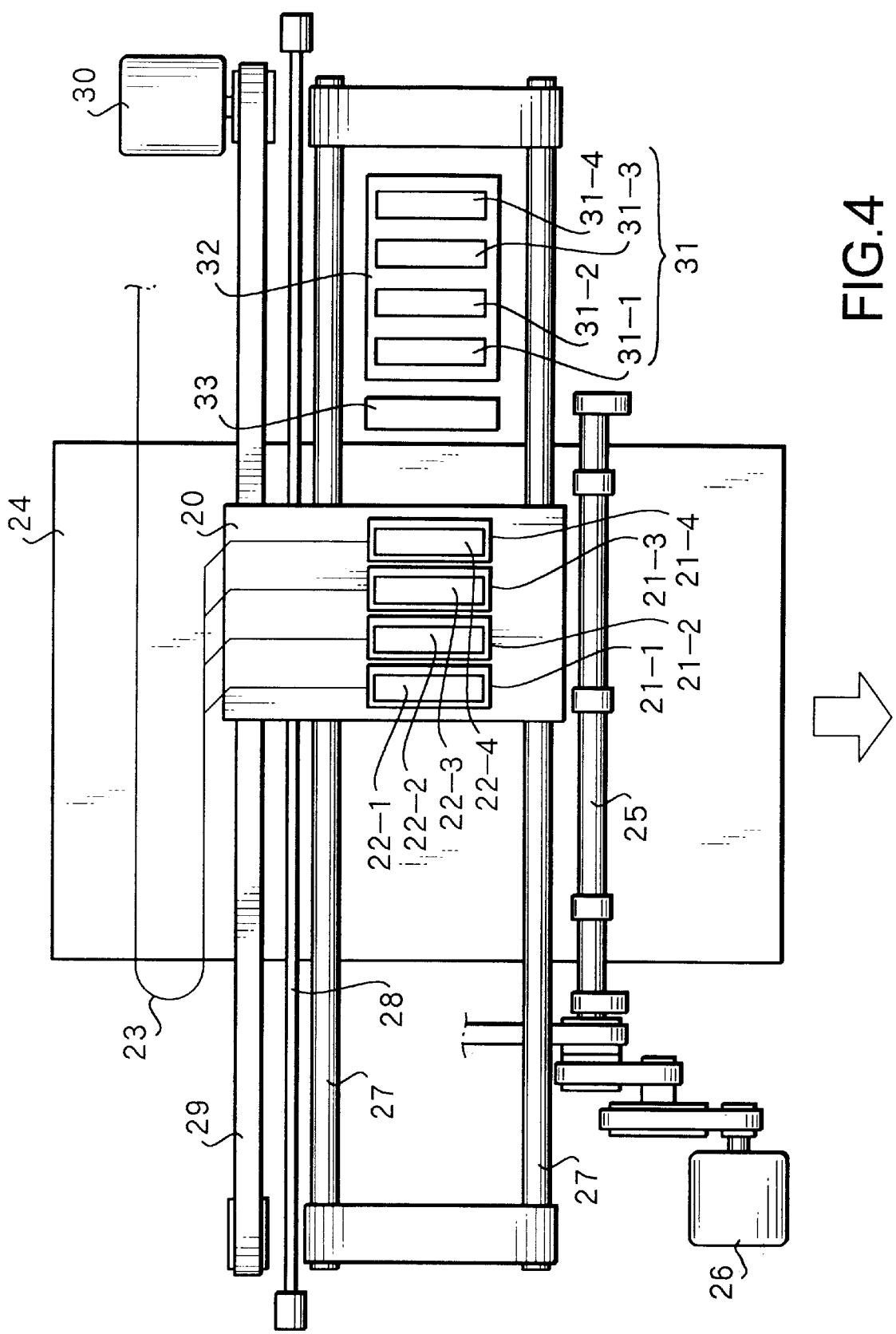
FIG. 4 is a view showing the construction of the main part of the printing mechanism of the ink-jet printing apparatus according to the first embodiment.

FIG. 4 is a schematic view showing the construction of the main part of the printer unit 7 in this embodiment.

A plurality of ink-jet head units 21-1 to 21-4 are mounted on a carriage 20. Each ink-jet head unit 21 has an orifice (nozzle) array for discharging ink. The respective ink-jet head units 21 are arranged at predetermined intervals. Consequently, the nozzle arrays of the respective ink-jet head units are arranged at predetermined intervals. Each type of ink supplied to the nozzle array of each of the ink-jet head units 21-1 to 21-4 is supplied from each of ink cartridges 22-1 to 22-4. The ink cartridges 22-1 to 22-4 are ink cartridges for supplying the inks D1, D2, D3, and D4, respectively. The density of ink stored in each ink cartridge will be described later. Controls signals, print signals, and the like are sent from the image processing unit 6 to these ink-jet head units 21 through a flexible cable 23.

Reference numeral 24 denotes a printing medium, e.g., print paper, a thin plastic plate, or the like, which is held by a paper discharge roller 25 through a convey roller (not shown) and conveyed in the direction indicated by the arrow during rotation of a convey motor 26; numeral 27 denotes a guide shaft for guiding and supporting the traveling of the carriage 20; and numeral 28 denotes a linear encoder for detecting the traveling position of the carriage 20. The carriage 20 is conveyed/driven by a carriage motor 30 through a driving belt 29 to reciprocate along the guide shaft 27.

Heating elements (electro-thermal transducers) for generating heat energy for ink discharge are provided inside (liquid paths) the orifices of the ink-jet head units 21 described above. The heating elements are driven on the basis of print data in accordance with the read timing of the linear encoder 28 to spray ink droplets onto the printing medium 24 in the order of the inks D1, D2, D3, and D4 and make the droplets adhere thereto, thereby forming an image on the printing medium 24.

A recovery unit 32 having a cap unit 31 (including caps 31-1 to 31-4) is mounted at the home position of the carriage 20 which is set outside a printable area by the ink-jet head units 21. With this arrangement, while printing is not performed, the carriage 20 is moved to the home position, and the caps 31-1 to 31-4 of the cap unit 31 are used to close the orifices of the corresponding ink-jet head units 21-1 to 21-4, thereby preventing the respective ink-jet head units from clogging up due to the coagulation of ink inside the orifices upon evaporation of the ink solvent or the adhesion of foreign substances such as dust.

The cap unit 31 is used to prevent orifices exhibiting low printing frequencies from causing discharge failures or clogging by performing idling discharge operation, i.e., discharging ink to the cap unit 31 at some distance from the orifices, or is used to perform discharge recovery operation for orifices that have caused discharge failures by driving a pump (not shown) to draw ink from the orifices while the orifices are capped with the cap unit 31. Reference numeral 33 denotes an ink reservoir to which ink is preliminary discharged from the ink-jet head units 21-1 to 21-4 when they pass over the ink reservoir 33 before printing operation. A blade and wiping member (not shown) can be mounted near the cap unit 31 to clean the orifice formation surfaces of the ink-jet head units 21-1 to 21-4.

Figure 5:
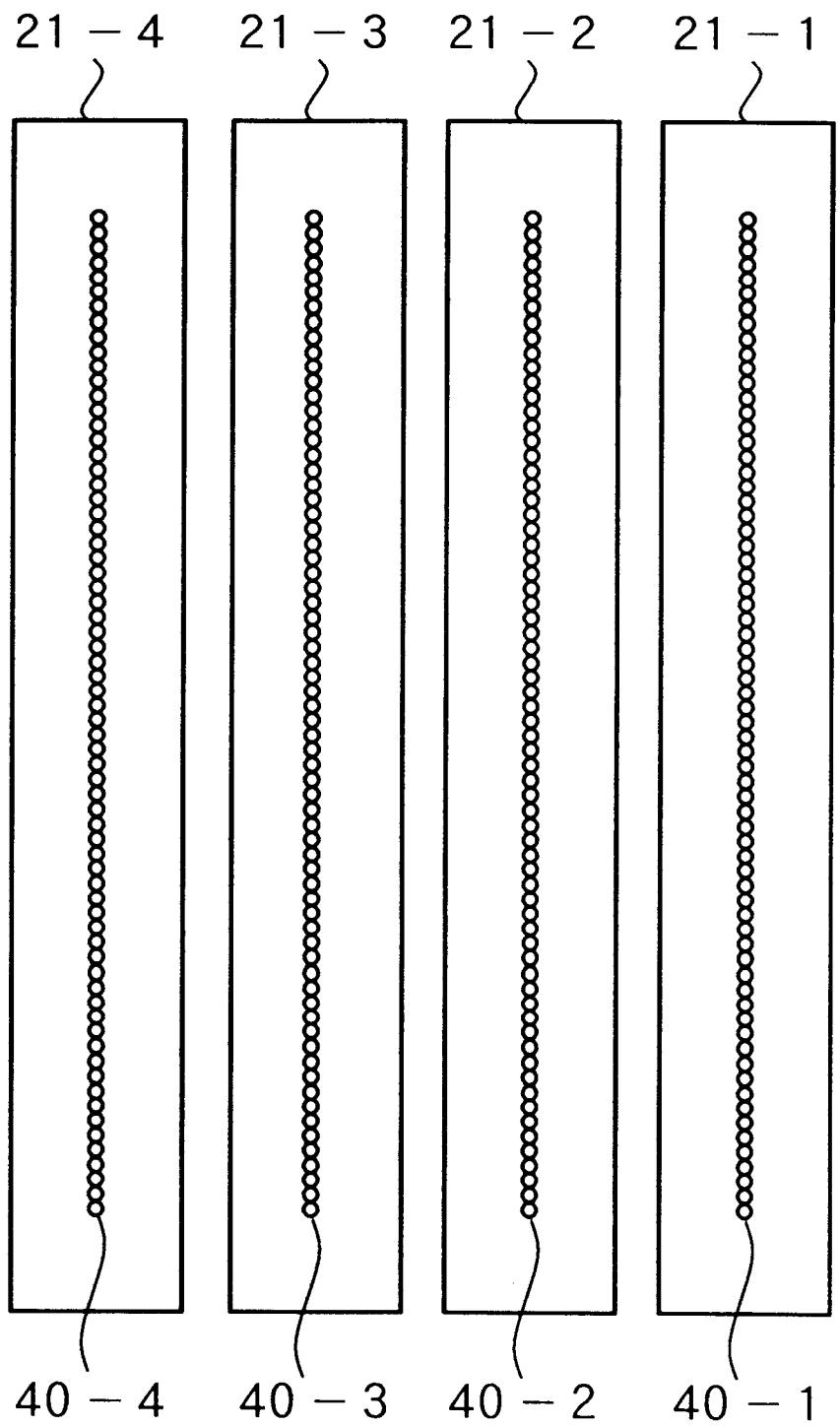
FIG. 5 is a view showing the construction of orifice arrays of ink-jet head units in the first embodiment.

FIG. 5 is a view showing the arrangement of orifices (nozzles) of the ink-jet head units 21-1 to 21-4 when viewed from the printing medium 24 side. The arrangement of the orifice arrays in the printer unit 7 and an image forming method according to this embodiment will be described with reference to FIG. 5.

Referring to FIG. 5, reference numerals 40-1 to 40-4 denote orifice arrays for discharging the inks D1 to D4, respectively. The orifice array of each unit has 256 orifices with a 600-dot (600-dpi) per inch in the vertical (sub-scanning) direction. With this arrangement, when the carriage 20 is scanned once in the main scanning direction, a 256-dot wide image in the sub-scanning direction can be formed by superimposing the four types of inks D1 to D4. This can shorten the print time and form a high-gradation image.

FIG. 6 shows the arrangement of the ink type distribution table 4b in this embodiment, and more specifically, an ink type distribution table storing binary data indicating ink discharging (1)/non-discharging (0) of the inks D1, D2, D3, and D4 in correspondence with image data (density data), the transmission densities of the inks D1, D2, D3, and D4, and superimposed transmission densities of superimposed discharge obtained by ink combinations.

In this case, each density data is expressed by eight bits, with a smaller value representing a lower density (thin) and a larger value representing a higher density (thick). For the sake of descriptive simplicity, the transmission density of a transparency film as a printing medium is set to "OD". In addition, the transmission densities of the inks D1, D2, D3, and D4 are expressed by the transmission densities obtained when 100% solid printing is performed by using each of types of the ink alone. The density ratio of the inks D1, D2, D3, and D4 is "1:2:4:8". Consider a case wherein 8-bit density data is expressed by 16 gradation levels from "OD" to "2.4D".

[Ink Density Change Graph]

Figure 7:
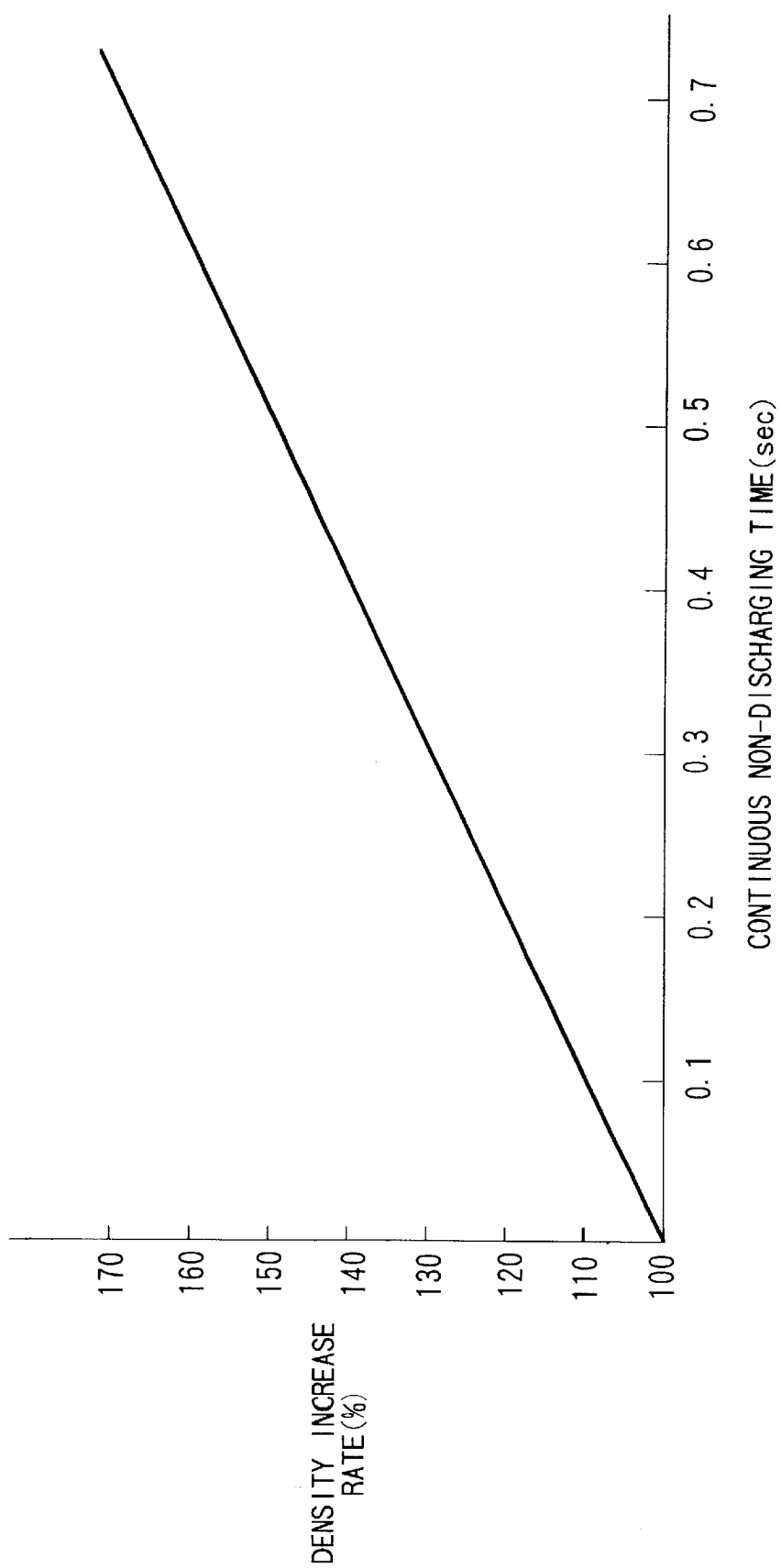
FIG. 7 is a graph for explaining the ink density increase rate with respect to the non-discharging time in the first embodiment.

FIG. 7 is a graph showing the density increase rate with respect to the non-discharge time of ink. This value is obtained by linearly approximating representative densities by the least squares method on the basis of experimental results. Referring to FIG. 7, the abscissa represents the continuous non-discharge time of ink; and the ordinate denotes the increase rate of the transmission density (OD) of ink. In this case, the "non-discharge time" is the time interval between the instant at which ink is discharged from one nozzle of an ink-jet head unit and the instant at which ink is discharged next from this nozzle.

Assume that in this embodiment, ink is discharged from the nozzle array of the ink-jet head unit 21 of the ink-jet printing apparatus at a frequency of 10 kHz. In solid printing, 10,000 ink droplets are discharged from the nozzle array of the ink-jet head unit 21 with a 600-dpi pitch. At this time, the carriage 20 scans a short side of an A3 sheet in about 0.7 sec at about 423.3 mm/sec.

As shown in FIG. 7, it is confirmed by experiment that the increase rate of the density of ink used in this embodiment is proportional to the continuous non-discharge time during scanning of the carriage 20 over a short side (297 mm) of an A3 sheet.

An increase in ink density during scanning for printing operation results from the evaporation of the ink solvent at each nozzle tip. Once the ink whose density has increased at a nozzle tip is discharged as an ink droplet, fresh ink is charged into the nozzle tip. As a result, the ink density at the nozzle tip returns to the specified (original) density before the increase in density.

Figure 8:
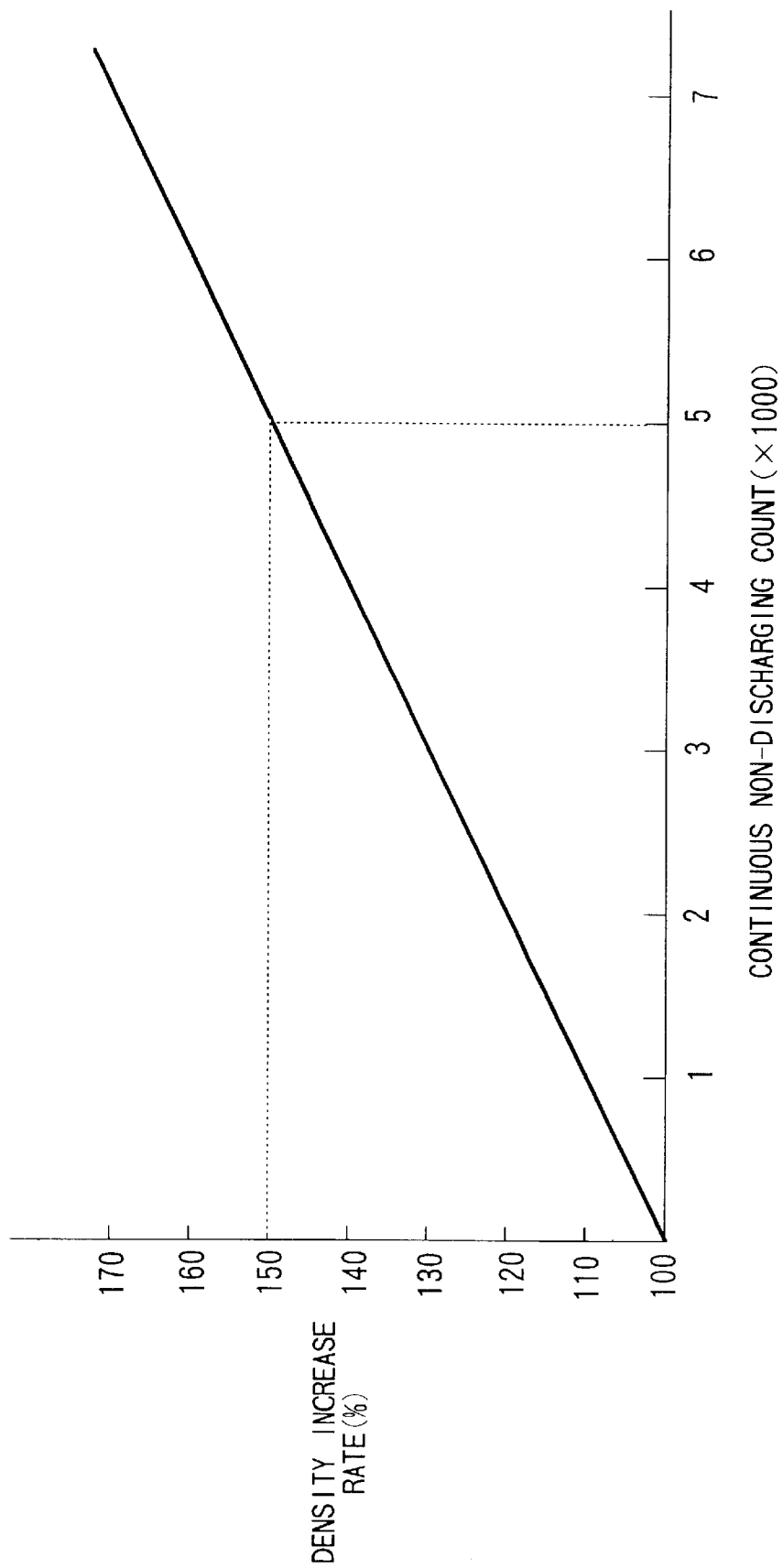
FIG. 8 is a graph showing an example of the ink density increase rate with respect to the non-discharging count in the first embodiment.

Referring to FIG. 8, the non-discharge time on the abscissa in FIG. 7 is expressed by a continuous non-discharging operation count at a discharge frequency of 10 kHz.

In generating binary data indicating the discharging/non-discharging of ink, an ink density increase is predicted on the basis of the continuous non-discharge count in the past by referring to this ink density increase graph, and the ink density value is corrected on the basis of the density increase. With this operation, an image having a desired density can be printed without being influenced by an ink density increase due to prolongation of ink non-discharge intervals.

In this embodiment, the ink density characteristics change table 4e (FIG. 9) is generated on the basis of the graph of FIG. 8 to allow the image processing unit 6 for performing image processing to easily refer to an ink density increase.

In this embodiment, as shown in FIG. 8, when a continuous non-discharge period reaches "5,000" (dots), the ink density increase rate is 150%. The contents of the ink density characteristics change table 4e will be described on the basis of this graph.

FIG. 9 shows an example of the ink density change characteristics table 4e in this embodiment.

The values shown in FIG. 9 are based the calculation results based on a density increase rate dD with respect to the continuous non-discharging operation count in FIG. 8, and are written in the ink density characteristics change table 4e in correspondence with the continuous non-discharging operation counts. By generating the ink density characteristics change table 4e, in which the calculation results are written in advance, the calculation amount in the image processing unit 6 can be reduced, resulting in an increase in processing speed. If the density increase rate dD is 4-byte data, an address offset occurs every four addresses in the ink density characteristics change table 4e.

Referring to FIG. 9, a continuous non-discharging operation count corresponds to an address offset, and can be made to correspond to the address by multiplying the non-discharge count by four. This value is added to the base address in the ink density characteristics change table 4e to obtain an access address. A density increase rate can be obtained by reading out the contents at the address. In addition, the ink density at the corresponding time can be predicted by multiplying this density increase rate by the original ink density to be obtained.

[Details of Image Processing Unit 6]

An example of the processing performed by the image processing unit 6 has been described with reference to FIGS. 2A and 2B. A method of generating binary data d1–d4 representing the discharging/non-discharging of ink will be described in detail below.

FIGS. 10A and 10B are schematic views showing the main scanning of the printer unit 7 in FIG. 4. FIG. 10A is a view showing the printing unit of the printer unit 7 when viewed from a side parallel to the recording surface of the printing medium 24 (direction parallel to FIG. 4). FIG. 10B is a view showing the printing medium 24 on the printing unit when viewed from above (direction perpendicular to FIG. 4).

When a print start signal is sent to the printer unit 7, the carriage 20, on which the ink-jet head units 21-1 to 21-4 are mounted, starts to move from the home position (not shown) in the direction indicated by an arrow S. The carriage 20 moves at a constant speed when the ink-jet head unit 21-1 passes over the ink reservoir 33. The ink-jet head units 21-1 to 21-4 pass over the ink reservoir 33 in the order named and preliminary discharge ink to the ink reservoir 33 at a position A (the position of the ink reservoir 33).

In this embodiment, a length B–C on the printing medium 24 corresponds to the print area, and printing is started from a position D.

An image having a width E–F in FIG. 10B is printed in the first scanning operation, and an image having a width F–G is printed in the next scanning operation. In this embodiment, ink is discharged from the nozzle array of each ink-jet head unit 21 of the ink-jet printing apparatus at a frequency of 10 kHz, and the print density in the main scanning direction is 600 dpi. The main scanning speed of the carriage 20 is therefore about 423.3 mm/sec. Assume that the distance from the preliminary discharging position A to the print start position D is 211.7 mm. On the basis of the above premises, each ink-jet head unit 21 reaches the print start position D at 0.5 sec after preliminary discharging, and starts printing in accordance with print data.

As described above, in ink discharging operation, since ink whose density has increased at each nozzle tip of the ink-jet head unit 21 is sprayed as an ink droplet, the ink density at the nozzle tip from which the ink is discharged is restored to the original value.

Assume that the density increase rate of each of the inks D1, D2, D3, and D4 exhibits the characteristics shown in FIGS. 7 and 8, in the use of the ink type distribution table 4b, the ink densities, superimpose densities corresponding to the density data in FIG. 6. In this case, in the case shown in FIGS. 10A and 10B, the ink density at each nozzle tip is restored to the original value immediately after preliminary discharging at the position A on the ink reservoir 33, and the ink density of each nozzle tip increases about 50% at the print start position D.

Figure 11:
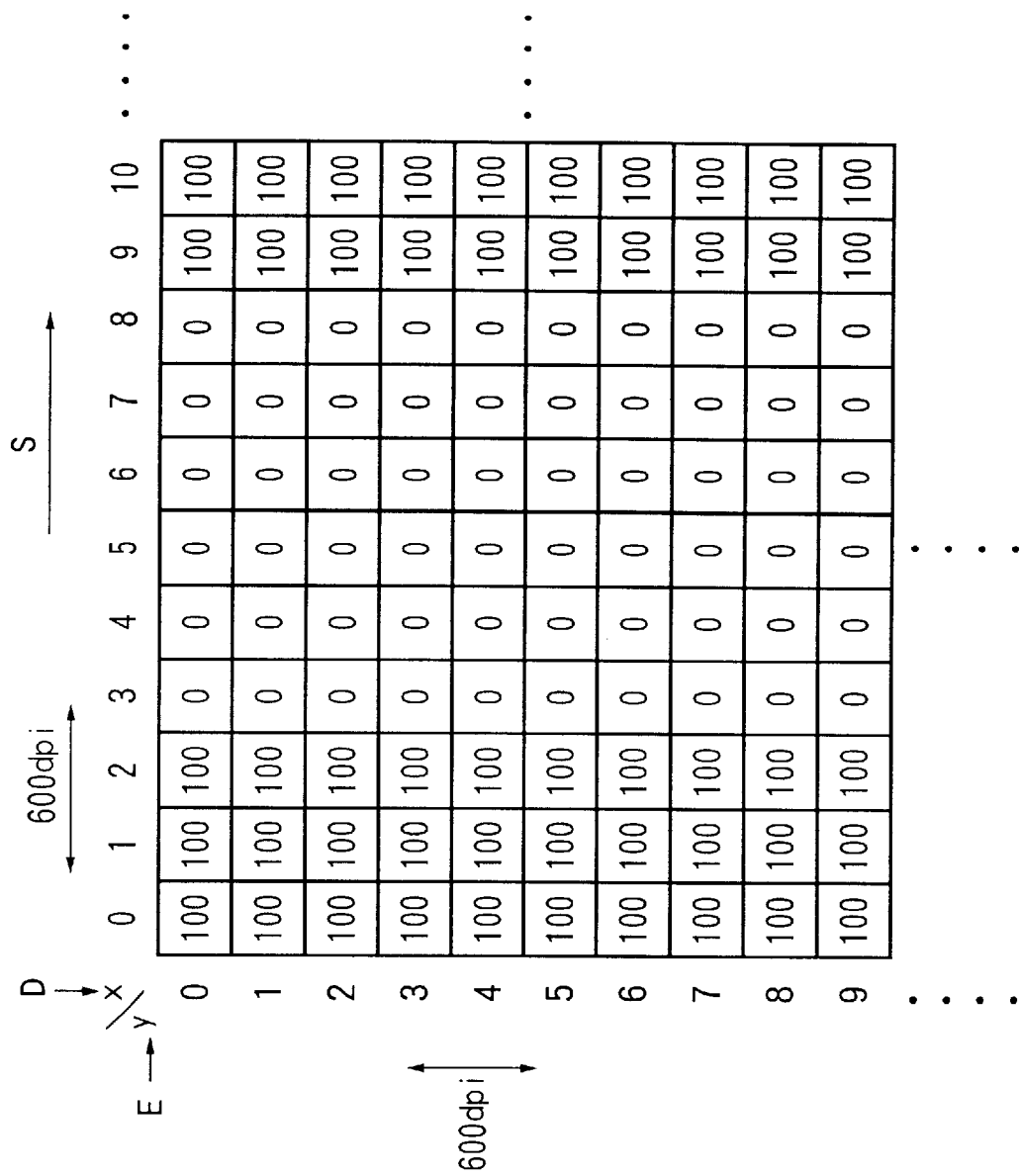
FIG. 11 is a view showing an example of the density data of an image stored in a page memory area in an image processing work area in the first embodiment.

FIG. 11 shows an example of the density data of image data stored in the page memory area in the image processing work area of the RAM 5 to print an image on the printing medium 24, as shown in FIGS. 10A and 10B. Referring to FIG. 11, reference symbols D, E, S, and the like correspond to the respective signals in FIGS. 10A and 10B, and one lattice in FIG. 11 corresponds to one pixel data of 600 (dpi) images to be printed.

Assume that in the case shown in FIG. 11, in one line, first, three pixels with density "100" consecutively appear, six pixels with density "0" follow, and a plurality of pixels with density "100" continue, and similar patterns consecutively appear in the following lines.

The relationship between the print density value (OD) and the density data in this embodiment can be expressed as follows:

OD=(2.4/255)×density data

As described above, since the density data and the OD value are proportional, print data corresponding to each ink is generated by predicting an ink density from the digital value of the density data instead of the OD value. That is, a 50% increase in OD value is equivalent to a 50% increase in density data.

On the other hand, referring to FIG. 8, every time the carriage 20 moves by a distance corresponding to one pixel, the ink density of each non-discharging nozzle increases 0.01%. If, however, the carriage 20 moves by a distance corresponding to 10 pixels or the like in the x direction in FIG. 11, the Ink density increase rate becomes 0.1%. For the sake of descriptive simplicity, therefore, an increase in ink density due to non-discharging of ink at these six consecutive pixels with density "0" will be neglected.

Assume that the transmission densities of the inks D1, D2, D3, and D4 in FIG. 6 correspond to "17", "34", "68", and "136", respectively.

FIG. 12 shows a table obtained by adding multilevel error diffusion thresholds corresponding to the processing in FIG. 2B and value corresponding to the density data of the transmission density of each type of ink, to the ink type distribution table 4b in FIG. 6.

Figure 13:
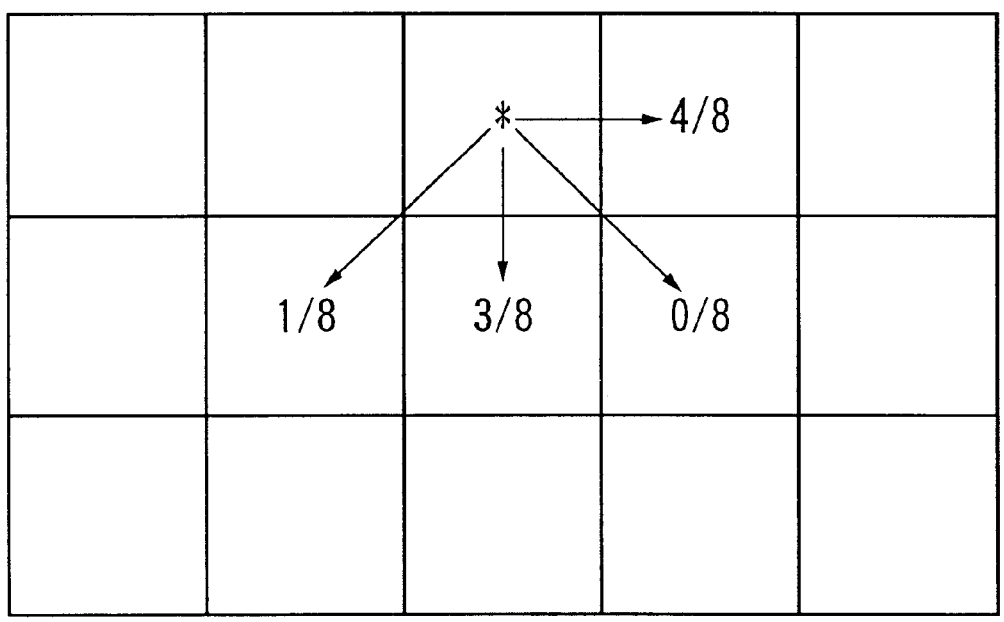
FIG. 13 is a view showing an example of weighting in distributing a target pixel error to neighboring pixels in multilevel error diffusion processing in the first embodiment.
Figure 14A:
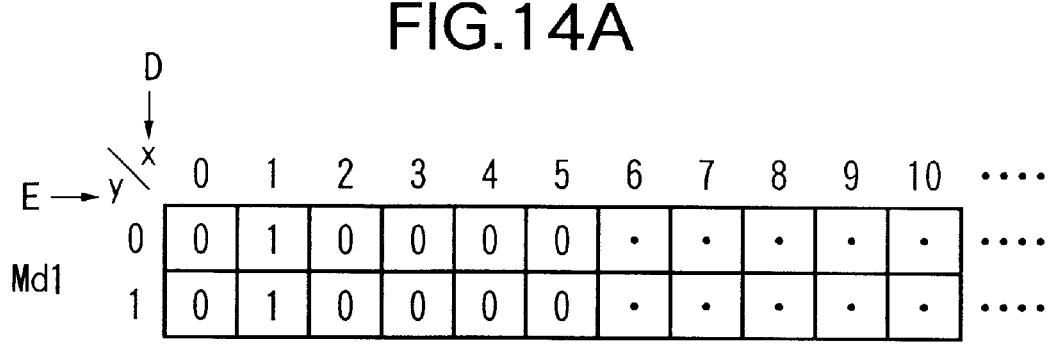
FIGS. 14A to 14D are views for explaining binary data (bit planes) Md1, Md2, Md3, and Md4 formed in a memory and indicating the discharging/non-discharging of inks D1, D2, D3, and D4 in the first embodiment.
Figure 14B:
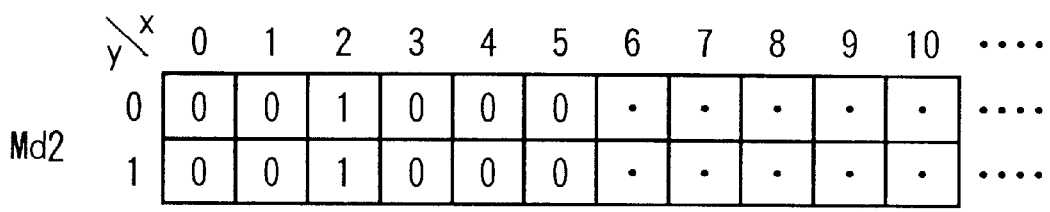
Figure 14C:
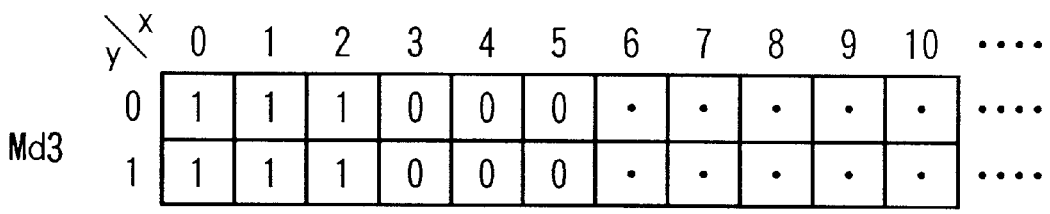
Figure 14D:
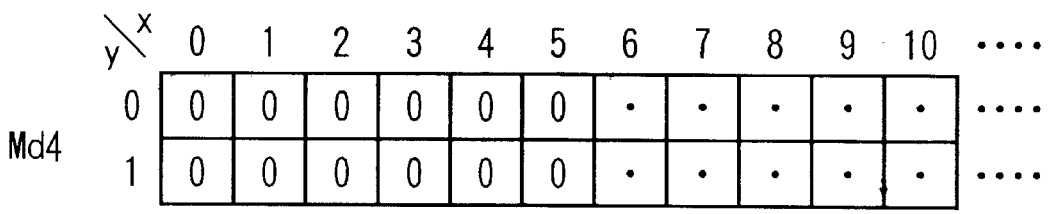

FIG. 13 shows an example of how weighting is performed to distribute an error in a target pixel to neighboring pixels of the target pixel in the multilevel error diffusion processing 16 (FIG. 2B) in the modification of the first embodiment described above. Referring to FIG. 13, reference symbol "*" denotes a target pixel. The difference (error) between the printed density (OD) and the density data which can be expressed by an ink combination is distributed to the pixels around the target pixel in accordance with the error distribution coefficients shown in FIG. 13.

Referring to FIG. 11, the numbers starting from "0", which are assigned to the upper and left sides, indicate the addresses of pixels. An arbitrary pixel is indicated by coordinates (x, y) with x and y respectively indicating the horizontal and vertical directions. That is, a pixel (0, 0) indicates the pixel at the upper left position in FIG. 11. In addition, since the ink-jet head units 21 move in the main scanning direction S, each pixel row in the main scanning direction corresponds to one nozzle of each of the ink-jet head units 21 with different ink densities.

First of all, processing is performed with the pixel (0, 0). The density data of the pixel (0, 0) is "100". In consideration of ink combinations in FIG. 12, a combination of the inks D2 and D3, which is indicated by the combination number (No. ) 6, is selected as a candidate. However, as described with reference to FIGS. 10A and 10B, when the ink-jet head units reach the print start position D, the ink densities of both the inks D2 and D3 have increased 50%. It can be predicted from this that the density of the ink D2 has increased from "34" to "51", and the density of the ink D3 has increased from "68" to "102". With the combination of the inks D2 and D3, therefore, the superimpose density becomes "153" which is higher than target density "102" by about 50%.

Consider a case wherein the density level of the ideal ink combination obtained from FIG. 12 is "102", and density "100" of the pixel (0, 0) is to be expressed. Since the density of the ink D2 has increased to "51", the ink D2 is not discharged, and only the ink D3 (predicted density "102") is discharged. With this operation, the predicted print density becomes "102". The ink combination determined in this manner is stored as binary data indicating the discharging/non-discharging of each ink at an address in a corresponding one of memories Md1, Md2, Md3, and Md4 (in FIGS. 14A–14D) In correspondence with the pixel.

The above description is associated with processing up to the density change correction processing 14 (corresponding to FIG. 2A). As described above, the binary data determined in this manner is output to each ink-jet head unit to print an image corresponding to the image density. Furthermore, the density error calculation 15 and the multilevel error diffusion processing 16 in FIG. 2B are executed. This case will be described below.

In this case, the difference/error is difference "−2" obtained by subtracting predicted density "102" that can be expressed from density data "100" of the pixel (0, 0). This difference is distributed to the pixels around the target pixel in accordance with the error distribution coefficients in FIG. 13 such that "−1" is distributed to the pixel (1, 0) at the right of the target pixel, and "−0.75" is distributed to the pixel (0, 1) immediately underneath the target pixel. When the errors are added to the density data of the respective neighboring pixels in this manner, the density data of the pixel (1, 0) is changed to "99", and the density data of the pixel (0, 1) is changed to The processing for the target pixel (0, 0) is terminated with the above operation, and the binary data d1, d2, d3, and d4 indicating the discharging/non-discharging of the inks D1, D2, D3, and D4 with respect to the pixel (0, 0) are determined (d1=d2=d4=0, d3=1).

The pixel (1, 0) at the right of the target pixel in FIG. 11 is set as the next target pixel. The density data of this pixel (1, 0) has become "99" by error diffusion from the pixel (0, 0) described above. As in the case with the pixel (0, 0), the combination of the inks D2 and D3 (density value "102"), which is indicated by the combination number (No.6) is selected as a candidate value nearest to the ideal value by referring to the table in FIG. 12. Since the ink D3 has been discharged to the pixel (0, 0) as described above, the density of the ink D3 is almost restored to the original value. In contrast to this, the density values of the remaining inks have been increased 50% as described above since no preliminary discharging is performed at the position A in FIG. 10A.

According to density prediction, the density levels of the inks D2 and D3 respectively become "51" and "68", and the density level of the combination of the inks D2 and D3 become "118". In addition, since the density of the ink D1 has increased 50%, the density value of this ink is "25.5" which is 1.5 times "17". Consequently, the density value of the combination of the inks D1 and D3 becomes "93.5", and hence the combination of the inks D1 and D3 can express density level "99" of the pixel (1, 0) more appropriately than the combination of the inks D2 and D3. In this case, therefore, the inks D1 and D3 are discharged. The ink combination determined in this manner is stored as binary data (d1=d3=1, D2=d4=0) indicating the discharging/non-discharging of each ink at an address of each of the memories Md1, Md2, Md3, and Md4 in correspondence with the pixel (1, 0) (see FIGS. 14A–14D).

At this time, the difference/error is difference "5.5" obtained by subtracting predicted density value "93.5" that can be expressed from density level "99" of the pixel (1, 0). This difference is distributed to the pixels around the target pixel in accordance with the error distribution coefficients in FIG. 13 such that "22/8" is distributed to the pixel (2, 0) at the right of the target pixel, "16.5/8" is distributed to the pixel (1, 1) immediately underneath the target pixel, and "5.5/8" is distributed to the lower left of the target pixel. These errors are respectively added to the density values of the pixels (2, 0), (1, 1), and (0, 1) around the target pixel.

Similarly, the pixel (2, 0) at the right of the target pixel is set as the next target pixel. The density data of this pixel (2, 0) has become "102.75" by error diffusion from the pixel (1, 0). The combination of the inks D2 and D3, which is indicated by the combination number (No. ) "6", is selected as a combination candidate by referring to the thresholds in FIG. 12. Since these inks D1 and D3 have been discharged to the pixel (1, 0), the densities of the inks D1 and D3 are restored to the original values. In contrast to this, the density values of the remaining inks have been increased 50% as described above since they are not discharged after preliminary discharging.

When density prediction is performed on the basis of the above condition, the density values of the inks D2 and D3 respectively become "51" and "68", and the density value of the combination of the inks D1 and D3 becomes "118". In addition, since the density of the combination of the inks D1 and D3 becomes "85", the combination of D2 and D3 can express density level "102.75" of the pixel (2, 0) more appropriately. In this manner, the inks D2 and D3 are discharged to print the pixel (2, 0). The ink combination determined in this manner is stored as a binary data (d2=d3=1, d1=d4=0) indicating the discharging/non-discharging of each ink at an address in each of the memories Md1, Md2, Md3, and Md4 at which the data of the pixel (2, 0) has been stored.

At this time, the difference/error is difference "−15.25" obtained by subtracting predicted density value "118" from image density value "102.75" of the pixel (2, 0). This difference is distributed to the pixels around the target pixel in accordance with the error distribution coefficients shown in FIG. 13 such that "−61/8" is distributed to the pixel (3, 0) at the right of the target pixel, "−45.75/8" is distributed to the pixel (2, 1) immediately underneath the target pixel, and "−15.25/8" is distributed to the pixel (1, 1) at the lower left of the target pixel. These errors are then added to the density data of these neighboring pixels (3, 0), (2, 1), and (1, 1).

In this manner, the above processing is performed for the sequentially selected target pixels in the main scanning direction S on the basis of the density data of the respective pixels of an image, thereby obtaining the binary data d1, d2, d3, and d4 indicating the discharging/non-discharging of ink from the respective ink-jet head units 21, each having different ink density, in units of pixels. These data are stored as binary data indicating the discharging/non-discharging of the respective ink at the addresses in the memories Md1, Md2, Md3, and Md4 at which the pixel data (density data) have been stored as shown in FIGS. 14A–14D.

When the processing for the pixel data of one main scanning line is complete in this manner, the first pixel (0, 1) on the next scanning line is set as the next target pixel, and processing is started in the main scanning direction S in the same manner as described above. At this time, as in the case with the pixel (0, 0) as the target pixel, processing is started on the basis of a prediction that the density of each ink has increased 50% at the target pixel (0, 1). Similar processing is repeated for each scanning line to generate binary data indicating the discharging/non-discharging of each ink. These data are then stored at the addresses in the memories at which the original pixel data have been stored.

FIGS. 14A to 14D show binary data (bit planes) Md1, Md2, Md3, and Md4 indicating the discharging/non-discharging of the inks D1, D2, D3, and D4 and generated in the RAM 5 in this embodiment. The ink-jet head units 21-1 to 21-4 are driven in synchronism with the traveling of the carriage 20 in accordance with these binary data. That is, the case shown in FIGS. 14A to 14D, the ink-jet head unit 21-1 is driven in accordance with the binary data in Md1; the ink-jet head unit 21-2, in accordance with the binary data in Md2; the ink-jet head unit 21-3, in accordance with the binary data in Md3; and the ink-jet head unit 21-4, in accordance with the binary data in Md4.

Figure 15:
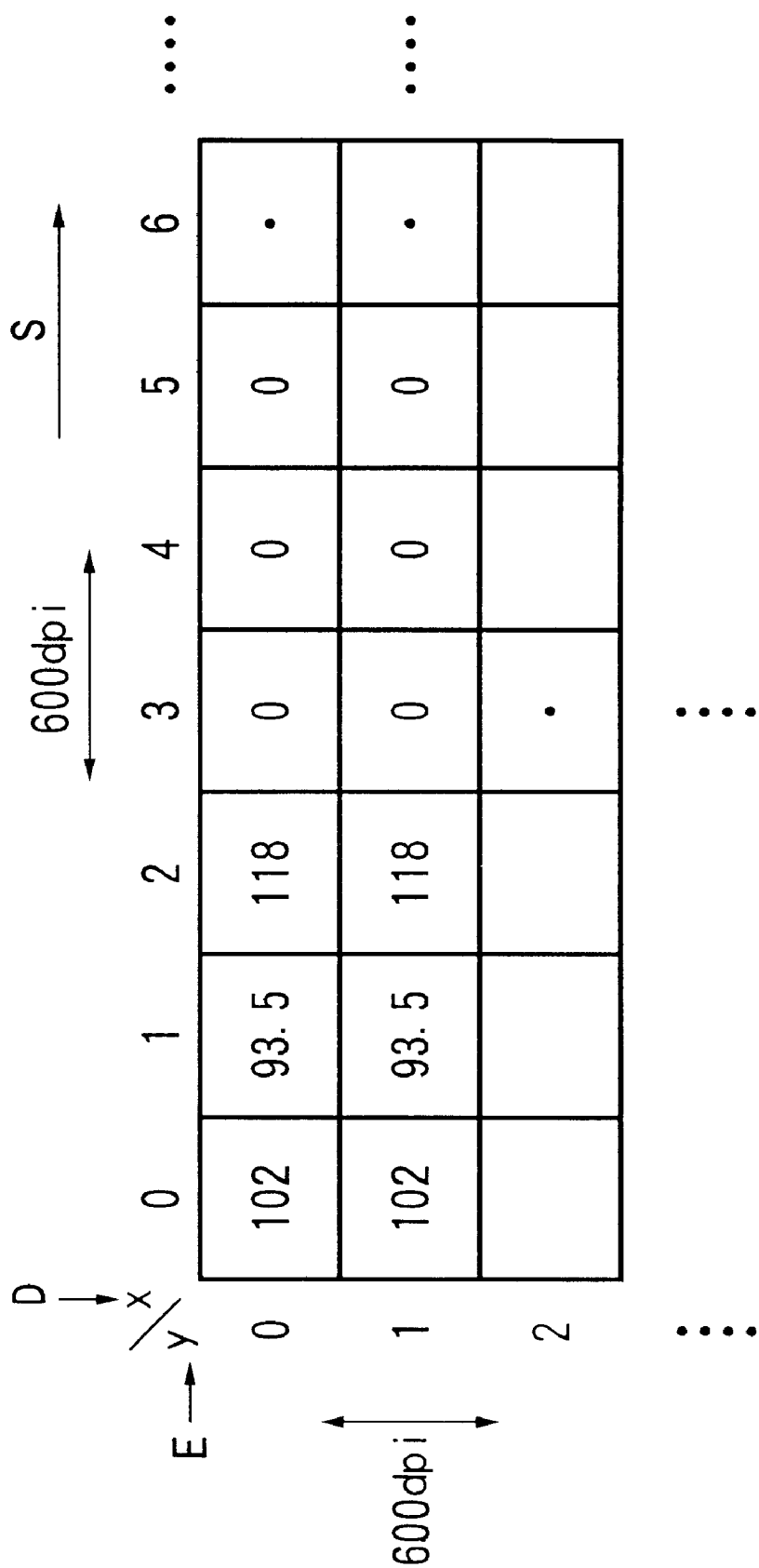
FIG. 15 is a view showing an example of printing based on the density signal in FIG. 11 in the first embodiment.

FIG. 15 shows a case wherein the ink combination is changed on the basis of the ink type distribution table 4b in this embodiment, and printing is performed by driving the respective ink-jet head units on the basis of the binary data shown in FIGS. 14A to 14D. FIG. 15 shows the actual print density levels (OD) in correspondence with the input density data shown in FIG. 11.

As shown in FIG. 15, an extreme increase in print density at the print start position D of the image can be suppressed.

That is, when no consideration is to be given to an increase in ink density, the print density value of the pixel (0, 0) having density "100" corresponds to the combination of the inks D2 and D3 in correspondence with density value "102" in FIG. 12, and the resultant print density becomes "147" (="51"+"96") due to a 50% increase in ink density. In contrast to this, according to this embodiment, this density can be suppressed to "102".

Although a description of the above density error calculation processing, error diffusion processing, and print processing based on binary data will be omitted in the following description of the second to sixth embodiments and their modifications, the basic principles remain the same in the following embodiments.

[Second Embodiment]

Figure 16:
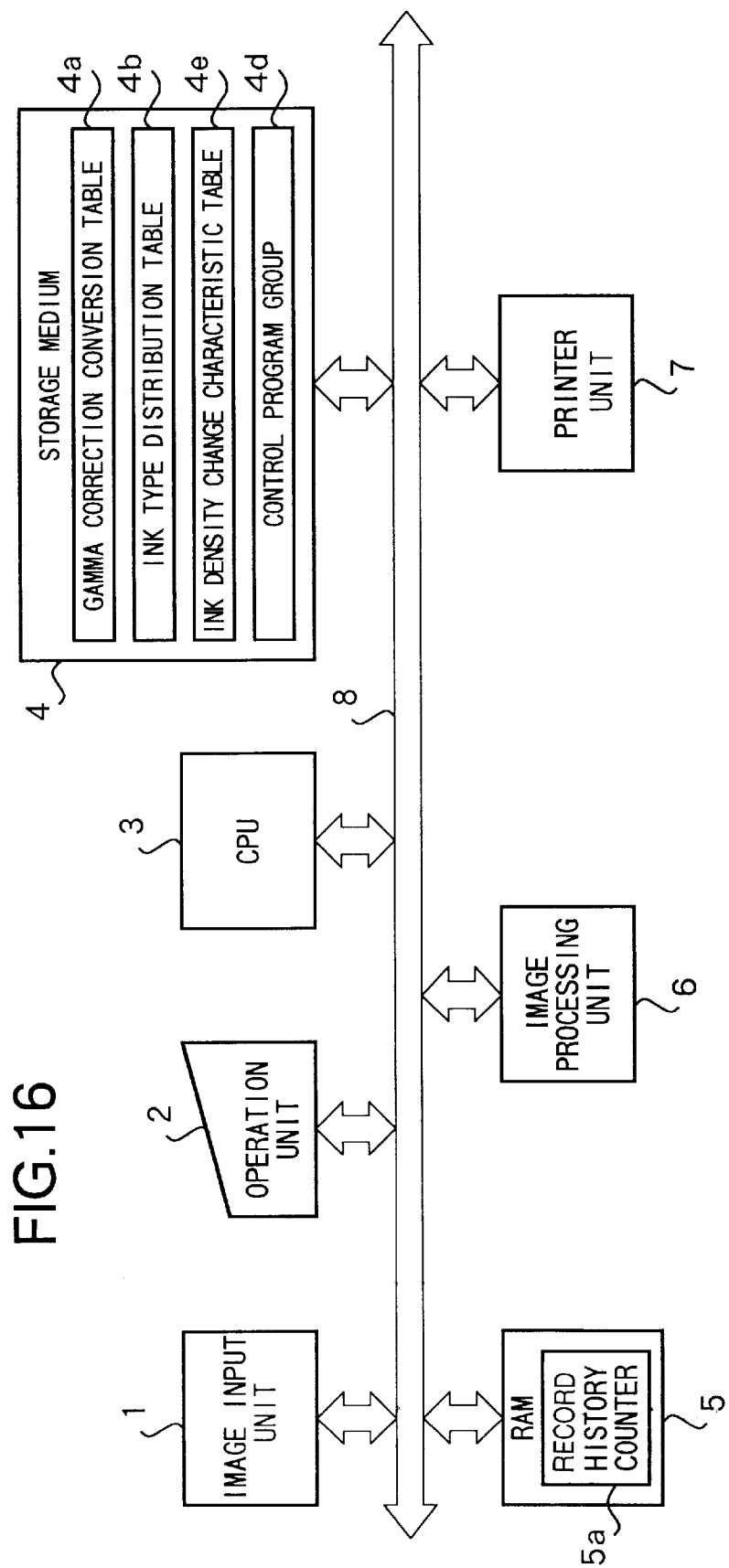
FIG. 16 is a block diagram showing the arrangement of an ink-jet printing apparatus according to the second embodiment of the present invention.

FIG. 16 is a block diagram showing the schematic arrangement of an ink-jet printing apparatus according to the second embodiment of the present invention. The same reference numerals in FIG. 16 denote the same parts as in FIG. 1. Since density error calculation processing 15 and error diffusion processing 16 are the same as those in the first embodiment, a description thereof will be omitted.

Reference numeral 4e denotes an ink density change characteristics table 4e (FIG. 9), in a storage medium 4, which indicates the ink density change characteristics of ink with respect to the continuous non-discharge time; numeral 5 denotes a RAM used as a work area for various programs in the storage medium 4, a temporary saving area in error processing, and a work area for image processing. The work area for various programs includes record history counters 5a that count the continuous non-discharging operation counts of the nozzles of the respective ink-jet head units and are used to predict density changes. In the RAM 5, after the tables in the storage medium 4 are copied, the contents of the tables can be changed, and image processing can be performed while the changed tables are referred to. In addition, in the RAM 5, the ink density characteristics change table 4e can be directly generated on the basis of density variation data.

Figure 17A:
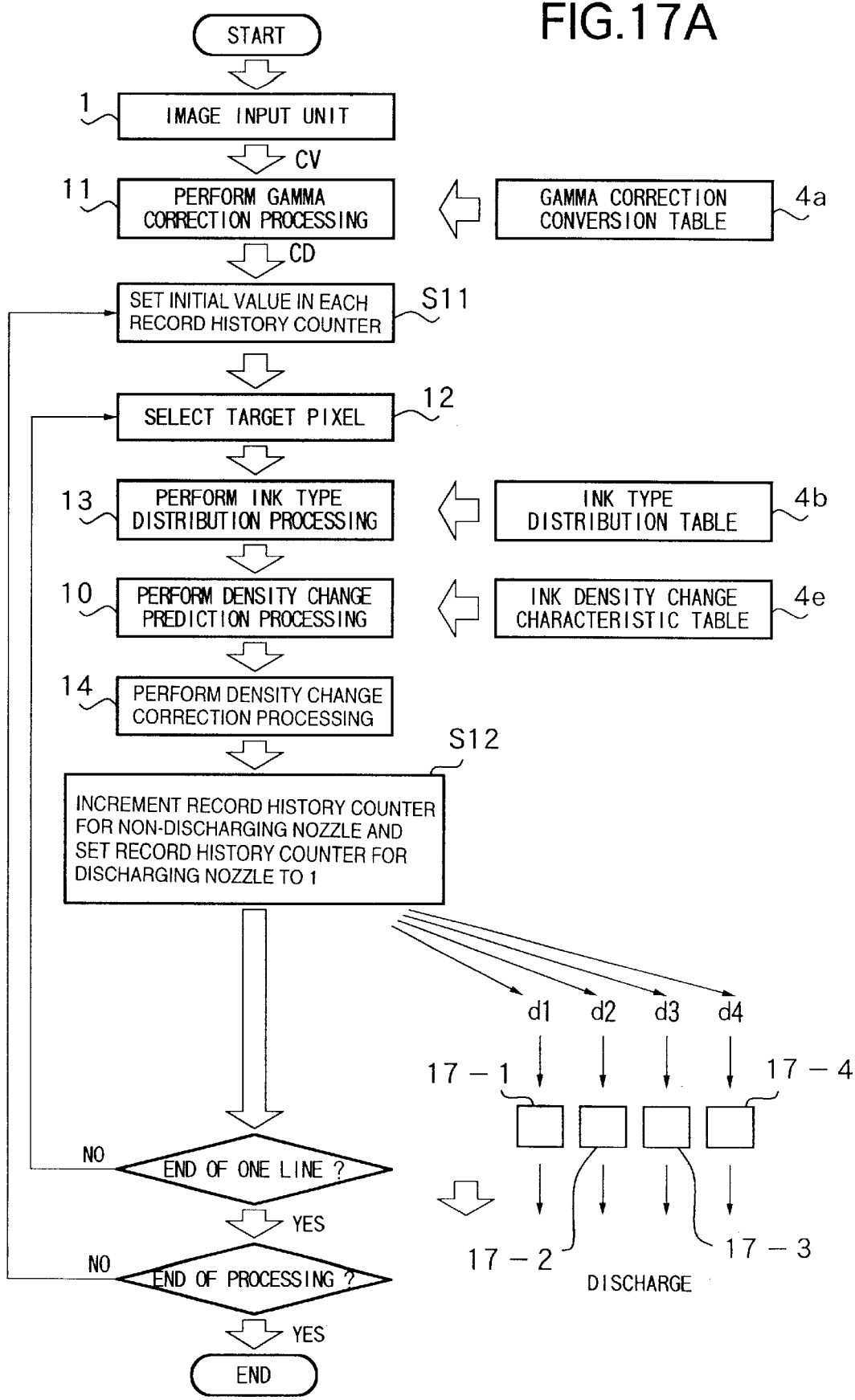
FIG. 17A is a flow chart for explaining the flow of image processing in the second embodiment.

FIG. 17A is a flow chart for explaining the flow of image processing in an image processing unit 6 in the second embodiment of the present invention. Note that since the arrangement of the ink-jet printing apparatus of the second embodiment is the same as that shown in FIG. 1, a description thereof will be omitted. The same reference numerals in FIG. 17A denote the same parts as in FIG. 2.

FIG. 17A is a flow chart for explaining an example of image processing based on a (one-pass) print algorithm for completing printing of an image corresponding to the print head width in one main scanning operation.

As described in the first embodiment as well, since the ink density of each nozzle increases with the prolongation of the ink non-discharge time, the second embodiment includes the record history counters 5a for storing the print histories of the respective nozzles. The number of record history counters 5a is determined by the types of ink used in this ink-jet printing apparatus and the print algorithm. These counters 5a may be arranged in the form of hardware or may be arranged in the RAM 5 as shown in FIG. 16.

Consider, for example, an algorithm (for one-pass printing) for using one nozzle of each of the ink-jet head units, each having ink with each density, which corresponds to one line of an image, to print one line of the image data in one main scanning operation. In this case, since the nozzles of the respective head units are sequentially selected in scanning operation in the main scanning direction, it is sufficient if the apparatus has record history counters 5a equal in number to the nozzles (ink-jet units) used to print one line.

The second embodiment includes the record history counters 5a corresponding to inks D1, D2, D3, and D4. These counters are denoted by reference symbols C1, C2, C3, and C4 (not shown).

First of all, gamma correction processing 11 is performed to convert an image signal CV input from an image input unit 1 into a signal CD representing a density by using a gamma correction conversion table 4a, and the signal CD is stored in a page memory area in the image processing work area of the RAM 5. Initial values are then set in the record history counters 5a corresponding to the respective ink-jet head units 21 (step S11). These initial values are obtained by converting the times required for the respective heads to move from the preliminary discharge position ("A" in FIG. 10A) before print operation to the image print start position ("D" in FIG. 10A) in each scanning operation into the number of dots.

In target pixel selection processing 12, each pixel data that is stored in the page memory area in the RAM 5 for processing from now on is sequentially selected and read out upon movement of each ink-jet head unit 21, thereby obtaining the density data CD of the pixel.

In ink type distribution processing 13, an ink combination candidate for expressing the density data CD of the target pixel is selected on the basis of the readout CD value of the target pixel by referring to an ink type distribution table 4b.

In density change prediction processing 10, the degree of variation in ink density in actual printing operation with respect to the ideal density is predicted by referring to the ink density change characteristic table 4e (FIG. 9), which is linearly approximated by the least squares method using experimental values, on the basis of the value of the record history counter 5a for each nozzle used to print the pixel.

In this manner, binary data d1, d2, d3, . . . indicating the discharging/non-discharging of the respective ink-jet head units having ink, each having different density, are determined in correspondence with the density data of the target pixel. These binary data are respectively sent to the corresponding ink-jet head units to drive them, thereby performing printing operation.

In step S12, processing corresponding to the record history counters C1, C2, C3, . . . is performed on the basis of the binary data d1, d2, d3, . . . indicating the discharging/non-discharging of ink from the nozzles of the respective ink-jet head units. In this case, the record history counter 5a corresponding to each nozzle that is determined as a non-discharging nozzle is counted up (incremented) by one, whereas each nozzle that is determined as a discharging nozzle is set to "1". That is, the value of each record history counter 5a in the second embodiment indicates the consecutive non-discharging count of the corresponding nozzle.

In this manner, the processing from the target pixel selection processing 12 to density change correction processing 14 is performed for all the pixels of the one-line image data on the basis of the density data (CD) of the image. In addition, initialization of the history counters in step S11 is performed in units of lines to generate the binary data d1, d2, d3, . . . indicating the discharging/non-discharging of ink from the respective head units having ink, each having different density, in units of pixels.

Figure 17B:
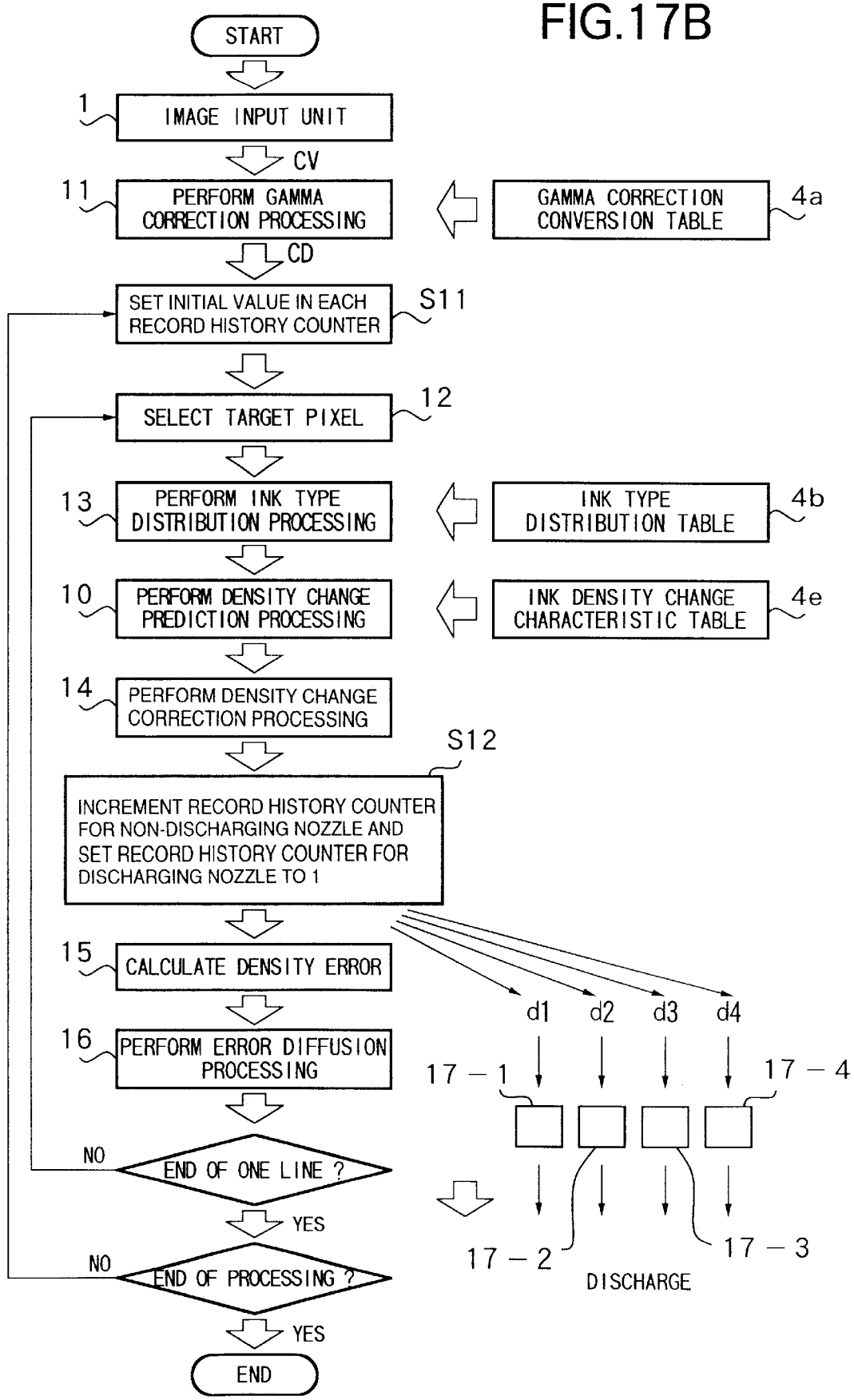
FIG. 17B is a flowchart for explaining a modification of the flow of image processing in the second embodiment.

FIG. 17B is a flow chart showing a modification of the second embodiment. The same reference numerals in FIG. 17B denote the same portions as in FIG. 17A, and a description thereof will be omitted.

In this case, after binary data used for printing are obtained, the density change correction processing 14 is performed to calculate a density variation accompanying the ink combination selected by the ink type distribution processing 13 on the basis of the predicted density obtained by the density change prediction processing 10, and the ink combination is changed, as needed, thereby determining an optimal ink density combination, i.e., the binary data d1, d2, d3, . . . indicating the discharging/non-discharging at the respective ink-jet head units, each having ink with different density from each other, as in the modification of the first embodiment described above.

Density error calculation processing 15 is performed to calculate the difference between the density data (CD value) of the target pixel and the density that can be expressed by the ink combination determined by the density change correction processing 14 in accordance with additive property, i.e., the density (OD) is determined in consideration of density change prediction. In the error diffusion processing 16, the difference (error) calculated by the density error calculation processing 15 is diffused to the pixels around the target pixel in the page memory in accordance with the distribution coefficients shown in FIG. 13.

With the above processing, the target pixel is completely processed.

In this manner, the processing from the target pixel selection processing 12 to the error diffusion processing 16 is performed for all the pixels of the image data on the basis of the density data (CD) of the image, thereby generating, in units of pixels, the binary data d1, d2, d3, . . . indicating the discharging/non-discharging of ink from the respective head units, each having ink with different density from each other.

Since the details of the density error calculation processing 15 and the error diffusion processing 16 are the same as those described with reference to FIGS. 11 to 15, a detailed description thereof will be omitted.

Figure 18:
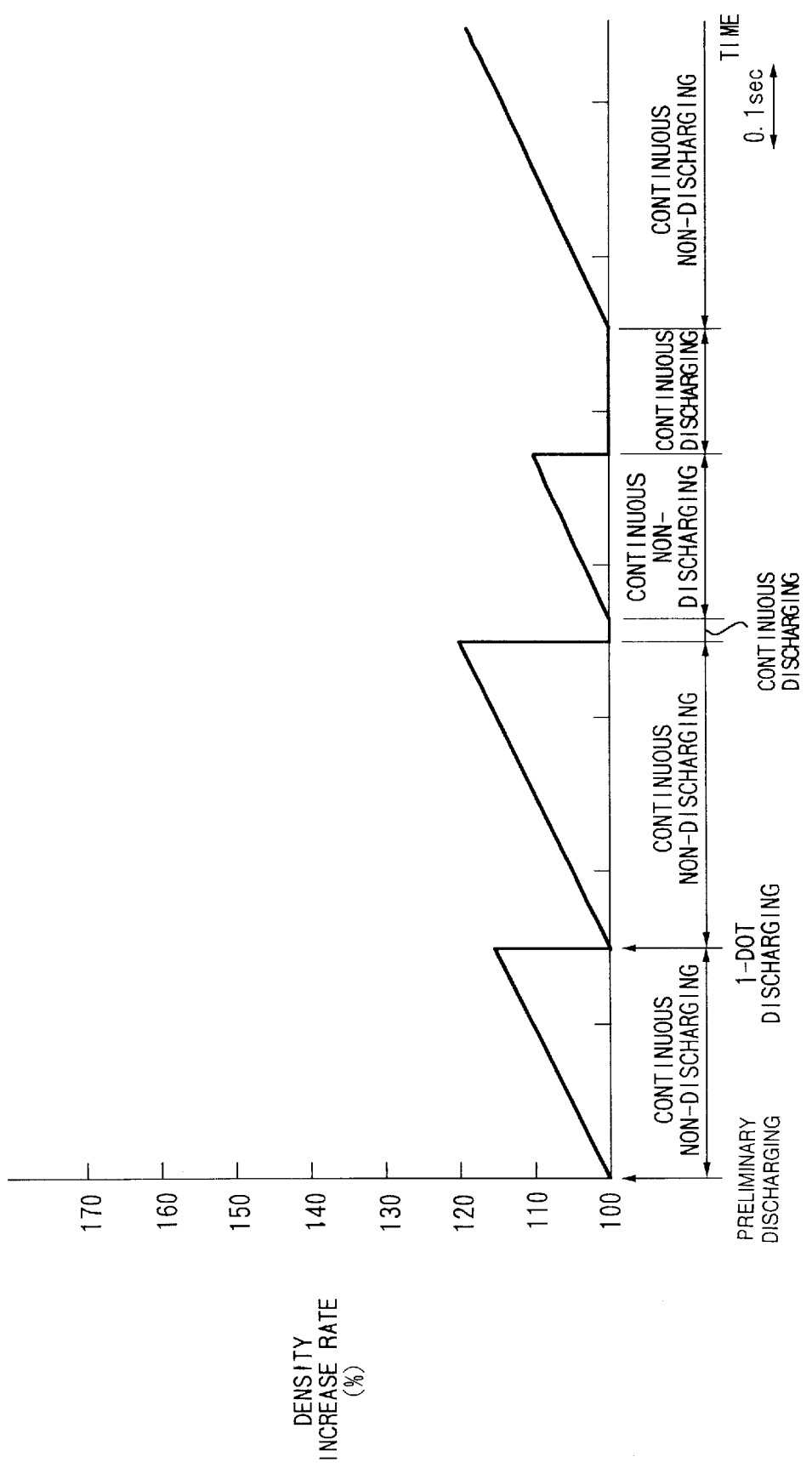
FIG. 18 is a graph for explaining density increases accompanying the discharging/non-discharging of ink from each nozzle of an ink-jet head unit.

FIG. 18 is a graph for explaining an example of how the ink density at a given nozzle changes in accordance with ink discharging/non-discharging.

As is apparent from FIG. 18, the ink density increases as a lapse of time in the interval between preliminary discharging and discharging of first one-dot ink, returns to the original density after one ink discharging operation, and increases again with time when the ink non-discharge state continues. In addition, when ink is continuously discharged, the ink density at the nozzle does not increase.

In the above embodiment, density increase rate data are referred to for each count value indicating a continuous non-discharge count. In consideration of the human visual perception ability, however, the density increase rates in FIG. 9 need not be referred to for each non-discharge count. For example, the density increase rates may be referred to, for example, every two, four, or eight times of continuous non-discharge, i.e., a predetermined number of times of non-discharge at a time. This operation exerts little influence on the image quality especially when the value obtained by multiplying the difference between adjacent entries in the ink density change characteristic table 4e by the density before an increase in ink density is "0.01D" or less.

In addition, a low-density (light) ink undergoes less change in density data (OD) with respect to a density increase rate than a high-density (dark) ink. With the use of a low-density ink, therefore, density increase rates may be referred to in a longer cycle than with the use of a high-density ink. For example, in the case shown in FIG. 9, the number by which the number of times of continuous non-discharging is divided is calculated.

Letting x be the number indicating a cycle in which continuous non-discharge counts are referred to, i.e., the number by which the number of the times of continuous non-discharge in FIG. 9 is divided, the following inequality holds from the above description:

$$x < 0.01 \times (5000/0.5)/(\text{ink density})$$

When the value x is considered in terms of the power of two for easy processing in the image processing unit 6 on the basis of the OD values of the inks D1, D2, D3, and D4 in the second embodiment, the following values are obtained:

| |
| --- |
| ink D1 (0.16D):x = 512 |
| ink D2 (0.32D):x = 256 |
| ink D3 (0.64D):x = 128 |
| ink D4 (1.28D):x = 64 |

When a table is prepared for each ink, in particular, the data amounts of the density change characteristic tables (FIG. 9) for the inks D1, D2, D3, and D4 can be reduced to, for example, 1/512, 1/256, 1/128, and 1/64, respectively. The memory capacity of each ink density change characteristic table 4e can be greatly reduced, and hence an economical advantage can be expected.

In addition, even when one ink density change characteristic table 4e is shared, the capacity of the table in FIG. 9 can be reduced to 1/64.

In this case, the table may be referred to by the following method. The value of the record history counter is bit-shifted by a necessary amount to decrease the value of the record history counter to 1/(power of two), while the remainder is discarded. The resultant value is then added to the base address of the ink density change characteristic table 4e, and the density information at the resultant address is read out.

[Third Embodiment]

The third embodiment of the present invention will be described next.

Figure 19:
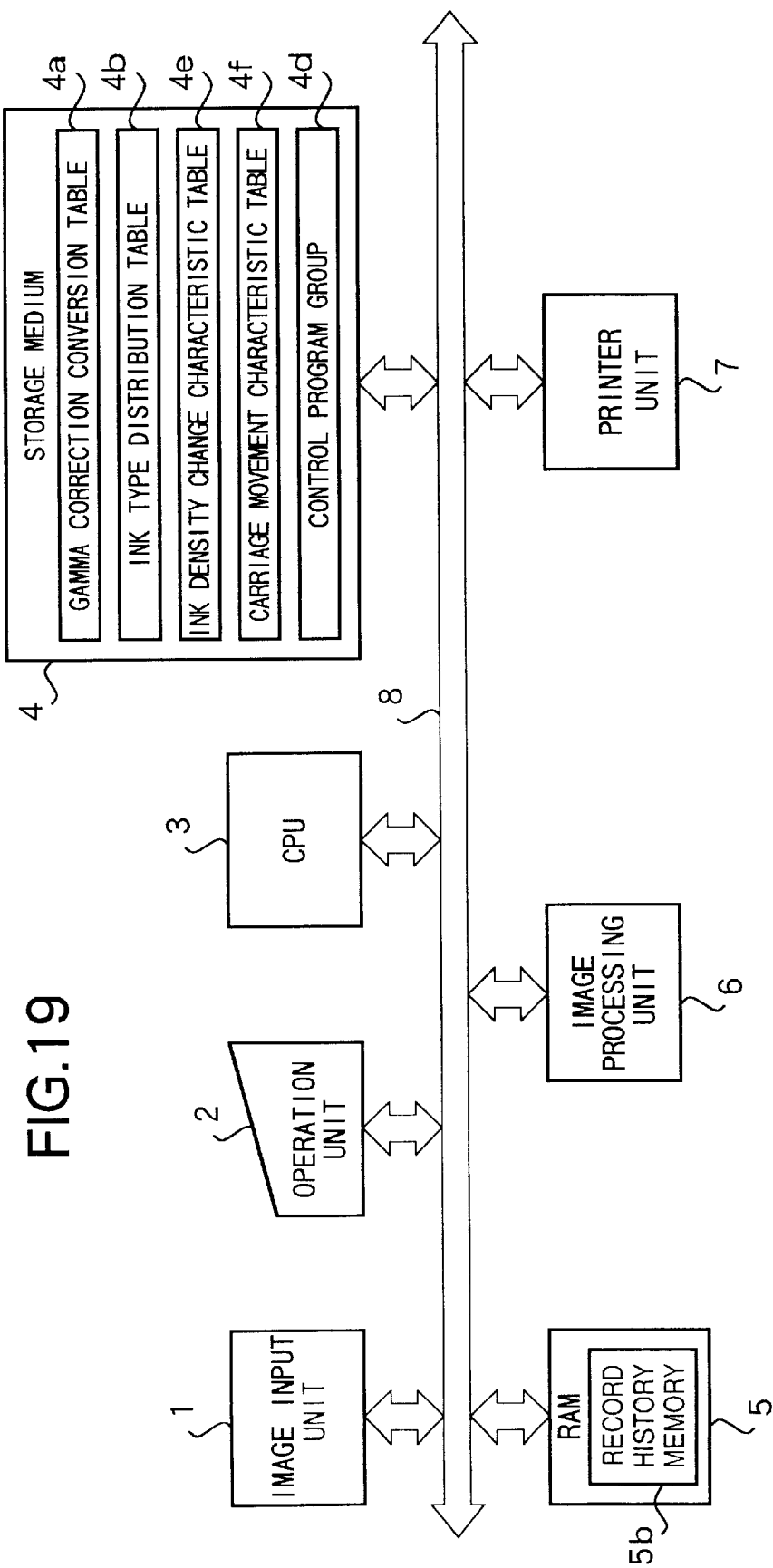
FIG. 19 is a block diagram showing the construction of an ink-jet printing apparatus according to the third embodiment of the present invention.

FIG. 19 is a block diagram showing the arrangement of an ink-jet printing apparatus according to the third embodiment of the present invention. The same reference numerals in the third embodiment denote the same parts as in the first and second embodiments, and a description thereof will be omitted.

Referring to FIG. 19, reference numeral 4f denotes a carriage movement characteristic table storing the speed change characteristics of a carriage motor 30 for driving a carriage 20.

Figure 20A:
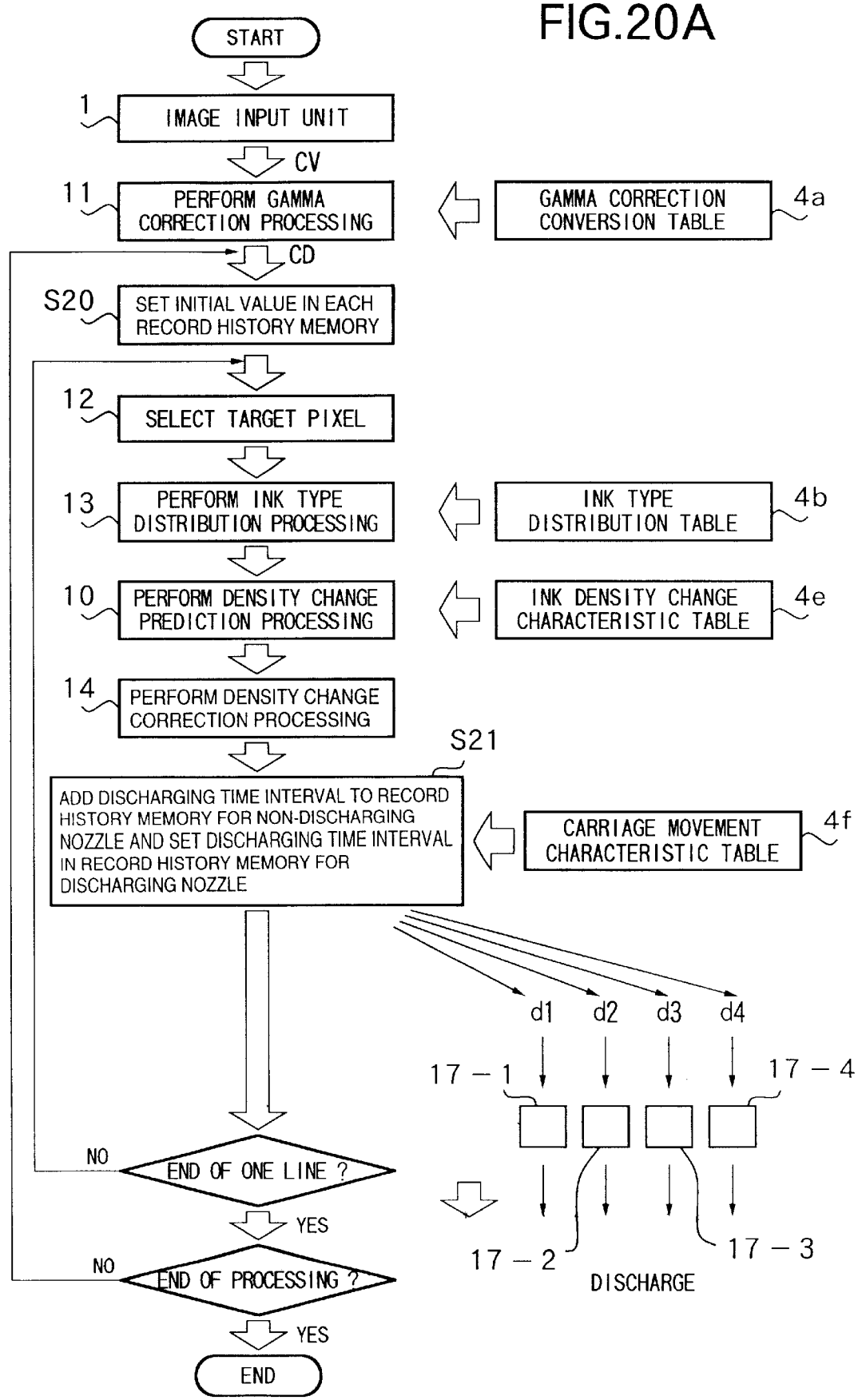
FIG. 20A is a flow chart for explaining the flow of image processing in the third embodiment.

FIG. 20A is a flow chart for explaining image processing in the third embodiment. The same reference numerals in FIG. 20A denote the same portions as in FIGS. 2A and 17A, and a description thereof will be omitted. FIG. 20A shows a (one-pass) print algorithm for printing an image corresponding to the head width in one main scanning operation.

Image data input from an image input unit 1 is subjected to gamma correction processing 11 to be converted into density data (CD). In the third embodiment, a RAM 5 includes record history memories 5b (M1, M2, M3, and M4) respectively prepared for inks D1, D2, D3, and D4.

In step S20, initial values are set in the respective record history memories 5b. The initial values in the respective record history memories 5b are time data each indicating the time required for the nozzle of each ink-jet head unit to move from the preliminary discharge position ("A" in FIG. 10A) in each main scanning operation to the print start position ("D" in FIG. 10A). This time data may be time data itself or any data, other than time data, which allows reference to the density change values in an ink density change characteristic table 4e (FIG. 9).

In target pixel selection processing 12, a target pixel to be processed is selected, and its density data CD is obtained. In ink type distribution processing 13, an ink type distribution table 4b is referred to on the basis of the density value of the target pixel to determine an ink combination candidate for printing with the density of the target pixel. In density change prediction processing 10, the degree of variation in ink density in actual printing operation with respect to the ideal density is predicted by referring to the ink density change characteristic table 4e, which is linearly approximated by the least squares method using experimental values, on the basis of the continuous non-discharge time data of the nozzles which are stored in the record history memories 5b for the respective nozzles. In density change correction processing 14, a density variation accompanying the ink combination selected by the ink type distribution processing 13 is calculated on the basis of the predicted density obtained by the density change prediction processing 10, and the ink combination is changed, as needed, thereby determining an optimal ink density combination, i.e., binary data d1, d2, d3, . . . indicating the discharging/non-discharging at the respective ink-jet head units, each having ink with different density from each other.

In step S21, M1, M2, M3, . . . of the record history memories 5b corresponding to the respective nozzles are updated on the basis of the binary data d1, d2, d3, . . . indicating the discharging/non-discharging at the nozzles, each having ink with different density from each other. In this case, time data indicating the time to the next ink discharge timing, which is obtained from the relationship between the value in the carriage movement characteristic table 4f and the position of the current pixel, is added to the record history memory 5b corresponding to each nozzle determined as "non-discharging". In contrast to this, no time data is added to the record history memory 5b corresponding to each nozzle determined as "discharging", and time data indicating the time to the next discharge timing is set in the memory 5b.

In this manner, the binary data d1, d2, d3, . . . indicating the discharging/non-discharging at the respective ink-jet head units, each having ink with different density, are determined in accordance with the density value of the target pixel. These binary data are respectively sent to the corresponding ink-jet head units. As a result, the head units are driven to perform printing.

In this manner, the processing from the target pixel selection processing 12 in FIG. 20A to the density change correction processing 14 is performed for all the pixels of one-line image data on the basis of the density values (CD) of the image. In addition, the history memories 5b are initialized in units of lines in step S20 to generate the binary data d1, d2, d3, . . . indicating the discharging/non-discharging of ink from the head units, each having ink with different density, in units of pixels.

Figure 20B:
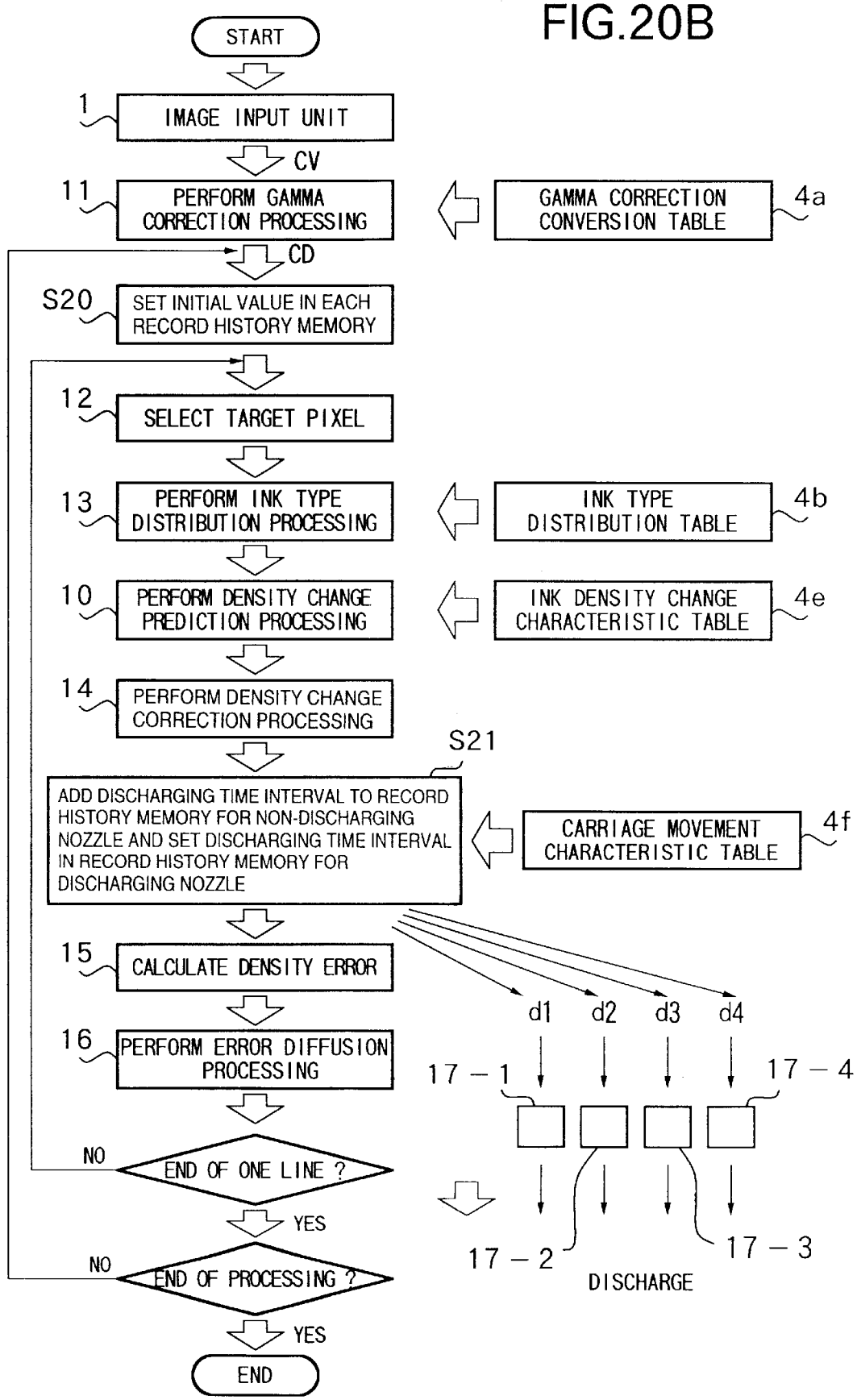
FIG. 20B is a flow chart for explaining a modification the flow of image processing in the third embodiment.

FIG. 20B is a flow chart showing image processing in a modification of the third embodiment. The same reference numerals in FIG. 20B denote the same portions as in FIG. 20A, and a description thereof will be omitted.

Density error calculation processing 15 is performed to calculate the difference between the CD value of the target pixel and the density that can be expressed by the ink combination determined by the density change correction processing 14 in accordance with the additive properties of the ink, i.e., the density (OD) determined in consideration of density change prediction. In error diffusion processing 16, the difference (error) calculated by the density error calculation processing 15 is diffused to the neighboring pixels of the target pixel in the page memory in accordance with the distribution coefficients (FIG. 13).

With the above processing, one pixel of interest (target pixel) is completely processed.

By executing the processing from the processing denoted by reference numeral 12 to the processing denoted by reference numeral 16 in FIG. 20B on the basis of the density data CD of the image, the binary data d1, d2, d3, . . . indicating the discharging/non-discharging of ink from the respective head units, each having ink with different density in a color, are generated.

FIG. 21 is a graph showing the movement characteristics of the carriage 20 (ink-jet head units 21) in the third embodiment with respect to a printing medium.

Referring to FIG. 21, the abscissa represents the moving time in the main scanning direction; and the ordinate represents the moving speed.

FIGS. 22A to 22C are views for explaining main scanning printing performed by the printer unit 7 in FIG. 4 and the ink discharging timing.

FIG. 22A is a view showing the printing unit of the printer unit 7 when viewed from a side parallel to the recording surface of a printing medium 24. FIG. 22B is a plan view of the printing medium 24 set at the recording unit.

When a print start signal is sent to the printer unit 7, the carriage 20 on which ink-jet head units 21-1 to 21-4 are mounted begins to move from the home position (not shown) in the direction indicated by an arrow S. While the ink-jet head unit 21-1 passes over an ink reservoir 33, the carriage 20 moves at a constant speed. The ink-jet head units 21-1 to 21-4 sequentially pass over the ink reservoir 33 in the order named and preliminary discharge ink to the ink reservoir 33 at a position A (the position of the ink reservoir 33). Printing operation is then performed in a length B–C.

When printing is completed by one scanning operation in this manner, the moving direction of the carriage 20 is reversed, and the carriage 20 returns to the home position. During this reverse operation, the printing medium 24 is fed in the sub-scanning direction (F) by the width of an image printed by one main scanning operation to prepare for printing by the next main scanning operation.

FIG. 22C is a graph showing the movement characteristics of each ink-jet head unit 21 mounted on the carriage 20 with respect to the printing medium 24 in main scanning operation.

Referring to FIG. 22C, the abscissa represents the position of the carriage 20 in the main scanning direction; and the ordinate represents the time intervals of the discharge timings. Note that the position on the abscissa may be expressed in units of dots on the basis of the dot density (resolution) to facilitate reference in image processing.

Reference symbol A denotes a preliminary discharge position; reference H denotes a home position; reference P1 denotes the first ink discharge position of the ink-jet head unit 21-1; reference T1 denotes the discharge timing of the ink-jet head unit 21-1 at the position P1 on the printing medium 24; and references P2 to P4 denote the positions of the ink-jet head unit 21-1 when the ink-jet head units 21-2, 21-3, and 21-4 pass the preliminary discharge position A. Reference numerals T2, T3, and T4 therefore denote the discharge timings of the ink-jet head units 21-2 to 21-4 at the time when they pass the position P1.

Assume that print start positions B of the respective ink-jet head units are the same position (P1). In this case, an ink density change caused when the ink-jet head unit 21-1 passes the position P1 can be obtained as follows. An ink density increase is obtained first by referring to FIG. 7 on the basis of the time required for the ink-jet head unit 1-1 to reach the position P1 from the preliminary discharge position A. The ink density change characteristic table 4e in FIG. 9 is then referred to.

When a linear encoder 28 is used to control the moving distance of the carriage 20 and generate the ink discharge timing as in the third embodiment, the number of dots corresponding to the distance is obtained on the basis of the print density, and the distance between the position A and the position P1 can be expressed on the basis of the number of dots.

In this case, the time required for the ink-jet head unit 21-1 to reach the position P1 from the preliminary discharge position A can be obtained by adding the dot discharge timing intervals, in accordance with the number of dots between the position A and the position P1 in the movement characteristics graph shown in FIG. 22C.

In addition, as in the above case, an ink density change caused when the ink-jet head unit 21-2 passes the position P1 may be obtained by referring to the ink density change characteristic table 4e in FIG. 9 on the basis of the time required for the ink-jet head unit 21-2 to reach the position P1 from the preliminary discharge position A. In this case, the ink-jet head unit 21-2 is spaced apart from the preceding ink-jet head unit 21-1 by the distance (P2−P1).

The time required for the ink-jet head unit 21-2 to reach the position P1 from the preliminary discharge position A can be obtained by referring to FIG. 22C in this manner in consideration of the distance (P2−P1) to the preceding ink-jet head unit 21-1. This time is equal to the time required for the ink-jet head unit 21-1 to reach the position P2 from the preliminary discharge position A.

Similarly, the time required for the ink-jet head unit 21-3 to reach the position P1 from the preliminary discharge position A is equal to the time required for the ink-jet head unit 21-1 to reach the position P3 from the preliminary discharge position A. The time required for the ink-jet head unit 21-4 to reach the position P1 is equal to the time required for the ink-jet head unit 21-1 to reach the position P4. In the image processing shown in FIGS. 20A and 20B, the initial values to be stored in the record history memories 5b for the first pixel of each line can be obtained in the above manner on the basis of these time values.

As described above, the movement characteristics of the remaining ink-jet head units can be calculated by using the carriage movement characteristic table 4f for the ink-jet head unit 21-1 in consideration of the positions of the respective ink-jet head units relative to the position of the ink-jet head unit 21-1.

When the above processing is applied to the image processing in the FIGS. 20A and 20B, the discharge timing of each ink-jet head unit at each point on the printing medium 24 can be controlled by making the position of each target pixel correspond to the printing position of each ink-jet head unit and referring to the carriage movement characteristic data in FIG. 22C. By applying this timing interval prediction method to the image processing in FIGS. 20A and 20B, density change prediction and correction with respect to non-discharging nozzles can be performed regardless of whether the carriage is moving at a constant speed, accelerating, or decelerating.

Since the details of the density error calculation processing 15 and error diffusion processing 16 are the same as those described with reference to FIGS. 11 to 15, a detailed description thereof will be omitted.

[Carriage Movement Characteristic Table]

A method of generating the carriage movement characteristic table 4f shown in FIG. 22C will be described next.

First of all, the carriage 20 is moved to the home position H and stopped. As in actual printing operation, the carriage motor 30 is rotated to accelerate the carriage 20. A timer (not shown) is started concurrently with the start of the movement of the carriage 20 to measure the intervals between pulse signals generated by the linear encoder 28 in synchronism with the movement of the carriage 20, thereby obtaining carriage movement characteristic data corresponding to the respective carriage positions. The obtained data are written in the work area of the RAM 5.

This measurement is performed in the time interval between the instant at which the carriage 20 starts to run at a constant speed and the instant at which the carriage 20 decelerates and stops to complete one scanning operation. As a result, the carriage movement characteristic data shown in FIG. 22C is generated.

Accurate carriage movement characteristic data can be obtained by repeating this measurement a plurality of number of times and obtaining the average of the resultant data. The carriage movement characteristic table 4f can be generated on the basis of this data. In addition, since the actual behavior of the carriage 20 can be measured in this manner, the carriage movement characteristic table 4f can be generated regardless of control on main scanning operation.

[Fourth Embodiment]

Figure 23:
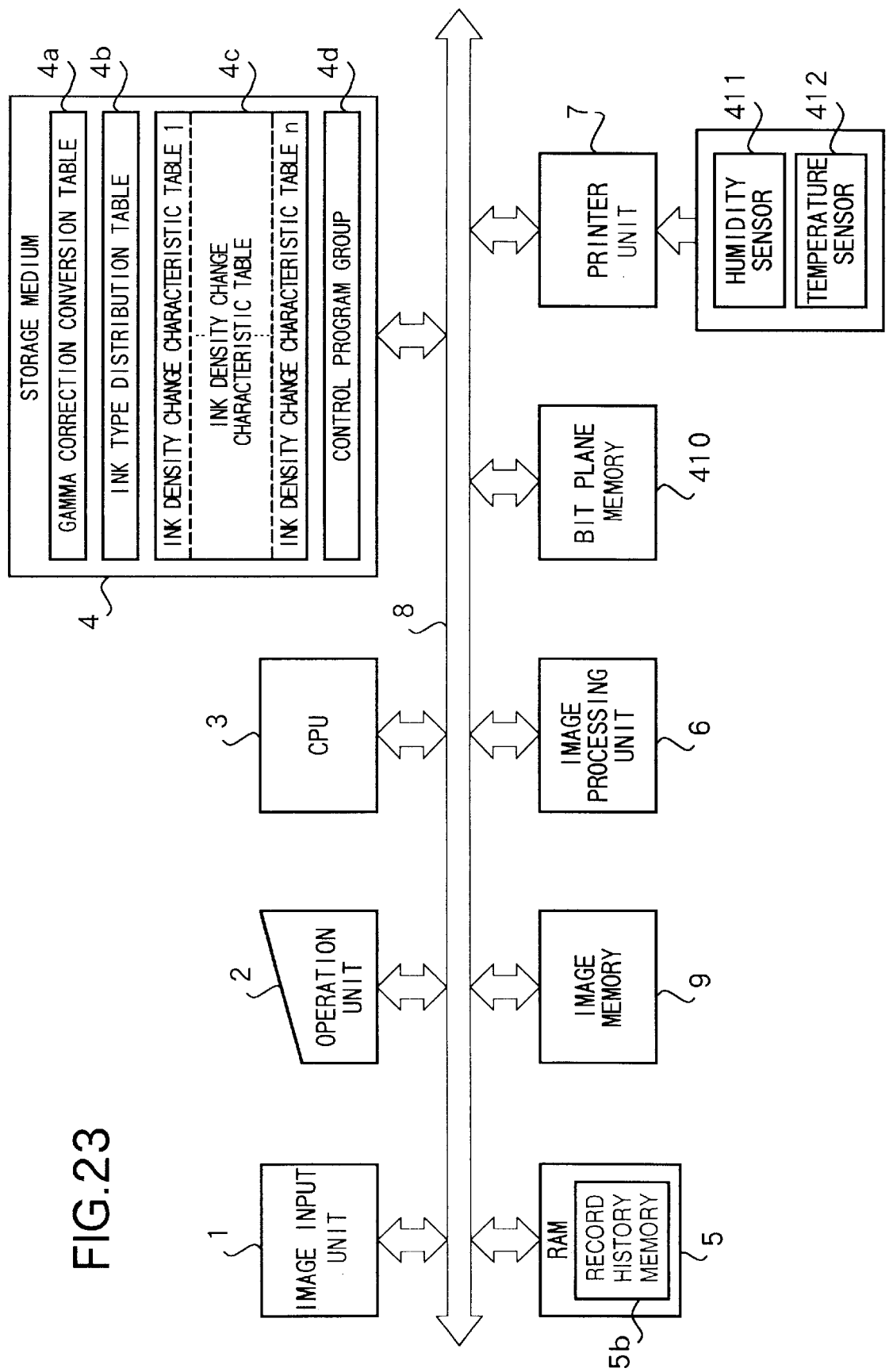
FIG. 23 is a block diagram showing the construction of an ink-jet printing apparatus according to the fourth embodiment of the present invention.

FIG. 23 is a block diagram showing the functional arrangement of an ink-jet printing system according to the fourth embodiment of the present invention. The same reference numerals in FIG. 23 denote the same parts as in the drawings described above, and a description thereof will be omitted. In addition, since the arrangement of a printer unit 7 including ink-jet heads and the like in the fourth embodiment is the same as that in FIG. 4, a description thereof will also be omitted.

Referring to FIG. 23, reference numeral 4c denotes a table group indicating ink density change characteristics with respect to the non-discharging time, which are referred to in multilevel gradation processing and ink type distribution processing. This table group includes a plurality of ink density change characteristic tables prepared according to humidity and temperature conditions. Reference numeral 9 denotes an image memory for storing image data input from an image input unit 1; numeral 410 denotes a bit plane memory for storing binarized image data; numeral 411 denotes a humidity sensor for measuring the environmental humidity around the printer unit 7; and numeral 412 denotes a temperature sensor for measuring the environmental temperature around the printer unit 7. These two sensors 411, 412 are mounted in the printer unit 7.

[Ink Density Change Characteristic Table 4c]

In the fourth embodiment, ink-jet head units 21 of the printer unit 7 discharge ink from the nozzle arrays at a frequency of 10 kHz. In solid printing operation, 10,000 ink droplets are discharged from the nozzle array of each ink-jet head unit 21 with a 600-dpi pitch. At this time, a carriage 20 scans a short side of an A3 sheet in about 0.7 sec at a scanning speed of about 423.33 mm/sec.

It is confirmed by experiment that the density increase rate of each ink used in the fourth embodiment is proportional to the non-discharging time, and the slope of the density increase rate changes with temperature and humidity while the carriage 20 scans a short side (297 mm) of the A3 sheet. In this case, the "non-discharging time" is the time interval between the instant at which an ink droplet is discharged from one nozzle of the ink-jet head unit 21 and the instant at which the next ink droplet is discharged from this nozzle.

Figure 26A:
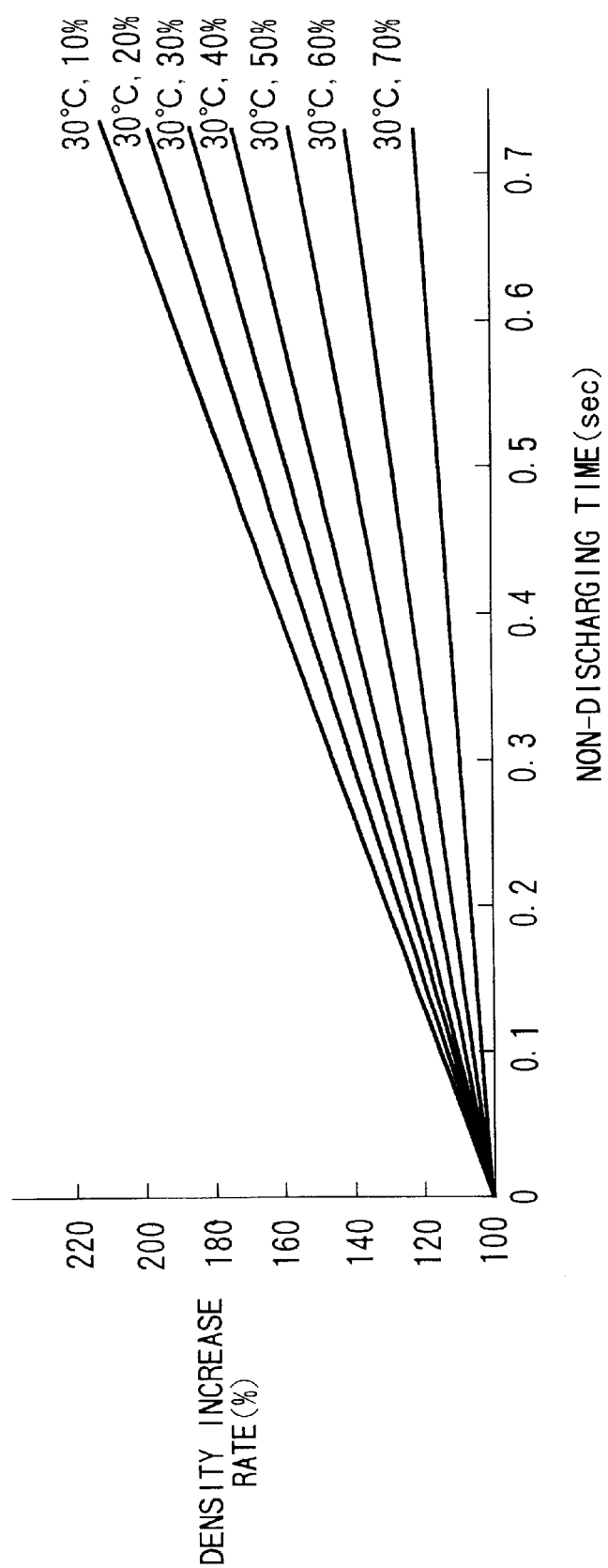

FIGS. 26A and 26B are graphs for explaining the data of the ink density change characteristic table 4c indicating the change rate of ink density with respect to the non-discharging time.

Each graph is obtained by linearly approximating typical densities by the least squares method on the basis of experimental results. The abscissa represents the non-discharging time; and the ordinate represents the increase rate of transmission density (OD) of an ink. FIG. 26A shows changes in ink density increase rate at a constant temperature of 30° C. with changes in humidity from 10% to 70% at a rate of 10%. FIG. 26B shows changes in ink density increase rate at a constant humidity of 40% with changes in ambient temperature from 15° C. to 35° C. at a rate of 5° C.

[Ink Density Characteristic5 Based on Discharging]

An increase in ink density during scanning operation of each ink-jet head unit 21 results from evaporation of the ink solvent at each nozzle tip. When the ink whose density has increased at a nozzle tip is discharged as an ink droplet in one ink discharging operation, fresh ink is charged into the nozzle tip. As a result, the ink density at the nozzle tip returns to the prescribed (original) density before the increase in density.

[Experimental Example]

An experimental example of obtaining the data of the ink density change characteristic table 4c shown in FIGS. 26A and 26B will be described below.

To measure the density increase rate of discharged ink, the printer unit 7 was carried into an environmental test room (not shown) in which temperature and humidity can be controlled. A test pattern for density increase rate measurement in FIG. 27B was printed with a specific ink while the humidity and temperature were kept constant. By measuring the printed pattern with a densitometer (not shown), data of ink density that changes with the continuous non-discharging time in a given environment was obtained.

In addition, the combination of the temperature and humidity was changed in steps, and a test pattern for density increase rate measurement was printed for each combination. Each print result was measured by the densitometer (not shown) to obtain ink density change characteristic data for each combination of temperature and humidity. Change characteristic data of each ink in the respective environments were obtained by performing the same measurement as described above for all the remaining inks.

Ink density change characteristic tables like those shown in FIGS. 26A and 26B can be obtained by calculating ink density increase rates on the basis of the above experimental results, linearly approximating the density increase rates at the respective points by the least squares method, and classifying the data obtained at a constant temperature or humidity as characteristic tables for the respective types of ink.

Figure 28:
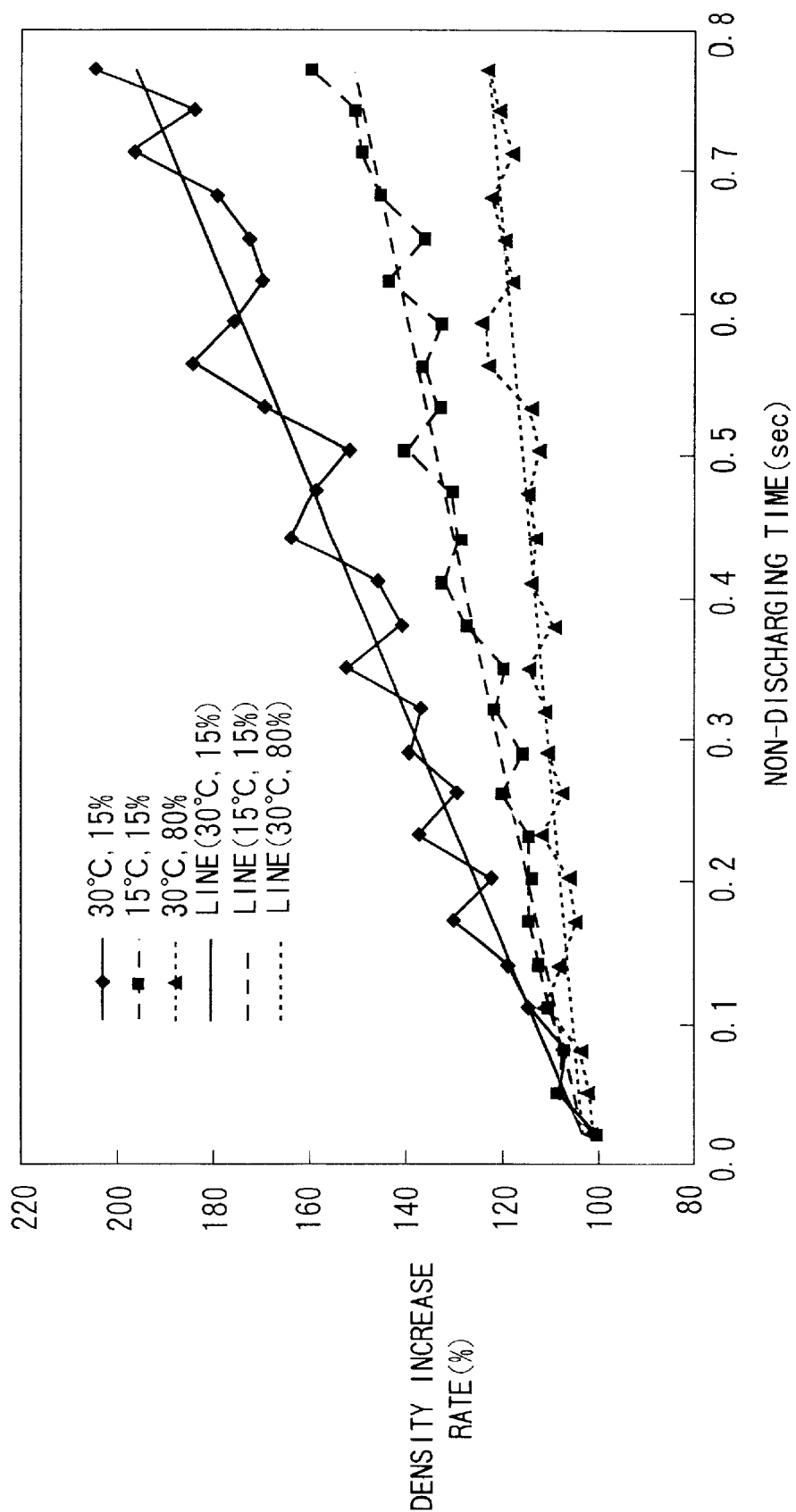
FIG. 28 is a graph showing experimental results on ink density increase rates and linear approximation curves obtained by the least squares method.

FIG. 28 shows measured ink density increase rates of an ink having a transmission density of 3.2 D with respect to the non-discharging time under environments of a temperature of 30° C. and a humidity of 15%, a temperature of 15° C. and a humidity of 15%, and a temperature of 30° C. and a humidity of 80%, and an example of linear approximation curves obtained by the least squares method.

[Test Pattern for Density Change Rate Measurement]

The above experimental results will be described in more detail below.

FIGS. 27A and 27B schematically show the main scanning unit of the printer unit 7 in FIG. 4. FIG. 27A is a side view of a printing section. FIG. 27B is a plan view of the printing medium 24 set at the printing section. Similar to the arrangement in FIG. 4, reference numeral 20 denotes a carriage; numerals 21-1 to 21-4 denotes ink-jet head units; and numeral 33 denotes an ink reservoir for preliminarily discharging. The carriage 20 moves at a constant speed in the direction indicated by an arrow S. Each of the ink-jet head units 21-1 to 21-4 can preliminarily discharge ink to the ink reservoir 33 at a position A where each of the ink-jet head units passes over the ink reservoir A method of printing a test pattern for density change measurement in the fourth embodiment by using the ink-jet head unit 21-1 will be described below with reference to FIGS. 27A and 27B.

Assume that in the fourth embodiment, the discharge frequency of the ink-jet head unit 21 is 10 kHz, and the print density in the main scanning direction is 600 dpi. Under the above condition, a length B–C corresponds to 200 dots, and a length C–D corresponds to 200 dots.

A convey motor 26 in FIG. 4 is driven to convey a printing medium 24 in the direction indicated by an arrow F and stop it such that the ink-jet head unit 21 comes to the sub-scanning position corresponding to a band W1 in FIG. 27B. The width of the band W1 corresponds to the length of an array of nozzles of each ink-jet head unit. In this case, the moving speed of the carriage 20 at which ink is discharged at a print density of 600 dpi and a discharge frequency of 10kHz is 423.3 mm/sec. Note that the carriage 20 moves on the printing medium 24 at a constant speed during a printing operation.

In the first scanning operation, the carriage 20 starts from the home position (not shown), and the ink-jet head unit 21-1 preliminarily discharges ink to the ink reservoir 33 at the position A. At the position B, ink droplets are simultaneously discharged from all the nozzles of the ink-jet head unit 21-1. At the position C, the ink droplets are discharged from all the nozzles of the ink-jet head unit 21-1, then the main scanning operation is stopped. The carriage 20 then returns to the home position, and the first scanning operation is completed without feeding the printing medium 24.

In the second scanning operation, similarly, the ink-jet head unit 21-1 performs preliminary discharging at the position A. Then, ink droplets are simultaneously discharged from all the nozzles onto a portion shifted from the position B to the right by one dot. Thereafter, ink droplets are simultaneously discharged from all the nozzles onto a portion shifted from the position C to the right by one dot, and the main scanning operation is stopped. The carriage 20 then returns to the home position, and the second scanning operation is completed without feeding the printing medium 24.

Similarly, in the third and subsequent scanning operations, while the printing position is shifted dot by dot from the printing position in the previous scanning operation, similar operation is repeated a total of 200 times without feeding the printing medium 24 until the intervals B–C and C–D are filled with dots. In this manner, printing of the band W1 is complete.

Next, to print a band W2, the printing medium 24 is fed in the direction indicated by the arrow F by one band. As shown in FIG. 27B, the band W2 is printed at the width B–C and a width E–F. In this case, the width B–D corresponds to 200 dots as in the case with the band W1, the width E–F corresponds to 200 dots, and a width B–E corresponds to 500 dots.

In the first scanning operation, the ink-jet head unit 21-1 performs preliminary discharging at the position A. At the position B, ink droplets are simultaneously discharged from all the nozzles. At the position E, after ink droplets are simultaneously discharged from all the nozzles of the ink-jet head unit 21-1, the main scanning operation is stopped. The carriage 20 then returns to the home position, and the first scanning operation is completed without feeding the printing medium 24.

Similarly, in the second scanning operation, preliminary discharging is performed at the position A, and ink droplets are simultaneously discharged from all the nozzles of the ink-jet head unit 21-1 onto a portion shifted from the position B to the right by one dot. Thereafter, ink droplets are simultaneously discharged from all the nozzles onto a portion shifted from the position E to the right by one dot. The main scanning operation is then stopped. The carriage 20 returns to the home position (not shown). The second scanning operation is completed without feeding the printing medium 24.

Similarly, in the third and subsequent scanning operations, while the printing position is shifted dot by dot from the printing position in the previous scanning operation, similar operation is repeated a total of 200 times without feeding the printing medium 24 until the widths B–C and E–F are filled with dots. In this manner, printing of the band W2 is complete.

To print a band W3, the printing medium 24 is fed in the direction indicated by the arrow F by one band by the convey roller (not shown). The band W3 is printed at the length B–C and a length G–H. The length B–C corresponds to 200 dots as in the case with the band W1, the length G–H corresponds to 200 dots, and a length B–G corresponds to 800 dots.

When the interval of the printed dots is increased by 300 dots at a time for each band, the test pattern shown in FIG. 27B is printed. In this case, since the time difference between dots printed at positions 100 dots apart at a discharge frequency of 10 kHz is 0.01 sec, the interval of a pattern 55 printed on the band W1 corresponds to 200 dots, which correspond to a non-discharging time of 0.2 sec.

The interval of a pattern 55 printed on the band W1 corresponds to 200 dots, which correspond to a non-discharging time of 0.02 sec.

The interval of a pattern 56 printed on the band W2 corresponds to 500 dots, which correspond to a non-discharging time of 0.05 sec.

The interval of a pattern 57 printed on the band W3 corresponds to 800 dots, which correspond to a non-discharging of 0.08 sec.

In this manner, a pattern that allows ink density change measurement when the non-discharging time is prolonged in increments of 0.03 sec can be formed.

FIG. 28 shows the result obtained by calculating ink density increase rates on the basis of the data obtained by printing the above patterns using an ink having a transmission density of 0.24 D under environments of a temperature of 30° C. and a humidity of 15%, a temperature of 15° C. and a humidity of 15%, and a temperature of 30° C. and a humidity of 80%.

In the above case, the minimum interval of printed patterns is set to 200 dots to allow measurement with a densitometer having a large measurement spot. If, however, a densitometer having a small measurement spot or slit type measurement spot can be used, this print width may be reduced to, e.g., 10 dots.

[Image Processing Unit 6 in Fourth Embodiment]

Figure 24A:
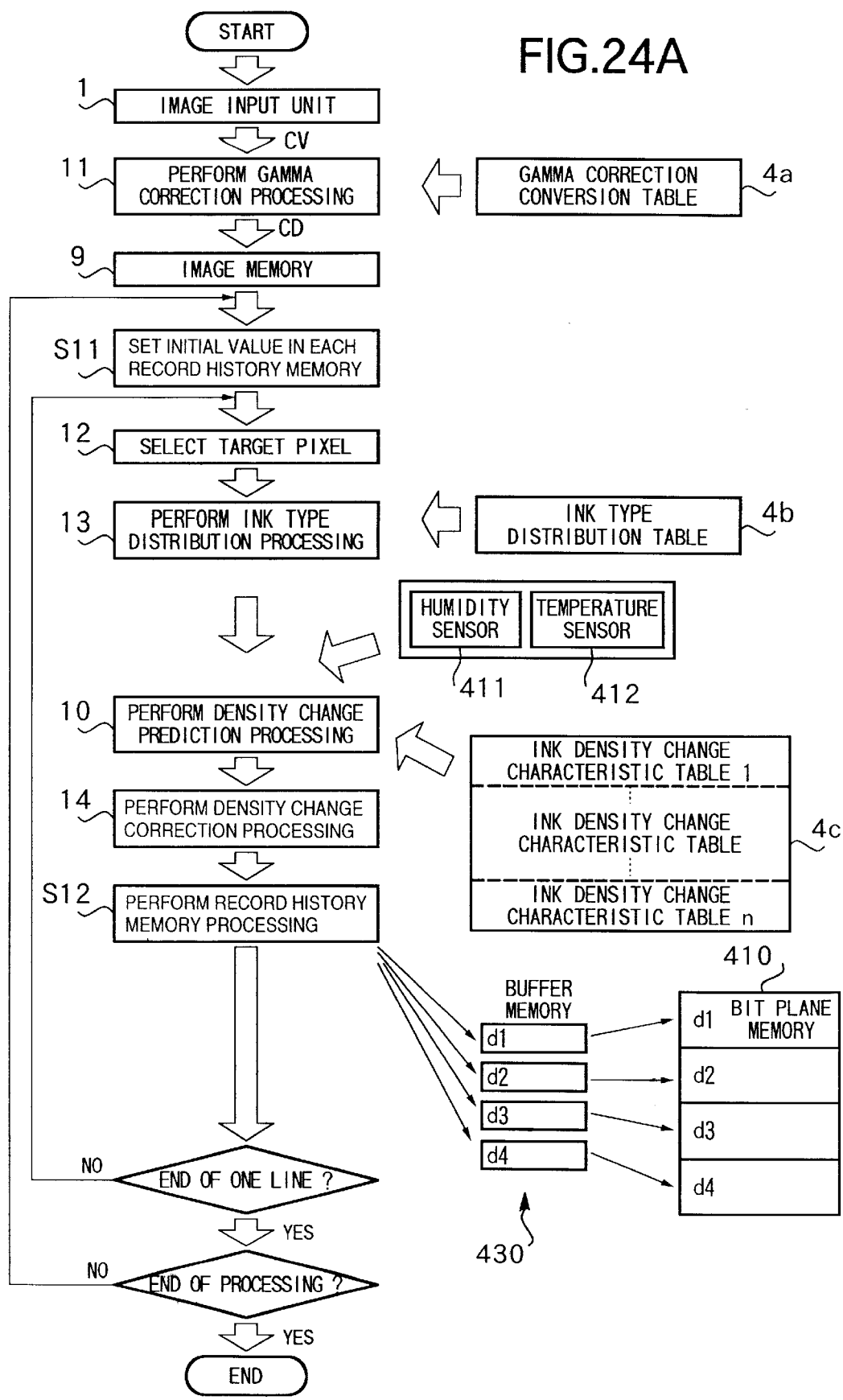
FIG. 24A is a flow chart for explaining the flow of image processing in the fourth embodiment.
Figure 24B:
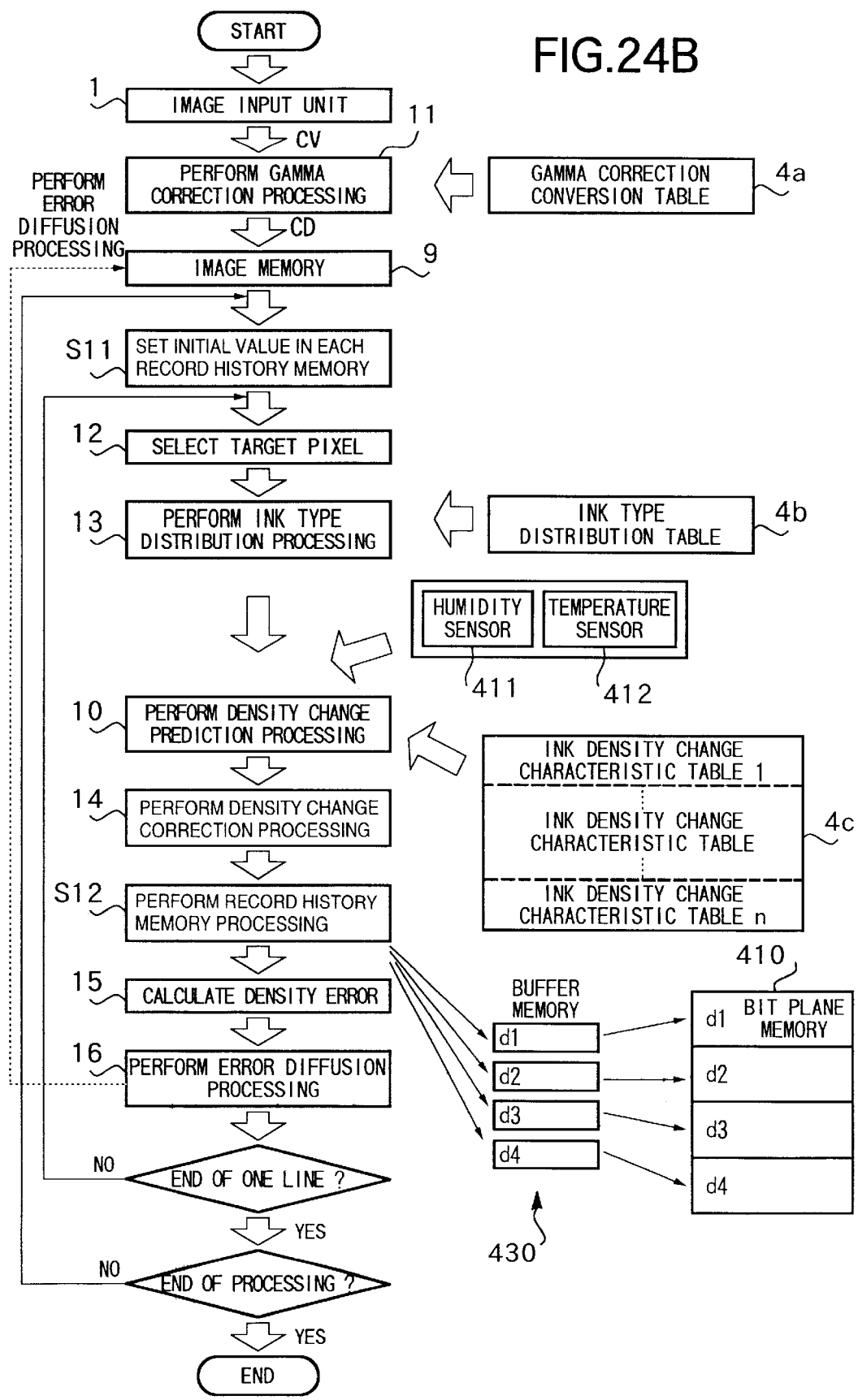
FIG. 24B is a flowchart for explaining a modification of the flow of image processing in the fourth embodiment.

FIGS. 24A and 24B are flow charts for explaining the flow of processing in the image processing unit 6 in the fourth embodiment of the present invention. The same reference numerals in FIGS. 24A and 24B denote the same portions as in FIGS. 2A, 2B, 17A, 17B, 20A, and 20B, and a detailed description thereof will be omitted.

FIGS. 24A and 24B show an example of how image processing is performed by a one-pass print algorithm for completing printing of an image corresponding to the head width (e.g., 256 nozzles) of each ink-jet head unit 21 by scanning the carriage 20 only once. The number of record history memories 5b required for this image processing is determined by the types of ink used for printing and the print algorithm. Note that the record history memories 5b are prepared in a RAM 5.

Consider an algorithm (for one-pass printing) for printing one line of an image in one scanning operation by using one nozzle, of each of ink-jet head units, each having ink with different density from each other in a color, which corresponds to the line. In this case, since target pixels are sequentially selected and processed in the scanning direction, it suffices if the system has record history memories 5b equal in number to the arrays of nozzles (ink-jet head units) used to discharge inks on the line.

First of all, in gamma correction processing 11, an image signal CV input from the image input unit 1 is converted into a signal CD indicating a density by using a gamma correction conversion table 4a, and the signal is stored in the image memory 9. In step S11, initial values are set in the record history memories 5b. The initial value in each record history memory 5b is time data indicating the time required for the nozzle of the corresponding head unit to move from the preliminary discharge position (corresponding to the position A in FIG. 27A) to the print start position (corresponding to "B" in FIG. 27A) for the image. In target pixel selection processing 12, each pixel to be processed is sequentially selected from the image memory 9, and density data CD of each pixel is obtained. In ink type distribution processing 13, an ink combination for expressing the density CD of the target pixel is selected by referring to an ink type distribution table 4b on the basis of the CD value of the target pixel.

As the ink density change characteristic table group 4c, ink density change characteristic tables are stored in correspondence with combinations of humidities and temperatures within the environmental range in which the printer unit 7 in this embodiment can operate. For example, a total of 48 types of ink density change characteristic tables are prepared, which are linearly approximated from experimental values by the least squares method while the humidity range of 20% to 90% is divided in increments of 10% and the environmental temperature range of 0° C. to 50° C. is divided in increments of 10° C.

In density change prediction processing 10, first of all, an ink density change characteristic table indicating an environment closest to the environment in which the printer unit 7 is installed and is selected from the ink density change characteristic table group 4c on the basis of the values of the environmental humidity and temperature around the ink-jet head unit 21 which are detected by the humidity sensor 411 and the temperature sensor 412. Subsequently, the selected ink density change characteristic table is referred to on the basis of the non-discharging time data stored in the record history memory 5b for each nozzle, thereby predicting the degree of variation in print density based ink from the corresponding nozzle relative to the ideal density.

In density change correction processing 14, a substantial print density variation caused by the ink combination selected by the ink type distribution processing 13 is calculated on the basis of the density predicted by the density change prediction processing 10, and the ink combination is changed, as needed, to determine an optimal ink density combination, i.e., the binary data d1, d2, d3, and d4 indicating the discharging/non-discharging of ink from the nozzles of the respective ink-jet head units. In step S12, the record history memories 5b corresponding to the respective nozzles are updated on the basis of the binary data d1, d2, d3, and d4 indicating the discharging/non-discharging of ink from the respective nozzles.

In this case, a target pixel is selected by using target pixel selection information, a counter that is incremented by one at the end of processing for each pixel, and the like. In processing the target pixel, density change prediction is performed on the basis of the value of the record history memory 5b to predict that the ink density increases by an amount corresponding to the time intervals of ink discharge timings of each nozzle. For this reason, time data indicating the time to the next ink discharge timing is added to the data of the record history memory 5b corresponding to each nozzle determined as a non-discharging nozzle. In addition, time data indicating the time to the next ink discharge timing is set in the record history memory 5b corresponding to each nozzle determined as a discharging nozzle without adding it to the data of the memory. That is, the contents of each record history memory 5b represent the continuous non-discharging time of the corresponding nozzle. The binary data d1, d2, d3, and d4 are transferred first to a buffer memory 430 and then stored in the bit plane memory 410. In the buffer memory 430, the binary data sent in units of bits is bit-shifted every time it is sent. When these data are stored in a specified amount, the data are transferred to the bit plane memory 410.

By repeating the processing from step S11 to step S12 on the basis of the density data CD of the image in this manner, the bit planes consisting of the binary data d1, d2, d3, and d4 are formed in different address areas in the bit plane memory 410.

FIG. 24B is a flow chart showing a modification of the flow of processing in the fourth embodiment, in which the following processing is performed in addition to the processing described above. A density error is obtained, and density interpolation is performed by, for example, diffusing the error to neighboring pixels. Since the processing up to step S12 is the same as in FIG. 24A, a description thereof will be omitted.

Density error calculation processing 15 is performed to calculate the difference between the CD value of the target pixel and the density that can be expressed by the ink combination determined by the density change correction processing 14, i.e., the density determined in consideration of density change prediction.

In error diffusion processing 16, the difference calculated by the density error calculation processing 15 is diffused to the pixels around the target pixel in the page memory in accordance with the distribution coefficients shown in FIG. 13. In this manner, the processing for the target pixel is complete.

[Fifth Embodiment]

In the fifth embodiment, ink density change characteristic tables are prepared in correspondence with combinations of humidities set in increments of 10% and temperatures set in increments of 10° C. However, the standard for the classification of ink density change characteristic tables in the present invention is not limited to this, and a standard may be arbitrarily prepared in accordance with the types of ink to be used within the range in which gradation level correction can be properly performed.

In addition, when each type of ink to be used exhibits different density increase rates, the number of ink density change characteristic tables to be prepared may be equal to the number of the types of ink. When density increase rates can be classified into groups, ink density change characteristic tables equal in number to the groups may be prepared.

[Sixth Embodiment]

In the above embodiment, a plurality of ink density change characteristic tables are prepared such that humidities are set in increments of 10% and temperatures are set in increments of 10° C. under the set humidities. Assume that the values in ink density change characteristic tables 4c can be linearly approximated from experimental values by the least squares method, as shown in FIGS. 26A and 26B. In this case, density change characteristics may be stored in a storage medium 4 in correspondence with each type of ink corresponding to each combination of humidities and temperatures. In image processing, an ink density change characteristic table 4c may be generated on the basis of the environmental humidities and temperatures detected by the humidity sensor 411 and the temperature sensor 412. In density change prediction processing, this table may be referred to.

Figure 25A:
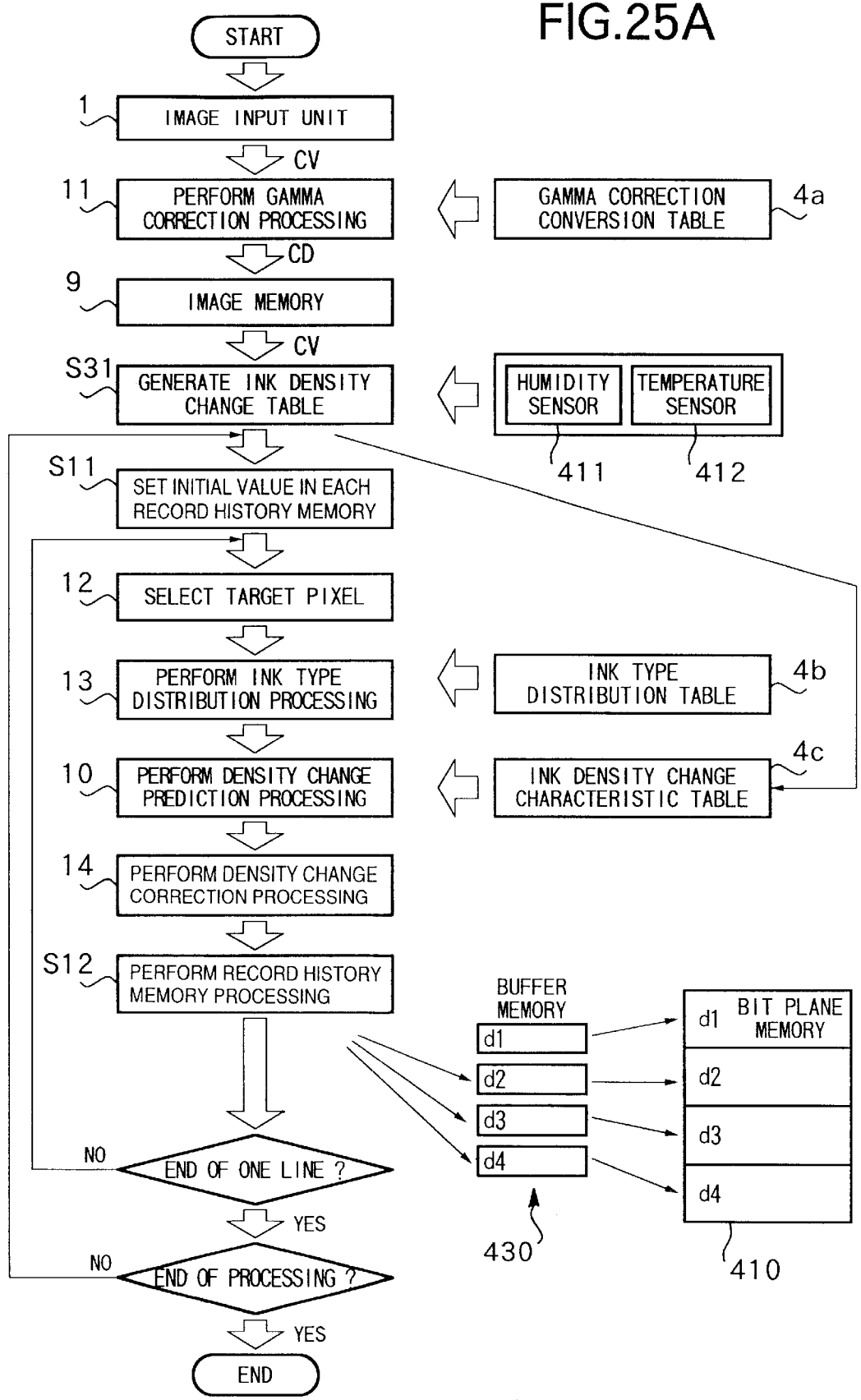
FIG. 25A is a flow chart for explaining the flow of image processing in the sixth embodiment.
Figure 25B:
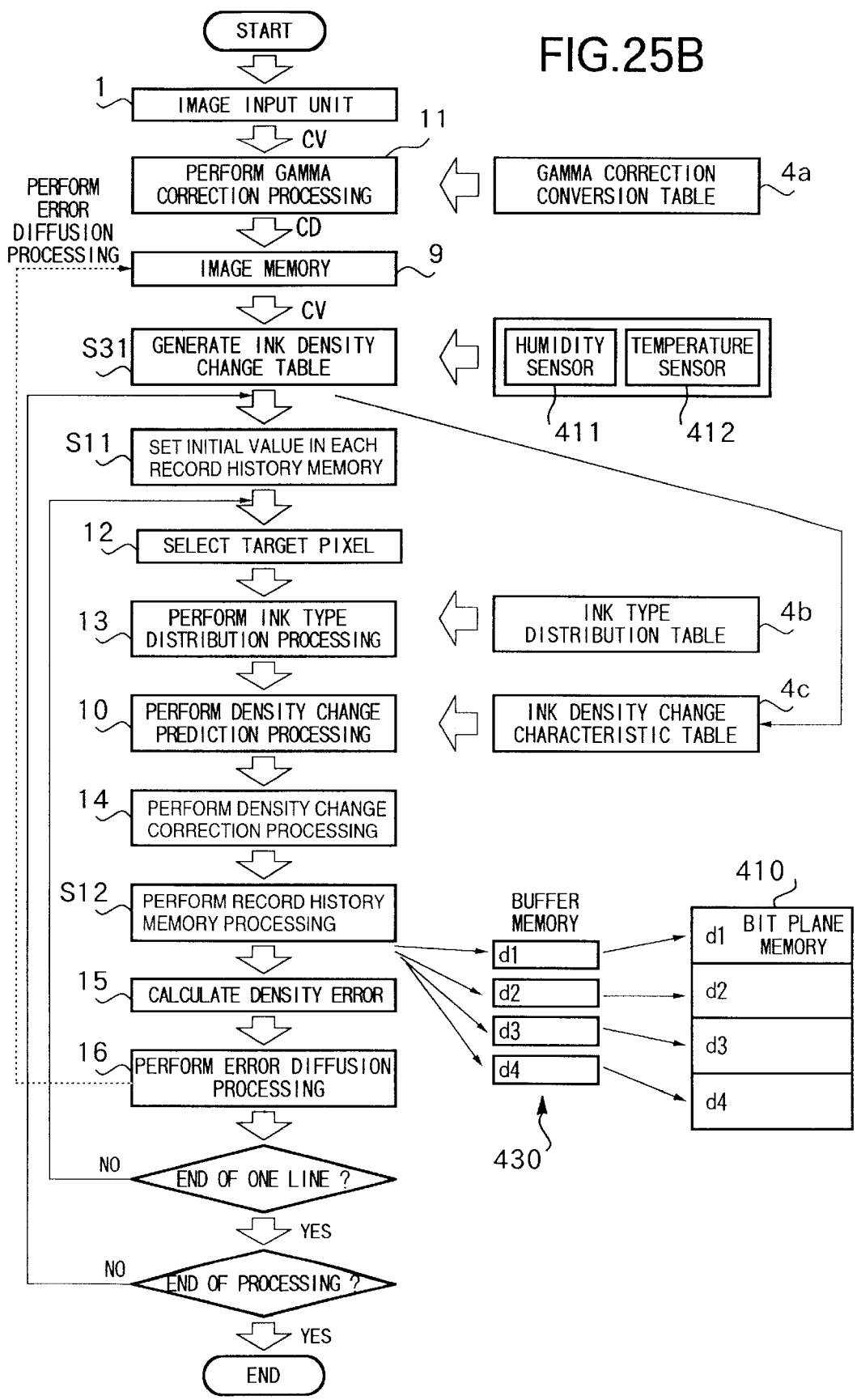
FIG. 25B is a flow chart for explaining a modification of the flow of image processing in the sixth embodiment.

FIGS. 25A and 25B are flow charts showing the flow of processing in an image processing unit 6 according to the sixth embodiment of the present invention. The same reference numerals in FIGS. 25A and 25B denote the same portions as in the drawings described above, and a description thereof will be omitted.

First of all, gamma correction processing 11 converts an image signal CV input through an image input unit 1 into a signal CD representing a density by using a gamma correction conversion table 4a, and stores the signal in an image memory 9.

In ink density change characteristic table generation processing in step S31, ink density change characteristic tables are generated from data representing the density change characteristics of each type of ink at the environmental humidities and temperatures (not shown) stored in the storage medium 4 on the basis of the state quantities of ambient humidities and temperatures around the printer unit 7 which are detected by the humidity sensor 411 and the temperature sensor 412. Since the subsequent processing is the same as that in the flow of processing shown in FIG. 24A, a description thereof will be omitted.

FIG. 25B shows a modification of the sixth embodiment. In this modification, density error calculation processing and error diffusion processing 16 are also performed, and the pixel values around the target pixel in the image memory 9 are updated on the basis of the resultant errors.

[Seventh Embodiment]

According to the above embodiment, the density error correction method uses the error diffusion method as area gradation processing. However, such gradation processing is not limited to error diffusion. For example, other area gradation processing methods such as the density pattern method or the dither method may be used.

A method of determining ink types and printing an image by using the density pattern method according to the seventh embodiment of the present invention will be described below, together with a density error correction method of distributing a density error caused in the method of this embodiment. Since the arrangement of an ink-jet printing apparatus according to the seventh embodiment is the same as that of the above embodiment, a description thereof will be omitted.

Figure 29:
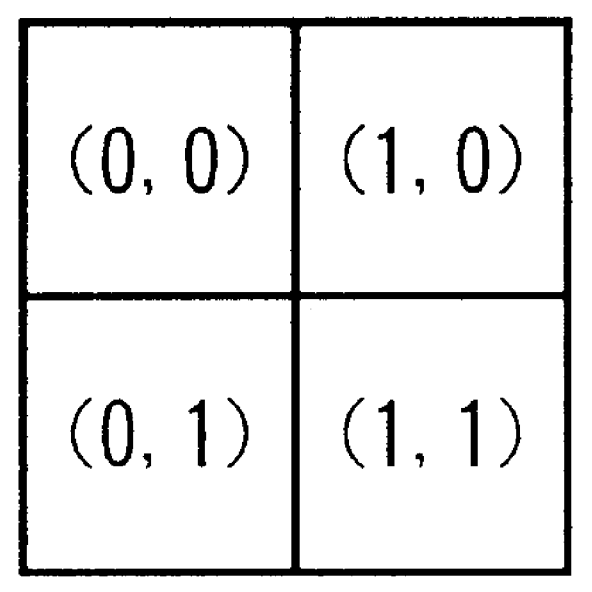

For the sake of descriptive convenience, one pixel of an image is expressed by a 2×2 dot density pattern (FIG. 29). However, the present invention is not limited to this. For example, each pixel may have a matrix size of 4×4 dots. Assume that dots constituting the density pattern are printed by superimposing four types of inks D1, D2, D3, and D4, each having different density from each other in a color as in the above embodiment. In this case, 8-bit density levels that can be expressed by dots, and superimposed transmission densities are the same as those in FIG. 6 described above.

Referring to FIG. 29, the positions of the respective dots in the 2×2 density pattern, i.e., the upper left, upper right, lower left, and lower right positions, are respectively defined as (0, 0), (1, 0), (0, 1), and (1, 1).

FIG. 30 shows an example of how a density pattern is formed by sequentially assigning dots to the respective coordinate positions in matrices according to the gradation expression of density data shown in FIG. 6 (density data increases in increments of "17"). According to this pattern, 61 average densities of 2×2 dot matrices can be expressed by gradation levels from density "0" to density "255" at intervals of 4.25 (=17/4). The density value of each dot in the matrices in FIG. 30 corresponds to 8-bit density data expressed by one dot in FIG. 6. In addition, the value below each matrix indicates the average density (print density value) of the matrix.

FIG. 31 shows the contents of an ink type distribution table 4b for forming the density pattern shown in FIG. 30 and, more specifically, an ink type distribution table representing the discharging/non-discharging of the inks D1, D2, D3, and D4 of the respective dots of each 2×2 density pattern corresponding to an image signal (density data), the transmission densities of the inks D1, D2, D3, and D4, and the transmission densities of the respective matrices obtained by superimposing the combinations of ink in the ink type distribution table.

As described with reference to FIGS. 2A, 17A, and 20A, ink type distribution processing 13 is performed for a target pixel on the basis of the above arrangement by using the ink type distribution table 4b in FIG. 31. In addition, an ink density change is predicted in accordance with the non-discharging time of each ink by referring to an ink density change characteristic table 4e (density change prediction processing 10), and correction processing for determining each ink type with the predicted density increase is performed (density change correction processing 14). In this case, in the ink type distribution processing 13 described with reference to these drawings, data to be output to two nozzles is determined for one pixel. In this regard, this embodiment differs from the previous embodiments.

In the seventh embodiment, as described with reference to FIGS. 2B, 17B, and 20B, the error between the density value determined by the density change correction processing and the actual print density is further obtained to perform density correction for the corresponding pixel of the image data. This processing will be describe next.

Assume that the density data of the pixel selected by target pixel selection processing 12 is "42.5". In this case, the respective dots of the matrix used to print the pixel having this density are expressed as (0, 0)=51, (1, 0)=51, (0, 1)=34, and (1, 1)=34, respectively, as denoted by reference numeral 300 in FIG. 30. Consider first the position (0, 0). Ink types used to print this pixel are selected by the same method as in the above embodiment on the basis of the respective pixel values of the matrix and the ink type distribution table 4b (ink type distribution processing 13). An ideal ink combination is then determined by referring to the ink density change characteristic table 4e in consideration of the density increase of each ink based on the continuous non-discharging interval of each nozzle (density change correction processing 14). The error between the density obtained by the ink combination and the target density data "51" is calculated (density error calculation processing 15), and an error ΔE is distributed to the pixel data "51" at the position (1, 0). With this processing, the target pixel density at the position (1, 0) becomes "51+ΔE0" (density error diffusion processing 16).

Similarly, an optimal ink combination for expressing the pixel density "51+ΔE0" at the position (1, 0) is selected in consideration of the density increase of each ink based on the non-discharging interval of each nozzle. The error between the density value obtained by the ink combination and the target density value "51+ΔE0" is calculated, and an error ΔE1 is distributed to the pixel "34" at the position (0, 1). With this processing, the density value of the pixel at the position (0, 1) becomes "34+ΔE1".

The nozzle of the print head which is used to print the dot at the position (0, 1) is located immediately below the nozzle that is used to print the dots at the positions (0, 0) and (1, 0). That is, the history counter used for referring to the non-discharging of this nozzle is the one corresponding to the nozzle. An optimal ink combination for expressing the density value "34+ΔE1" is determined on the basis of the non-discharging interval of each nozzle in consideration of the ink density increase at the nozzle in the same manner as described above except for the history counter to be referred to. The error between the density obtained by the ink combination and the target density value "34+ΔE1" is calculated, and an error ΔE2 is distributed to the pixel "34" at the position (1, 1). As a result, the density of the pixel at the position (1, 1) becomes "34+ΔE2".

Subsequently, an optimal ink combination for expressing the density "34+ΔE2" in consideration of the density increase of each ink based on the non-discharging interval of each nozzle. There is an error between the density obtained by this ink combination and the target density "34+ΔCE2". In this case, however, this error is not distributed to other density pattern, and this processing is completed within the matrix. The last error in one dot (1, 1) within the matrix is equivalent to ¼ the density error in a dither matrix unit, and hence a deterioration in image quality can be minimized.

As described above, unlike in the above embodiments, in the seventh embodiment, since four print data must be determined for one target pixel, the processing from the ink type distribution processing 13 to the error diffusion processing 16 must be repeated four times for one target pixel data.

In the above processing using the density pattern method, the errors are distributed in the order of the positions (1, 0), (0, 1), and (1, 1). However, error distribution is not limited to this, and errors may be distributed to unprocessed dots on the basis of some appropriate distribution coefficients. For example, the error ΔE0 caused at the position (0, 0) may be distributed to the positions (1, 0), (0, 1), and (1, 1) ⅓ the error at a time; the error ΔE1 caused at the position (1, 0), to the positions (0, 1) and (1, 1) ½ the error at a time; and the error ΔE2 caused at the position (0, 1), to the position (1, 1).

In addition, the size of the density pattern, ink combinations, and the like are not limited to those presented in the embodiment described above.

If the density increase rate of each ink is not proportional to the non-discharging time, for example, if the density increase of each ink reaches its limit after a lapse of a predetermined period of time, the corresponding relationship may be reflected in the ink density change characteristic table 4e in FIG. 9.

In this embodiment, the ink density change characteristic tables have been described. However, such tables are not limited to density increases. That is, any curves that represent ink density increase characteristics can be used.

In addition, if the ink density change characteristic tables are stored in an erasable storage medium such as the RAM 5, the storage data can be written by arbitrary characteristic data.

In the above embodiment, several types of ink are combined on the basis of the ink type distribution table 4b before an increase in density. However, with the use of an algorithm designed to always discharge an ink having the highest standard density on the basis of an ink type distribution table based on standard ink densities, since an increase in absolute OD value can be suppressed, an image disturbance can be reduced.

The density change characteristic tables in this embodiment are not limited to ink. That is, any tables that represent density changes of print results obtained by using sublimation type films, thermal transfer tapes, heat-sensitive sheets, and the like can be used.

If the density change tables in this embodiment are replaced with the relationship between print duty and density increase, an increase in print density can be predicted, and corresponding correction can be performed. If, for example, record history information is converted into a cumulative heat amount in a past predetermined interval, a density increase can be predicted.

Furthermore, if parameters such as variations in print density due to changes in quality of heat-sensitive sheets, ink ribbons, cartridge films for a sublimation type printer, and the like are input to density change tables, he tables can be corrected.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

According to each embodiment described above, the present invention has been described as the scheme which has a means (e.g., an electricity-to-heat converter or laser light) for generating heat energy as energy used to discharge an ink, and changes the state of an ink by using the heat energy. However, the present invention is not limited to this and can be applied to a scheme using a piezoelectric element as a means for discharging an ink. According to this scheme, high-density, high-definition printing operation can be realized.

As for the typical structure and principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a channel which holds the fluid (ink) to a level higher than levels at which film boiling takes place are applied to the electrothermal converter in accordance with print information so as to generate heat energy in the electrothermal converter and to cause the heat effecting surface of the print head to take place film boiling so that bubbles can be formed in the fluid (ink) to correspond to the one or more drive signals. The enlargement/contraction of the bubble will cause the fluid (ink) to be discharged through an orifice so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear channel or perpendicular channel) of the print head disclosed in each of the aforesaid inventions and having an arrangement that discharge ports, channels and electrothermal converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement in which a common slit is formed to serve as a discharge section of a plurality of electrothermal converters as disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a print head of the full line type having a length corresponding to the maximum width of a printing medium on which information can be printed by the printing apparatus, either the construction which satisfies its length by a combination of a plurality of print heads as disclosed in the above specifications or the construction as a single full line type print head which has integrally been formed can be used.

In addition, the invention is effective for a print head of the exchangeable chip type which enables electrical connection to the printer apparatus main body or supply of ink from the main body by being mounted onto the printer apparatus main body, or for use of a print head of the cartridge type provided integrally on the print head itself.

It is preferable that the printer apparatus of each embodiment described above additionally employ a print head restoring means and an auxiliary means, because the printing operation can be further stabilized. More specifically, it is preferable to employ a print head capping means, a cleaning means, a pressurizing or suction means, an electrothermal converter, an another heating element or a preliminary heating means constituted by combining them, and a preliminary discharging mode of performing a discharging operation independently of a printing operation in order to perform stable printing.

Although a fluid ink is employed in the aforesaid embodiment of the present invention, an ink which is solidified at the room temperature or lower and as well as softened at the room temperature, an ink in the form of a fluid at the room temperature, or an ink which is formed into a fluid when the print signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a print signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a print signal so as to be discharged in the form of fluid ink, or an ink which is liquefied only after heat energy is supplied, e.g., an ink which starts to solidify when it reaches a printing medium, can be adapted to the present invention. It is the most preferred way for the ink to be adapted to the aforesaid film boiling method.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) traveling on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the embodiments, an excessive density increase at the start of printing of an image can be suppressed by changing the combination of types of ink, each type of ink has different density from each other and is to be substantially printed on the same portion, on the basis of the density change characteristics of the respective inks.

In addition, high-resolution printing with excellent gradation characteristics can be provided even with changes in ink densities by correcting a portion, which cannot be properly corrected by only changing the ink combination, by image processing such as error diffusion.

Each embodiment described above has exemplified the ink-jet printing apparatus, but the present invention can be applied to other types of printing apparatuses. In a printer using a heating head, e.g., a sublimation printer, continuous printing operation raises the temperature of the head. As a result, the density of a printed image increases. If the density change table described in the present invention is replaced with the relationship between print duty and density increase, an increase in the density of an image to be printed can be predicted, and corresponding correction can be performed.

In addition, each embodiment described above has exemplified the ink-jet scheme using heat. However, the present invention is not limited to this. As is obvious, for example, the present invention can be applied to an ink-jet scheme using piezoelectric elements. Furthermore, if parameters such as variations in print density due to changes in quality of heat-sensitive sheets, ink ribbons, cartridge films for a sublimation type printer, and the like are input to density change tables, the tables can be corrected.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   storage means for storing superimpose record information concerning recording materials with different densities and corresponding to an image density;
   selection means for selecting superimpose record information stored in said storage means, on the basis of a density of each pixel of an input image signal;
   prediction means for predicting a density change of a recording material based on a change of characteristic of the recording material due to an elapse of time; and
   determination means for correcting the superimpose record information selected by said selection means, on the basis of the density change predicted by said prediction means, and determining the corrected superimpose record information as recording information for recording.

2. The apparatus according to claim 1, wherein at least one of the recording materials is an ink.

3. The apparatus according to claim 2, wherein said storage means stores information indicating which ink is to be used, among the types of ink of a color which have different densities, in accordance with the density.

4. The apparatus according to claim 1, wherein said prediction means predicts the density change of the recording material in accordance with a continuous time during which the recording material is not used for recording.

5. The apparatus according to claim 1, wherein said prediction means comprises count means for counting consecutive recording operations in which the recording material is not used, and predicts the density change of the recording material in accordance with a count value of said count means.

6. The apparatus according to claim 1, wherein said prediction means obtains a continuous time during which the recording material is not used, in accordance with a distance from a traveling start position of a recording head to a recording start position and traveling characteristics of said recording head, and predicts the density change of the recording material in accordance with the time.

7. The apparatus according to claim 1, further comprising:
   detection means for detecting environmental information; and
   predicted information storage means for storing density change prediction information of the recording material which corresponds to the environmental information and a continuous time during which the recording material is not used for recording, wherein
   said prediction means predicts the density change of the recording material on the basis of the density change prediction information corresponding to the environmental information detected by said detection means.

8. The apparatus according to claim 7, wherein the environmental information includes at least one of a humidity and a temperature.

9. The apparatus according to claim 7, further comprising:
   means for generating the density change prediction information.

10. The apparatus according to claim 1, further comprising:

density interpolation means for performing density interpolation, near a target pixel, for an error between a density of the target pixel and a density based on the superimpose record information used for the recording by an area gradation method.

11. The apparatus according to claim 10, wherein said density interpolation means distributes an error between pixel data of a pixel of interest and a predicted recording density value of the target pixel recorded on the basis of the superimpose record information determined by said determination means to pixels around the pixel of interest.

12. The apparatus according to claim 1, wherein the superimpose record information includes information indicating which recording material is to be used, among the recording materials having different densities, in accordance with the density.

13. An image processing method of obtaining image information for recording an image by using recording materials having different densities in accordance with an image density, the method comprising:
   a step of providing a memory for storing superimpose record information concerning recording materials with different densities and corresponding to the density;
   a selection step of selecting superimpose record information stored in the memory, on the basis of a density of each pixel of an input image signal;
   a prediction step of predicting a density change of a recording material based on a change of characteristic of the recording material due to an elapse of time; and
   a determination step of correcting the superimpose record information selected in the selection step, on the basis of the density change predicted in the prediction step, and determining the corrected superimpose record information as recording information for recording.

14. The method according to claim 13, wherein at least one of the recording materials is an ink.

15. The method according to claim 14, wherein the memory stores information indicating which ink is to be used, among the types of ink of a color which have different densities, in accordance with the density.

16. The method according to claim 13, wherein the prediction step comprises predicting the density change of the recording material in accordance with a continuous time during which the recording material is not used for recording.

17. The method according to claim 13, wherein the prediction step comprises a count step of counting consecutive recording operations in which the recording material is not used, and predicting the density change of the recording material in accordance with a count value obtained in the count step.

18. The method according to claim 13, wherein the prediction step comprises obtaining a continuous time during which the recording material is not used, in accordance with a distance from a traveling start position of a recording head to a print start position and traveling characteristics of said recording head, and predicting the density change of the recording material in accordance with the time.

19. The method according to claim 13, further comprising the steps of:
   detecting environmental information; and
   predicting the density change of the recording material on the basis of the environmental information detected in the detection step and the density change prediction information of the recording material which corresponds to the continuous time during which the recording material is not used.

20. The method according to claim 19, wherein the environmental information includes at least one of a humidity and a temperature.

21. The method according to claim 19, further comprising the step of generating the density change prediction information.

22. The method according to claim 13, further comprising a density interpolation step of performing density interpolation, near a target pixel, for an error between a density of the target pixel and a density based on the superimpose record information used for the recording by an area gradation method.

23. The method according to claim 22, wherein said density interpolation step comprises distributing an error between pixel data of the target pixel and a predicted recording density value of the target pixel recorded on the basis of the superimpose record information determined in the determination step to pixels around the target pixel.

24. The method according to claim 13, wherein the superimpose record information includes information indicating which recording material is to be used, among the recording materials having different densities, in accordance with the density.

25. A recording apparatus including a plurality of recording heads for performing recording by using recording materials having different densities, comprising:
   storage means for storing superimpose record information concerning recording materials with different densities and corresponding to an image density;
   selection means for selecting superimpose record information stored in said storage means, on the basis of a density of each pixel of an input image signal;
   prediction means for predicting a density change of a recording material based on a change of characteristic of the recording material due to an elapse of time;
   determination means for correcting the superimpose record information selected by said selection means, on the basis of the density change predicted by said prediction means, and determining the corrected superimpose record information as recording information for recording; and
   recording control means for recording each pixel on a recording medium by driving said plurality of recording heads in accordance with the recording information determined by said determination means.

26. The apparatus according to claim 25, wherein at least one of the recording materials is an ink.

27. The apparatus according to claim 26, wherein said storage means stores information indicating which ink is to be used, among the types of ink having different densities, in accordance with the density.

28. The apparatus according to claim 26, wherein said storage means stores information indicating which ink is to be used, among types of ink of a color which have different densities, in accordance with the density.

29. The apparatus according to claim 25, wherein said recording control means records and superimposes the recording materials having different densities at a same pixel position by scanning said plurality of recording heads in a main scanning direction.

30. The apparatus according to claim 25, wherein said prediction means predicts the density change of an ink in a nozzle of one of said recording heads in accordance with a continuous time during which said nozzle is not used for recording.

31. The apparatus according to claim 25, wherein said prediction means comprises count means for counting consecutive recording operations in which the recording material is not used, and predicts the density change of the recording material in accordance with a count value of said count means.

32. The apparatus according to claim 25, wherein said prediction means obtains a continuous time during which the recording material is not used, in accordance with a distance from a traveling start position of a recording head to a recording start position and traveling characteristics of said recording head, and predicts the density change of the recording material in accordance with the time.

33. The apparatus according to claim 32, wherein said plurality of recording heads are arranged in a scanning direction, and traveling characteristics of each recording head are determined on the basis of the time required for each recording head to reach a recording position from a preliminary discharge position.

34. The apparatus according to claim 32, further comprising:

position detection means for detecting a traveling position of one of said recording heads; and measurement means for measuring a lapse of time since the start of traveling of said one recording head, wherein the traveling characteristics of said one recording head are determined on the basis of a traveling position of said one recording head which is detected by said position detection means and the lapse of time measured by said measurement means.

35. The apparatus according to claim 25, further comprising:

density interpolation means for performing density interpolation, near a target pixel, for an error between a density of the target pixel and a density based on the superimpose record information used for the recording by an area gradation method.

36. An ink-jet recording apparatus for recording by discharging ink, comprising:

prediction means for predicting a change in the recording density caused by a change of characteristic of the ink due to a lapse of time; and correction means for correcting the change in the recording density predicted by said prediction means.

37. The apparatus according to claim 36, wherein said prediction means predicts the density change based on a time on which the ink is not continuously used for recording.

* * * * *

UNITED STATES PATENT AND TRADEMARK OFFICE
CERTIFICATE OF CORRECTION

PATENT NO. : 6,439,683 B1
DATED : August 27, 2002
INVENTOR(S) : Matsumoto et al.

It is certified that error appears in the above-identified patent and that said Letters Patent is hereby corrected as shown below:

Column 3,
Line 5, "when" should be deleted.
Line 21, "provide" should read -- to provide --.

Column 4,
Line 43, "the" should read -- of the --.

Column 7,
Line 30, "nonuse" should read -- non-use --.

Column 8,
Line 5, "head,units" should read -- head units --.

Column 13,
Line 4, "oft he" should read -- of the --.
Line 9, "to" should read -- to "99.25". --.

Column 23,
Line 15, "Characteristic5" should read -- Characteristics --.
Line 16, "operation.of" should read -- operation of --.

Column 24,
Line 8, "reservoir" should read -- reservoir 33. --.

Column 29,
Line 54, "describe" should read -- described --.

UNITED STATES PATENT AND TRADEMARK OFFICE
CERTIFICATE OF CORRECTION

PATENT NO. : 6,439,683 B1
DATED : August 27, 2002
INVENTOR(S) : Matsumoto et al.

It is certified that error appears in the above-identified patent and that said Letters Patent is hereby corrected as shown below:

<u>Column 31,</u>
Line 32, "he" should read -- the --.
Line 62, "cause" should read -- cause film boiling to take place on --.
Line 63, "to take place film boiling" should be deleted.

Signed and Sealed this

Twenty-fifth Day of March, 2003

JAMES E. ROGAN
*Director of the United States Patent and Trademark Office*